US007761373B2

(12) United States Patent
Metz

(10) Patent No.: US 7,761,373 B2
(45) Date of Patent: Jul. 20, 2010

(54) METHOD AND SYSTEM FOR PREDICTING CREDIT RATINGS TRANSITIONS

(75) Inventor: Albert Diederich Metz, Cornwall-on-Hudson, NY (US)

(73) Assignee: Moody's Investors Service, Inc., New York, NY (US)

( * ) Notice: Subject to any disclaimer, the term of this patent is extended or adjusted under 35 U.S.C. 154(b) by 25 days.

(21) Appl. No.: 12/149,318

(22) Filed: Apr. 30, 2008

(65) Prior Publication Data
US 2009/0276234 A1 Nov. 5, 2009

(51) Int. Cl.
*G06Q 40/00* (2006.01)
(52) U.S. Cl. .............................. 705/38; 705/35; 705/37
(58) Field of Classification Search ................ 705/38, 705/35
See application file for complete search history.

(56) References Cited

U.S. PATENT DOCUMENTS

| 5,884,283 | A  | * | 3/1999  | Manos ...................... 705/36 R |
| 6,952,688 | B1 | * | 10/2005 | Goldman et al. .............. 706/45 |
| 7,313,541 | B2 | * | 12/2007 | Wise et al. ................ 705/36 R |
| 7,530,490 | B1 | * | 5/2009  | Finkemeier et al. .......... 235/379 |
| 2002/0116325 | A1 | * | 8/2002 | Wise et al. ..................... 705/38 |
| 2004/0024606 | A1 | * | 2/2004 | Chukwu ....................... 705/1 |
| 2005/0144117 | A1 | * | 6/2005 | Misra et al. ................... 705/38 |
| 2005/0251475 | A1 | * | 11/2005 | Sato ............................ 705/39 |
| 2008/0189165 | A1 | * | 8/2008 | An et al. ....................... 705/10 |
| 2008/0288416 | A1 | * | 11/2008 | Arnott et al. .............. 705/36 R |
| 2009/0006275 | A1 | * | 1/2009 | Takano et al. ............. 705/36 R |
| 2009/0037323 | A1 | * | 2/2009 | Feinstein et al. .............. 705/38 |

OTHER PUBLICATIONS

Perasan, M. Hashem, Schuermann, Til; "Credit Risk and Macroeconomic Dynamics"; Mar. 2003.*
Darrell Duffie et al., *Multi-Period Corporate Default Prediction with Stochastic Covariates*, Current Version: Sep. 1, 2005.
Stephen Figlewski et al., *Modeling the Effect of Macroeconomic Factors on Corporate Default and Credit Rating Transitions*, Sep. 5, 2006.
Siem Jan Koopman et al., *The Multi-State Latent Factor Intensity Model for Credit Rating Transitions*, Nov. 17, 2006.

* cited by examiner

*Primary Examiner*—Kambiz Abdi
*Assistant Examiner*—Leland Marcus
(74) *Attorney, Agent, or Firm*—Morgan, Lewis & Bockius LLP

(57) ABSTRACT

A system and method is provided for allowing users to create portfolios of issuers and macroeconomic scenarios used to determine pertinent rating facts and future paths of macroeconomic drivers. The system and method use the pertinent rating facts and the future paths of macroeconomic drivers, namely unemployment rates and high yield spreads, as inputs to a Credit Transition Model (CTM). The system and method generate a complete set of rating transitions, including predicting the probability of default, while taking into account withdrawal of issuers to more accurately reflect default rates. The system and method provide users with multiple choices for outputs from the CTM and can easily and quickly generate results from the model.

26 Claims, 65 Drawing Sheets

Fig. 1A

Prior art

Fig. 1B

Prior art

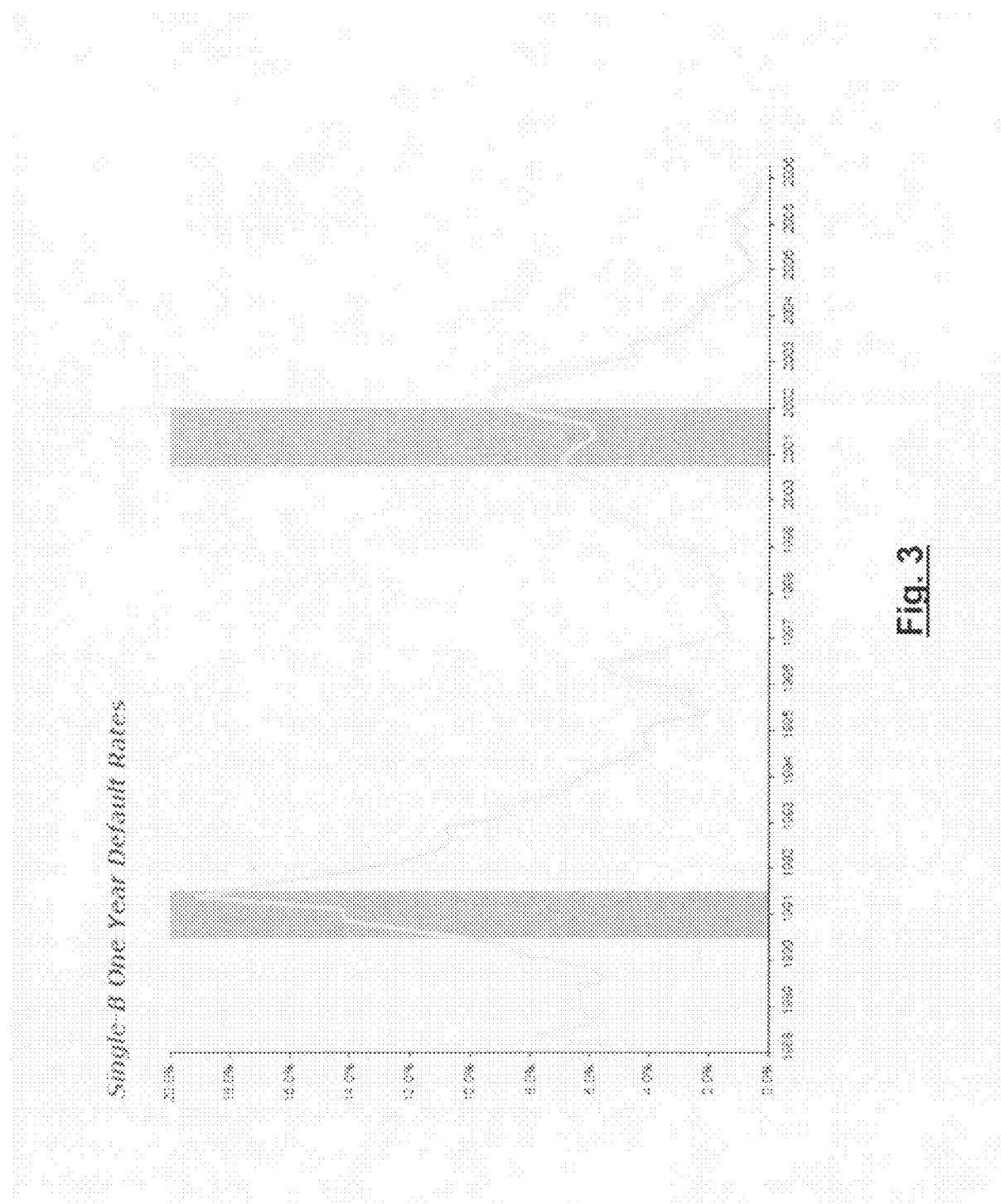

Calculating volatility in value due to credit quality changes for a single exposure

| Year-end rating | (1) Probability of state (%) | (2) New bond value plus coupon ($) | (3) Probability weighted value ($) | (4) Difference of value from mean ($) | (5) Probability weighted difference squared |
|---|---|---|---|---|---|
| AAA | 0.02 | 109.37 | 0.02 | 2.28 | 0.0010 |
| AA | 0.33 | 109.19 | 0.36 | 2.10 | 0.0146 |
| A | 5.95 | 108.66 | 6.47 | 1.57 | 0.1474 |
| BBB | 86.93 | 107.55 | 93.49 | 0.46 | 0.1853 |
| BB | 5.30 | 102.02 | 5.41 | -5.06 | 1.3592 |
| B | 1.17 | 98.10 | 1.15 | -8.99 | 0.9446 |
| CCC | 0.12 | 83.64 | 0.10 | -23.45 | 0.6598 |
| Default | 0.18 | 51.13 | 0.09 | -55.96 | 5.6358 |
| | | | Mean = $107.09 | Variance = | 8.9477 |
| | | | | Standard Deviation = | $2.99 |

Source: Gupton, Finger, and Bhatia, CreditMetrics ™ Technical Document, 1997

Prior art

To Rating

| From Rating | Aaa | Aa1 | Aa2 | Aa3 | A1 | A2 | A3 | Baa1 | Baa2 | Baa3 | Ba1 | Ba2 | Ba3 | B1 | B2 | B3 | Caa1 | Caa2 | Caa3 | Ca | C |
|---|---|---|---|---|---|---|---|---|---|---|---|---|---|---|---|---|---|---|---|---|---|
| Aaa | 100 | | | | | | | | | | | | | | | | | | | | |
| Aa1 | 19 | 81 | | | | | | | | | | | | | | | | | | | |
| Aa2 | 2 | 17 | 81 | | | | | | | | | | | | | | | | | | |
| Aa3 | 1 | | 5 | 93 | | | | | | | | | | | | | | | | | |
| A1 | 1 | | 4 | 15 | 81 | | | | | | | | | | | | | | | | |
| A2 | | 1 | 1 | 2 | 9 | 86 | | | | | | | | | | | | | | | |
| A3 | 1 | | 1 | 1 | 1 | 19 | 75 | | | | | | | | | | | | | | |
| Baa1 | 1 | | | 2 | 2 | 8 | 19 | 68 | | | | | | | | | | | | | |
| Baa2 | | | 1 | | 2 | 4 | 4 | 17 | 72 | | | | | | | | | | | | |
| Baa3 | | | 0 | 2 | 2 | 2 | 2 | 5 | 18 | 71 | | | | | | | | | | | |
| Ba1 | | | 0 | 0 | 1 | 1 | 1 | 2 | 4 | 21 | 69 | | | | | | | | | | |
| Ba2 | | | 1 | 0 | | 2 | | 1 | 3 | 5 | 22 | 66 | | | | | | | | | |
| Ba3 | | | | | | 1 | 1 | 2 | 1 | 2 | 5 | 19 | 68 | | | | | | | | |
| B1 | 0 | | | | 0 | | | 1 | | 1 | 3 | 5 | 18 | 68 | | | | | | | |
| B2 | | | | | | | | | 0 | | 1 | 2 | 3 | 27 | 63 | | | | | | |
| B3 | 0 | | 0 | | | | | | | | | 2 | 2 | 6 | 22 | 67 | | | | | |
| Caa1 | 0 | | | | | | | | | | | | 5 | 5 | 7 | 31 | 43 | | | | |
| Caa2 | | | | | | | | | 1 | | 3 | | | 12 | 3 | 9 | 29 | 44 | | | |
| Caa3 | | | | | | | | | | | 3 | | | | 6 | 19 | 6 | 19 | 44 | | |
| Ca | | | | | | | | | | | | | | | | | | 25 | 50 | 25 | |
| C | | | | | | | | | | | | | | | | | | | | | |

|  | \multicolumn{22}{c}{To Rating} |
| From Rating | Aaa | Aa1 | Aa2 | Aa3 | A1 | A2 | A3 | Baa1 | Baa2 | Baa3 | Ba1 | Ba2 | Ba3 | B1 | B2 | B3 | Caa1 | Caa2 | Caa3 | Ca | C | def |
|---|---|---|---|---|---|---|---|---|---|---|---|---|---|---|---|---|---|---|---|---|---|---|
| Aaa | 63 | 35 | 2 |  |  |  |  |  |  |  |  |  |  |  |  |  |  |  |  |  |  |  |
| Aa1 |  | 71 | 25 | 3 |  |  |  |  |  |  |  |  |  |  |  |  |  |  |  |  |  |  |
| Aa2 |  | 3 | 82 | 13 |  |  |  |  |  |  |  |  |  |  |  |  |  |  |  |  |  |  |
| Aa3 |  |  |  | 72 |  | 23 | 5 | 0 |  |  |  |  |  |  |  |  |  |  |  |  |  |  |
| A1 |  |  |  | 3 |  | 67 | 25 | 6 | 1 |  |  |  |  |  |  |  |  |  |  |  |  |  |
| A2 |  |  |  |  |  | 2 | 71 | 21 | 5 | 1 |  |  |  |  |  |  |  |  |  |  |  |  |
| A3 |  |  |  |  |  |  | 3 | 63 | 26 | 7 | 2 | 1 | 0 |  |  |  |  |  |  |  |  |  |
| Baa1 |  |  |  |  |  |  |  | 1 | 72 | 19 | 5 | 1 | 1 | 0 | 0 |  |  |  |  |  |  |  |
| Baa2 |  |  |  |  |  |  |  |  | 1 | 70 | 15 | 7 | 3 | 2 | 1 | 0 |  |  |  |  |  |  |
| Baa3 |  |  |  |  |  |  |  |  |  | 1 | 54 | 28 | 11 | 3 | 1 | 1 |  |  |  |  |  | 0.2 |
| Ba1 |  |  |  |  |  |  |  |  |  |  | 0 | 45 | 36 | 9 | 5 | 3 | 0.4 |  |  | 0.4 |  | 0.7 |
| Ba2 |  |  |  |  |  |  |  |  |  |  |  | 0 | 51 | 26 | 16 | 8 | 0.2 | 0.5 | 0.2 | 0.2 |  | 0.2 |
| Ba3 |  |  |  |  |  |  |  |  |  |  |  |  | 1 | 44 | 42 | 14 | 1.2 | 0.5 | 0.5 | 0.2 |  | 1.5 |
| B1 |  |  |  |  |  |  |  |  |  |  |  |  |  | 0 | 60 | 40 |  | 0.5 |  | 0.2 |  | 0.6 |
| B2 |  |  |  |  |  |  |  |  |  |  |  |  |  |  | 0 | 100 |  |  |  |  |  |  |
| B3 |  |  |  |  |  |  |  |  |  |  |  |  |  |  |  |  |  |  |  |  | 0.3 |  |

Fig. 6B

| | \multicolumn{6}{c|}{Quarters Ahead} |
| | 1 | 4 | 8 | 12 | 16 | 20 |
|---|---|---|---|---|---|---|
| Aaa | 0 | 0 | 0 | 0 | 0 | 0 |
| Aa1 | 0 | 0 | 0 | 0 | 0 | 0 |
| Aa2 | 0 | 0 | 0 | 0 | 0 | 0 |
| Aa3 | 0 | 0 | 0 | 0 | 0 | 0 |
| A1 | 0 | 0 | 0 | 0 | 0 | 0 |
| A2 | 0 | 0 | 0 | 0 | 0 | 0 |
| A3 | 0 | 0 | 0 | 0 | 0 | 0 |
| Baa1 | 0 | 0 | 0 | 0 | 0 | 0 |
| Baa2 | 0 | 0 | 0 | 0 | 0 | 1 |
| Baa3 | 0 | 0 | 0 | 0 | 1 | 1 |
| Ba1 | 0 | 0 | 0 | 1 | 1 | 1 |
| Ba2 | 0 | 0 | 1 | 1 | 2 | 2 |
| Ba3 | 0 | 1 | 2 | 3 | 4 | 4 |
| B1 | 0 | 3 | 6 | 9 | 8 | 7 |
| B2 | 96 | 82 | 59 | 40 | 27 | 19 |
| B3 | 1 | 3 | 6 | 7 | 7 | 6 |
| Caa1 | 0 | 1 | 3 | 4 | 4 | 3 |
| Caa2 | 0 | 1 | 2 | 2 | 2 | 2 |
| Caa3 | 0 | 0 | 1 | 1 | 1 | 1 |
| Ca | 0 | 0 | 0 | 1 | 1 | 1 |
| C | 0 | 0 | 0 | 0 | 0 | 0 |
| WR | 2 | 7 | 14 | 21 | 29 | 36 |
| DEF | 0 | 2 | 5 | 9 | 12 | 15 |

20 Quarter Forecast for a Newly Issued B2-Rated Issuer

| | Aaa | Aa1 | Aa2 | Aa3 | A1 | A2 | A3 | Baa1 | Baa2 | Baa3 | Ba1 | Ba2 | Ba3 | B1 | B2 | B3 | Caa1 | Caa2 | Caa3 | Ca | C | Withdraw | Default |
|---|---|---|---|---|---|---|---|---|---|---|---|---|---|---|---|---|---|---|---|---|---|---|---|
| 1 | 0.0% | 0.0% | 0.0% | 0.0% | 0.0% | 0.0% | 0.0% | 0.0% | 0.0% | 0.0% | 0.0% | 0.0% | 0.1% | 0.4% | 96.2% | 0.7% | 0.1% | 0.0% | 0.0% | 0.0% | 0.0% | 2.5% | 0.0% |
| 2 | 0.0% | 0.0% | 0.0% | 0.0% | 0.0% | 0.0% | 0.0% | 0.0% | 0.0% | 0.0% | 0.0% | 0.1% | 0.2% | 0.8% | 92.3% | 1.6% | 0.2% | 0.1% | 0.0% | 0.0% | 0.0% | 4.1% | 0.3% |
| 3 | 0.0% | 0.0% | 0.0% | 0.0% | 0.0% | 0.0% | 0.0% | 0.0% | 0.0% | 0.0% | 0.1% | 0.1% | 0.4% | 1.5% | 87.5% | 2.5% | 0.8% | 0.4% | 0.1% | 0.0% | 0.0% | 5.6% | 0.8% |
| 4 | 0.0% | 0.0% | 0.0% | 0.0% | 0.0% | 0.0% | 0.1% | 0.0% | 0.0% | 0.0% | 0.1% | 0.2% | 0.6% | 2.7% | 81.8% | 3.4% | 1.2% | 0.6% | 0.2% | 0.1% | 0.0% | 7.0% | 1.5% |
| 5 | 0.0% | 0.0% | 0.0% | 0.0% | 0.0% | 0.0% | 0.1% | 0.1% | 0.1% | 0.1% | 0.1% | 0.3% | 0.8% | 3.6% | 76.1% | 4.0% | 1.8% | 0.9% | 0.3% | 0.1% | 0.0% | 8.8% | 2.3% |
| 6 | 0.0% | 0.0% | 0.0% | 0.0% | 0.0% | 0.0% | 0.1% | 0.1% | 0.1% | 0.1% | 0.2% | 0.4% | 1.1% | 4.4% | 70.7% | 4.8% | 2.3% | 1.2% | 0.4% | 0.2% | 0.0% | 10.3% | 3.0% |
| 7 | 0.0% | 0.0% | 0.0% | 0.0% | 0.0% | 0.0% | 0.1% | 0.1% | 0.1% | 0.1% | 0.3% | 0.6% | 1.4% | 5.3% | 65.1% | 5.5% | 2.6% | 1.4% | 0.5% | 0.3% | 0.1% | 12.0% | 3.8% |
| 8 | 0.0% | 0.0% | 0.0% | 0.0% | 0.0% | 0.0% | 0.1% | 0.2% | 0.2% | 0.2% | 0.4% | 0.7% | 1.7% | 6.3% | 59.5% | 6.3% | 2.8% | 1.6% | 0.6% | 0.4% | 0.1% | 13.8% | 4.7% |
| 9 | 0.0% | 0.0% | 0.0% | 0.0% | 0.0% | 0.0% | 0.2% | 0.2% | 0.2% | 0.3% | 0.5% | 0.8% | 2.1% | 7.1% | 54.1% | 6.8% | 3.1% | 1.7% | 0.7% | 0.5% | 0.1% | 15.6% | 5.7% |
| 10 | 0.0% | 0.0% | 0.0% | 0.0% | 0.0% | 0.1% | 0.2% | 0.2% | 0.3% | 0.3% | 0.5% | 1.0% | 2.5% | 7.7% | 49.1% | 7.1% | 3.3% | 1.9% | 0.7% | 0.5% | 0.1% | 17.5% | 6.6% |
| 11 | 0.0% | 0.0% | 0.1% | 0.0% | 0.0% | 0.1% | 0.2% | 0.3% | 0.3% | 0.3% | 0.6% | 1.1% | 2.8% | 8.2% | 44.4% | 7.4% | 3.4% | 2.0% | 0.8% | 0.5% | 0.1% | 19.5% | 7.6% |
| 12 | 0.0% | 0.1% | 0.1% | 0.0% | 0.0% | 0.1% | 0.2% | 0.3% | 0.4% | 0.4% | 0.7% | 1.3% | 3.1% | 8.5% | 40.1% | 7.5% | 3.6% | 2.1% | 0.8% | 0.6% | 0.2% | 21.5% | 8.5% |
| 13 | 0.0% | 0.1% | 0.1% | 0.1% | 0.0% | 0.1% | 0.2% | 0.3% | 0.4% | 0.4% | 0.8% | 1.4% | 3.3% | 8.7% | 36.2% | 7.5% | 3.7% | 2.1% | 0.8% | 0.6% | 0.2% | 23.5% | 9.4% |
| 14 | 0.0% | 0.1% | 0.1% | 0.1% | 0.0% | 0.1% | 0.2% | 0.4% | 0.4% | 0.5% | 0.8% | 1.5% | 3.5% | 8.7% | 32.8% | 7.5% | 3.7% | 2.2% | 0.9% | 0.6% | 0.2% | 25.4% | 10.4% |
| 15 | 0.0% | 0.1% | 0.1% | 0.1% | 0.0% | 0.1% | 0.2% | 0.4% | 0.4% | 0.5% | 0.9% | 1.6% | 3.6% | 8.6% | 29.7% | 7.4% | 3.8% | 2.2% | 0.9% | 0.6% | 0.2% | 27.3% | 11.3% |
| 16 | 0.0% | 0.1% | 0.1% | 0.1% | 0.1% | 0.1% | 0.3% | 0.4% | 0.5% | 0.6% | 0.9% | 1.7% | 3.8% | 8.4% | 27.0% | 7.3% | 3.7% | 2.2% | 0.9% | 0.6% | 0.2% | 29.2% | 12.1% |
| 17 | 0.0% | 0.1% | 0.1% | 0.1% | 0.1% | 0.1% | 0.3% | 0.4% | 0.5% | 0.6% | 1.0% | 1.7% | 3.8% | 8.1% | 24.6% | 7.1% | 3.7% | 2.2% | 0.9% | 0.6% | 0.2% | 31.0% | 12.9% |
| 18 | 0.0% | 0.1% | 0.1% | 0.1% | 0.1% | 0.1% | 0.3% | 0.4% | 0.5% | 0.7% | 1.0% | 1.8% | 3.7% | 7.8% | 22.4% | 6.9% | 3.6% | 2.2% | 0.8% | 0.6% | 0.2% | 32.9% | 13.7% |
| 19 | 0.0% | 0.1% | 0.1% | 0.1% | 0.1% | 0.2% | 0.3% | 0.4% | 0.5% | 0.7% | 1.1% | 1.8% | 3.7% | 7.4% | 20.6% | 6.7% | 3.5% | 2.2% | 0.8% | 0.6% | 0.2% | 34.7% | 14.4% |
| 20 | 0.0% | 0.1% | 0.1% | 0.1% | 0.1% | 0.2% | 0.3% | 0.4% | 0.6% | 0.8% | 1.1% | 1.8% | 3.6% | 7.0% | 18.9% | 6.4% | 3.4% | 2.1% | 0.8% | 0.6% | 0.2% | 36.5% | 15.1% |

Number of Quarters into the Future

Fig. 19B

MODEL OUTPUT: New Baa3 Issuer, WR-adjusted

| | Aaa | Aa1 | Aa2 | Aa3 | A1 | A2 | A3 | Baa1 | Baa2 | Baa3 | Ba1 | Ba2 |
|---|---|---|---|---|---|---|---|---|---|---|---|---|
| q1 | 0.0% | 0.0% | 0.0% | 0.0% | 0.0% | 0.0% | 0.0% | 0.1% | 0.4% | 98.9% | 0.3% | 0.2% |
| q2 | 0.0% | 0.0% | 0.0% | 0.0% | 0.0% | 0.0% | 0.1% | 0.2% | 0.9% | 96.9% | 1.0% | 0.5% |
| q3 | 0.0% | 0.0% | 0.0% | 0.0% | 0.0% | 0.1% | 0.1% | 0.4% | 1.6% | 94.5% | 1.6% | 0.9% |
| q4 | 0.0% | 0.0% | 0.0% | 0.0% | 0.1% | 0.1% | 0.2% | 0.6% | 2.5% | 91.1% | 2.5% | 1.4% |
| q5 | 0.0% | 0.0% | 0.0% | 0.0% | 0.1% | 0.1% | 0.2% | 0.9% | 3.3% | 87.3% | 3.5% | 2.1% |
| q6 | 0.0% | 0.0% | 0.0% | 0.0% | 0.1% | 0.2% | 0.3% | 1.0% | 4.0% | 83.6% | 4.6% | 2.7% |
| q7 | 0.0% | 0.0% | 0.0% | 0.1% | 0.1% | 0.2% | 0.3% | 1.3% | 4.7% | 79.9% | 5.5% | 3.3% |
| q8 | 0.0% | 0.0% | 0.0% | 0.1% | 0.2% | 0.2% | 0.4% | 1.5% | 5.4% | 76.4% | 6.2% | 3.8% |
| q9 | 0.1% | 0.0% | 0.0% | 0.1% | 0.2% | 0.3% | 0.5% | 1.7% | 6.2% | 72.7% | 6.9% | 4.3% |
| q10 | 0.1% | 0.0% | 0.0% | 0.1% | 0.2% | 0.3% | 0.6% | 2.0% | 7.0% | 69.0% | 7.6% | 4.7% |
| q11 | 0.1% | 0.0% | 0.0% | 0.1% | 0.2% | 0.4% | 0.7% | 2.3% | 7.9% | 65.2% | 8.2% | 5.1% |
| q12 | 0.1% | 0.0% | 0.0% | 0.1% | 0.3% | 0.5% | 0.8% | 2.6% | 8.8% | 61.5% | 8.8% | 5.5% |
| q13 | 0.1% | 0.1% | 0.1% | 0.1% | 0.3% | 0.5% | 0.9% | 2.9% | 9.5% | 58.2% | 9.3% | 5.8% |
| q14 | 0.1% | 0.1% | 0.1% | 0.1% | 0.3% | 0.6% | 1.0% | 3.1% | 10.2% | 55.1% | 9.7% | 6.1% |
| q15 | 0.1% | 0.1% | 0.1% | 0.1% | 0.4% | 0.6% | 1.1% | 3.4% | 10.7% | 52.4% | 9.9% | 6.3% |
| q16 | 0.1% | 0.1% | 0.1% | 0.1% | 0.4% | 0.7% | 1.2% | 3.6% | 11.2% | 49.9% | 10.2% | 6.4% |
| q17 | 0.1% | 0.1% | 0.1% | 0.2% | 0.4% | 0.7% | 1.3% | 3.8% | 11.6% | 47.6% | 10.4% | 6.6% |
| q18 | 0.1% | 0.1% | 0.1% | 0.2% | 0.5% | 0.8% | 1.4% | 4.0% | 11.9% | 45.5% | 10.6% | 6.7% |
| q19 | 0.1% | 0.1% | 0.1% | 0.2% | 0.5% | 0.8% | 1.4% | 4.2% | 12.1% | 43.5% | 10.7% | 6.8% |
| q20 | 0.1% | 0.1% | 0.1% | 0.2% | 0.5% | 0.9% | 1.5% | 4.3% | 12.3% | 41.7% | 10.9% | 6.9% |

Fig. 19J

MODEL OUTPUT: New Baa3 Issuer, WR-adjusted

| | Ba3 | B1 | B2 | B3 | Caa1 | Caa2 | Caa3 | Ca | C | WR | DEF |
|---|---|---|---|---|---|---|---|---|---|---|---|
| q1 | 0.1% | 0.0% | 0.0% | 0.0% | 0.0% | 0.0% | 0.0% | 0.0% | 0.0% | 0.0% | 0.0% |
| q2 | 0.3% | 0.1% | 0.0% | 0.0% | 0.0% | 0.0% | 0.0% | 0.0% | 0.0% | 0.0% | 0.0% |
| q3 | 0.5% | 0.1% | 0.1% | 0.1% | 0.0% | 0.0% | 0.0% | 0.0% | 0.0% | 0.0% | 0.1% |
| q4 | 0.8% | 0.2% | 0.2% | 0.1% | 0.0% | 0.0% | 0.0% | 0.0% | 0.0% | 0.0% | 0.1% |
| q5 | 1.2% | 0.4% | 0.3% | 0.2% | 0.1% | 0.1% | 0.0% | 0.0% | 0.0% | 0.0% | 0.2% |
| q6 | 1.6% | 0.5% | 0.4% | 0.3% | 0.1% | 0.1% | 0.1% | 0.0% | 0.0% | 0.0% | 0.3% |
| q7 | 2.1% | 0.7% | 0.6% | 0.4% | 0.2% | 0.1% | 0.1% | 0.0% | 0.0% | 0.0% | 0.5% |
| q8 | 2.5% | 0.9% | 0.8% | 0.5% | 0.2% | 0.1% | 0.1% | 0.0% | 0.0% | 0.0% | 0.6% |
| q9 | 2.9% | 1.1% | 1.0% | 0.6% | 0.3% | 0.2% | 0.1% | 0.1% | 0.0% | 0.0% | 0.8% |
| q10 | 3.3% | 1.3% | 1.2% | 0.7% | 0.3% | 0.2% | 0.1% | 0.1% | 0.0% | 0.0% | 1.0% |
| q11 | 3.7% | 1.6% | 1.4% | 0.9% | 0.4% | 0.2% | 0.1% | 0.1% | 0.0% | 0.0% | 1.2% |
| q12 | 4.1% | 1.8% | 1.6% | 1.0% | 0.5% | 0.3% | 0.2% | 0.1% | 0.0% | 0.0% | 1.5% |
| q13 | 4.4% | 2.0% | 1.8% | 1.2% | 0.6% | 0.3% | 0.2% | 0.1% | 0.0% | 0.0% | 1.7% |
| q14 | 4.7% | 2.2% | 2.0% | 1.3% | 0.6% | 0.4% | 0.2% | 0.1% | 0.0% | 0.0% | 2.0% |
| q15 | 4.9% | 2.4% | 2.2% | 1.4% | 0.7% | 0.4% | 0.2% | 0.2% | 0.0% | 0.0% | 2.3% |
| q16 | 5.2% | 2.6% | 2.4% | 1.6% | 0.8% | 0.5% | 0.2% | 0.2% | 0.0% | 0.0% | 2.6% |
| q17 | 5.4% | 2.7% | 2.6% | 1.7% | 0.9% | 0.5% | 0.3% | 0.2% | 0.0% | 0.0% | 3.0% |
| q18 | 5.6% | 2.9% | 2.7% | 1.8% | 0.9% | 0.5% | 0.3% | 0.2% | 0.1% | 0.0% | 3.3% |
| q19 | 5.7% | 3.0% | 2.9% | 1.9% | 1.0% | 0.6% | 0.3% | 0.2% | 0.1% | 0.0% | 3.7% |
| q20 | 5.9% | 3.2% | 3.1% | 2.1% | 1.1% | 0.6% | 0.3% | 0.2% | 0.1% | 0.0% | 4.0% |

Fig. 19K

MODEL OUTPUT: New Baa3 Issuer, WR-adjusted, Conditional on not Defaulting

| | Aaa | Aa1 | Aa2 | Aa3 | A1 | A2 | A3 | Baa1 | Baa2 | Baa3 | Ba1 | Ba2 |
|---|---|---|---|---|---|---|---|---|---|---|---|---|
| q1 | 0.0% | 0.0% | 0.0% | 0.0% | 0.0% | 0.0% | 0.0% | 0.1% | 0.4% | 98.9% | 0.3% | 0.2% |
| q2 | 0.0% | 0.0% | 0.0% | 0.0% | 0.0% | 0.0% | 0.1% | 0.2% | 0.9% | 96.9% | 1.0% | 0.5% |
| q3 | 0.0% | 0.0% | 0.0% | 0.0% | 0.1% | 0.1% | 0.1% | 0.4% | 1.6% | 94.5% | 1.6% | 0.9% |
| q4 | 0.0% | 0.0% | 0.0% | 0.0% | 0.1% | 0.1% | 0.2% | 0.6% | 2.5% | 91.2% | 2.5% | 1.4% |
| q5 | 0.0% | 0.0% | 0.0% | 0.0% | 0.1% | 0.1% | 0.2% | 0.9% | 3.4% | 87.5% | 3.5% | 2.1% |
| q6 | 0.0% | 0.0% | 0.0% | 0.0% | 0.1% | 0.2% | 0.3% | 1.0% | 4.0% | 83.9% | 4.6% | 2.7% |
| q7 | 0.0% | 0.0% | 0.0% | 0.0% | 0.1% | 0.2% | 0.3% | 1.3% | 4.7% | 80.3% | 5.5% | 3.3% |
| q8 | 0.0% | 0.0% | 0.0% | 0.1% | 0.2% | 0.3% | 0.4% | 1.5% | 5.4% | 76.8% | 6.3% | 3.8% |
| q9 | 0.1% | 0.0% | 0.0% | 0.1% | 0.2% | 0.3% | 0.5% | 1.8% | 6.2% | 73.3% | 7.0% | 4.3% |
| q10 | 0.1% | 0.0% | 0.1% | 0.1% | 0.2% | 0.4% | 0.6% | 2.0% | 7.1% | 69.7% | 7.7% | 4.7% |
| q11 | 0.1% | 0.0% | 0.1% | 0.1% | 0.3% | 0.4% | 0.7% | 2.3% | 8.0% | 66.0% | 8.3% | 5.2% |
| q12 | 0.1% | 0.0% | 0.1% | 0.1% | 0.3% | 0.5% | 0.8% | 2.6% | 8.9% | 62.4% | 9.0% | 5.6% |
| q13 | 0.1% | 0.1% | 0.1% | 0.1% | 0.3% | 0.5% | 0.9% | 2.9% | 9.7% | 59.2% | 9.5% | 5.9% |
| q14 | 0.1% | 0.1% | 0.1% | 0.1% | 0.4% | 0.6% | 1.0% | 3.2% | 10.4% | 56.3% | 9.9% | 6.2% |
| q15 | 0.1% | 0.1% | 0.1% | 0.1% | 0.4% | 0.6% | 1.1% | 3.5% | 11.0% | 53.6% | 10.2% | 6.4% |
| q16 | 0.1% | 0.1% | 0.1% | 0.2% | 0.4% | 0.7% | 1.2% | 3.7% | 11.5% | 51.2% | 10.4% | 6.6% |
| q17 | 0.1% | 0.1% | 0.1% | 0.2% | 0.4% | 0.8% | 1.3% | 3.9% | 11.9% | 49.0% | 10.7% | 6.8% |
| q18 | 0.1% | 0.1% | 0.1% | 0.2% | 0.5% | 0.8% | 1.4% | 4.1% | 12.3% | 47.0% | 10.9% | 6.9% |
| q19 | 0.1% | 0.1% | 0.1% | 0.2% | 0.5% | 0.9% | 1.5% | 4.3% | 12.6% | 45.1% | 11.1% | 7.1% |
| q20 | 0.1% | 0.1% | 0.1% | 0.2% | 0.5% | 0.9% | 1.6% | 4.5% | 12.8% | 43.4% | 11.4% | 7.2% |

Fig. 19L

MODEL OUTPUT: New Baa3 Issuer, WR-adjusted, Conditional on not Defaulting

| | Ba3 | B1 | B2 | B3 | Caa1 | Caa2 | Caa3 | Ca | C |
|---|---|---|---|---|---|---|---|---|---|
| q1 | 0.1% | 0.0% | 0.0% | 0.0% | 0.0% | 0.0% | 0.0% | 0.0% | 0.0% |
| q2 | 0.3% | 0.1% | 0.0% | 0.0% | 0.0% | 0.0% | 0.0% | 0.0% | 0.0% |
| q3 | 0.5% | 0.1% | 0.1% | 0.1% | 0.0% | 0.0% | 0.0% | 0.0% | 0.0% |
| q4 | 0.8% | 0.2% | 0.2% | 0.1% | 0.0% | 0.0% | 0.0% | 0.0% | 0.0% |
| q5 | 1.2% | 0.4% | 0.3% | 0.2% | 0.1% | 0.0% | 0.0% | 0.0% | 0.0% |
| q6 | 1.6% | 0.5% | 0.4% | 0.3% | 0.1% | 0.1% | 0.0% | 0.0% | 0.0% |
| q7 | 2.1% | 0.7% | 0.6% | 0.4% | 0.2% | 0.1% | 0.1% | 0.0% | 0.0% |
| q8 | 2.5% | 0.9% | 0.8% | 0.5% | 0.2% | 0.1% | 0.1% | 0.1% | 0.0% |
| q9 | 2.9% | 1.1% | 1.0% | 0.6% | 0.3% | 0.2% | 0.1% | 0.1% | 0.0% |
| q10 | 3.3% | 1.4% | 1.2% | 0.7% | 0.3% | 0.2% | 0.1% | 0.1% | 0.0% |
| q11 | 3.7% | 1.6% | 1.4% | 0.9% | 0.4% | 0.2% | 0.1% | 0.1% | 0.0% |
| q12 | 4.1% | 1.8% | 1.6% | 1.0% | 0.5% | 0.3% | 0.2% | 0.1% | 0.0% |
| q13 | 4.5% | 2.0% | 1.9% | 1.2% | 0.6% | 0.3% | 0.2% | 0.1% | 0.0% |
| q14 | 4.8% | 2.2% | 2.1% | 1.3% | 0.6% | 0.4% | 0.2% | 0.2% | 0.0% |
| q15 | 5.1% | 2.4% | 2.3% | 1.5% | 0.7% | 0.4% | 0.2% | 0.2% | 0.0% |
| q16 | 5.3% | 2.6% | 2.5% | 1.6% | 0.8% | 0.5% | 0.3% | 0.2% | 0.0% |
| q17 | 5.5% | 2.8% | 2.7% | 1.8% | 0.9% | 0.5% | 0.3% | 0.2% | 0.0% |
| q18 | 5.7% | 3.0% | 2.8% | 1.9% | 1.0% | 0.6% | 0.3% | 0.2% | 0.1% |
| q19 | 5.9% | 3.2% | 3.0% | 2.0% | 1.0% | 0.6% | 0.3% | 0.2% | 0.1% |
| q20 | 6.1% | 3.3% | 3.2% | 2.1% | 1.1% | 0.7% | 0.3% | 0.3% | 0.1% |

Fig. 19M

MODEL OUTPUT: Baa3, Downgraded, on Watch for a Downgrade, WR-adjusted

| | Aaa | Aa1 | Aa2 | Aa3 | A1 | A2 | A3 | Baa1 | Baa2 | Baa3 | Ba1 | Ba2 |
|---|---|---|---|---|---|---|---|---|---|---|---|---|
| q1 | 0.0% | 0.0% | 0.0% | 0.0% | 0.0% | 0.0% | 0.0% | 0.0% | 0.0% | 34.3% | 34.4% | 18.2% |
| q2 | 0.0% | 0.0% | 0.0% | 0.0% | 0.0% | 0.0% | 0.0% | 0.0% | 0.1% | 21.7% | 35.6% | 20.5% |
| q3 | 0.0% | 0.0% | 0.0% | 0.0% | 0.0% | 0.0% | 0.0% | 0.1% | 0.2% | 17.2% | 33.7% | 20.3% |
| q4 | 0.0% | 0.0% | 0.0% | 0.0% | 0.0% | 0.0% | 0.1% | 0.1% | 0.4% | 15.2% | 31.0% | 19.5% |
| q5 | 0.0% | 0.0% | 0.0% | 0.0% | 0.0% | 0.0% | 0.1% | 0.2% | 0.7% | 14.6% | 27.9% | 18.3% |
| q6 | 0.0% | 0.0% | 0.0% | 0.0% | 0.1% | 0.0% | 0.1% | 0.3% | 0.9% | 14.0% | 26.1% | 17.2% |
| q7 | 0.0% | 0.0% | 0.0% | 0.0% | 0.1% | 0.1% | 0.1% | 0.4% | 1.2% | 13.7% | 24.2% | 16.2% |
| q8 | 0.0% | 0.0% | 0.0% | 0.0% | 0.1% | 0.1% | 0.1% | 0.4% | 1.5% | 13.3% | 22.9% | 15.3% |
| q9 | 0.0% | 0.0% | 0.0% | 0.0% | 0.1% | 0.1% | 0.2% | 0.5% | 1.8% | 13.0% | 21.6% | 14.5% |
| q10 | 0.0% | 0.0% | 0.0% | 0.0% | 0.1% | 0.2% | 0.2% | 0.6% | 2.1% | 12.7% | 20.6% | 13.8% |
| q11 | 0.0% | 0.0% | 0.0% | 0.1% | 0.2% | 0.2% | 0.2% | 0.8% | 2.4% | 12.5% | 19.6% | 13.1% |
| q12 | 0.0% | 0.0% | 0.1% | 0.1% | 0.2% | 0.2% | 0.3% | 0.9% | 2.7% | 12.2% | 18.8% | 12.6% |
| q13 | 0.0% | 0.0% | 0.1% | 0.1% | 0.2% | 0.2% | 0.3% | 1.0% | 2.9% | 12.1% | 17.9% | 12.0% |
| q14 | 0.0% | 0.0% | 0.1% | 0.1% | 0.2% | 0.3% | 0.4% | 1.1% | 3.2% | 12.0% | 17.1% | 11.5% |
| q15 | 0.0% | 0.0% | 0.1% | 0.1% | 0.3% | 0.3% | 0.4% | 1.2% | 3.4% | 11.9% | 16.4% | 11.1% |
| q16 | 0.0% | 0.0% | 0.1% | 0.1% | 0.3% | 0.3% | 0.4% | 1.2% | 3.6% | 11.8% | 15.8% | 10.7% |
| q17 | 0.0% | 0.0% | 0.1% | 0.1% | 0.3% | 0.4% | 0.5% | 1.3% | 3.8% | 11.7% | 15.2% | 10.3% |
| q18 | 0.0% | 0.0% | 0.1% | 0.1% | 0.3% | 0.4% | 0.5% | 1.4% | 3.9% | 11.5% | 14.6% | 9.9% |
| q19 | 0.0% | 0.0% | 0.1% | 0.1% | 0.3% | 0.4% | 0.6% | 1.5% | 4.1% | 11.4% | 14.2% | 9.6% |
| q20 | 0.0% | 0.0% | 0.1% | 0.1% | 0.3% | 0.4% | 0.6% | 1.6% | 4.2% | 11.2% | 13.7% | 9.3% |

Fig. 19N

MODEL OUTPUT: Baa3, Downgraded, on Watch for a Downgrade, WR-adjusted

| | Ba3 | B1 | B2 | B3 | Caa1 | Caa2 | Caa3 | Ca | C | WR | DEF |
|---|---|---|---|---|---|---|---|---|---|---|---|
| q1 | 7.9% | 1.7% | 0.0% | 1.0% | 0.3% | 0.7% | 0.3% | 0.0% | 0.0% | 0.0% | 1.0% |
| q2 | 11.5% | 3.5% | 1.7% | 1.6% | 0.6% | 0.7% | 0.4% | 0.1% | 0.0% | 0.0% | 1.9% |
| q3 | 13.2% | 4.8% | 3.1% | 2.3% | 1.0% | 0.8% | 0.4% | 0.2% | 0.1% | 0.0% | 2.7% |
| q4 | 14.2% | 5.8% | 4.4% | 2.9% | 1.3% | 0.9% | 0.5% | 0.3% | 0.1% | 0.0% | 3.5% |
| q5 | 14.6% | 6.7% | 5.4% | 3.5% | 1.6% | 1.0% | 0.5% | 0.3% | 0.1% | 0.0% | 4.4% |
| q6 | 14.5% | 7.2% | 6.2% | 4.1% | 1.9% | 1.2% | 0.6% | 0.4% | 0.1% | 0.0% | 5.3% |
| q7 | 14.4% | 7.5% | 6.8% | 4.5% | 2.1% | 1.3% | 0.6% | 0.4% | 0.1% | 0.0% | 6.2% |
| q8 | 14.0% | 7.8% | 7.2% | 4.9% | 2.4% | 1.4% | 0.7% | 0.5% | 0.1% | 0.0% | 7.1% |
| q9 | 13.8% | 7.9% | 7.6% | 5.2% | 2.6% | 1.6% | 0.8% | 0.6% | 0.1% | 0.0% | 8.1% |
| q10 | 13.4% | 8.0% | 7.8% | 5.4% | 2.8% | 1.7% | 0.8% | 0.6% | 0.2% | 0.0% | 9.0% |
| q11 | 13.0% | 8.1% | 7.9% | 5.6% | 2.9% | 1.8% | 0.8% | 0.6% | 0.2% | 0.0% | 10.0% |
| q12 | 12.7% | 8.1% | 8.0% | 5.7% | 3.0% | 1.9% | 0.9% | 0.7% | 0.2% | 0.0% | 10.9% |
| q13 | 12.4% | 8.1% | 8.1% | 5.8% | 3.1% | 2.0% | 0.9% | 0.7% | 0.2% | 0.0% | 11.8% |
| q14 | 12.1% | 8.1% | 8.2% | 5.9% | 3.2% | 2.0% | 1.0% | 0.7% | 0.2% | 0.0% | 12.8% |
| q15 | 11.8% | 8.1% | 8.2% | 6.0% | 3.3% | 2.1% | 1.0% | 0.7% | 0.2% | 0.0% | 13.6% |
| q16 | 11.5% | 8.0% | 8.2% | 6.0% | 3.3% | 2.1% | 1.0% | 0.8% | 0.2% | 0.0% | 14.5% |
| q17 | 11.2% | 8.0% | 8.2% | 6.1% | 3.4% | 2.1% | 1.0% | 0.8% | 0.2% | 0.0% | 15.4% |
| q18 | 11.0% | 8.0% | 8.1% | 6.1% | 3.4% | 2.2% | 1.1% | 0.8% | 0.2% | 0.0% | 16.3% |
| q19 | 10.8% | 7.9% | 8.1% | 6.1% | 3.4% | 2.2% | 1.1% | 0.8% | 0.2% | 0.0% | 17.1% |
| q20 | 10.5% | 7.9% | 8.0% | 6.1% | 3.5% | 2.2% | 1.1% | 0.8% | 0.2% | 0.0% | 17.9% |

Fig. 19O

MODEL OUTPUT: Conditional on not Defaulting

| | Aaa | Aa1 | Aa2 | Aa3 | A1 | A2 | A3 | Baa1 | Baa2 | Baa3 | Ba1 | Ba2 |
|---|---|---|---|---|---|---|---|---|---|---|---|---|
| q1 | 0.0% | 0.0% | 0.0% | 0.0% | 0.0% | 0.0% | 0.0% | 0.0% | 0.0% | 34.6% | 34.7% | 18.4% |
| q2 | 0.0% | 0.0% | 0.0% | 0.0% | 0.0% | 0.0% | 0.0% | 0.0% | 0.1% | 22.2% | 36.3% | 20.9% |
| q3 | 0.0% | 0.0% | 0.0% | 0.0% | 0.0% | 0.0% | 0.0% | 0.1% | 0.2% | 17.7% | 34.6% | 20.9% |
| q4 | 0.0% | 0.0% | 0.0% | 0.0% | 0.0% | 0.0% | 0.1% | 0.1% | 0.4% | 15.7% | 32.1% | 20.2% |
| q5 | 0.0% | 0.0% | 0.0% | 0.0% | 0.1% | 0.1% | 0.1% | 0.2% | 0.7% | 15.2% | 29.2% | 19.1% |
| q6 | 0.0% | 0.0% | 0.0% | 0.0% | 0.1% | 0.1% | 0.1% | 0.3% | 0.9% | 14.8% | 27.5% | 18.1% |
| q7 | 0.0% | 0.0% | 0.0% | 0.0% | 0.1% | 0.1% | 0.1% | 0.4% | 1.3% | 14.6% | 25.8% | 17.3% |
| q8 | 0.0% | 0.0% | 0.0% | 0.0% | 0.1% | 0.1% | 0.1% | 0.5% | 1.6% | 14.3% | 24.7% | 16.5% |
| q9 | 0.0% | 0.0% | 0.0% | 0.0% | 0.1% | 0.1% | 0.2% | 0.6% | 1.9% | 14.1% | 23.5% | 15.8% |
| q10 | 0.0% | 0.0% | 0.0% | 0.1% | 0.2% | 0.2% | 0.2% | 0.7% | 2.3% | 13.9% | 22.6% | 15.2% |
| q11 | 0.0% | 0.0% | 0.1% | 0.1% | 0.2% | 0.2% | 0.3% | 0.8% | 2.6% | 13.8% | 21.8% | 14.6% |
| q12 | 0.0% | 0.0% | 0.1% | 0.1% | 0.2% | 0.2% | 0.3% | 1.0% | 3.0% | 13.7% | 21.1% | 14.1% |
| q13 | 0.0% | 0.0% | 0.1% | 0.1% | 0.2% | 0.3% | 0.4% | 1.1% | 3.3% | 13.7% | 20.3% | 13.6% |
| q14 | 0.0% | 0.0% | 0.1% | 0.1% | 0.3% | 0.3% | 0.4% | 1.2% | 3.6% | 13.8% | 19.6% | 13.2% |
| q15 | 0.0% | 0.0% | 0.1% | 0.1% | 0.3% | 0.4% | 0.5% | 1.3% | 3.9% | 13.8% | 19.0% | 12.8% |
| q16 | 0.0% | 0.0% | 0.1% | 0.1% | 0.3% | 0.4% | 0.5% | 1.5% | 4.2% | 13.8% | 18.4% | 12.5% |
| q17 | 0.0% | 0.0% | 0.1% | 0.1% | 0.3% | 0.4% | 0.6% | 1.6% | 4.4% | 13.8% | 17.9% | 12.1% |
| q18 | 0.0% | 0.0% | 0.1% | 0.1% | 0.4% | 0.5% | 0.6% | 1.7% | 4.7% | 13.8% | 17.5% | 11.9% |
| q19 | 0.0% | 0.0% | 0.1% | 0.1% | 0.4% | 0.5% | 0.7% | 1.8% | 4.9% | 13.7% | 17.1% | 11.6% |
| q20 | 0.0% | 0.0% | 0.1% | 0.2% | 0.4% | 0.5% | 0.7% | 1.9% | 5.1% | 13.7% | 16.7% | 11.4% |

Fig. 19P

MODEL OUTPUT: Conditional on not Defaulting

| | Ba3 | B1 | B2 | B3 | Caa1 | Caa2 | Caa3 | Ca | C |
|---|---|---|---|---|---|---|---|---|---|
| q1 | 8.0% | 1.7% | 0.0% | 1.0% | 0.3% | 0.7% | 0.3% | 0.0% | 0.0% |
| q2 | 11.7% | 3.5% | 1.7% | 1.7% | 0.6% | 0.7% | 0.4% | 0.1% | 0.0% |
| q3 | 13.6% | 4.9% | 3.2% | 2.3% | 1.0% | 0.8% | 0.4% | 0.2% | 0.1% |
| q4 | 14.7% | 6.0% | 4.5% | 3.0% | 1.3% | 0.9% | 0.5% | 0.3% | 0.1% |
| q5 | 15.3% | 7.0% | 5.7% | 3.7% | 1.7% | 1.0% | 0.5% | 0.3% | 0.1% |
| q6 | 15.3% | 7.6% | 6.5% | 4.3% | 2.0% | 1.2% | 0.6% | 0.4% | 0.1% |
| q7 | 15.3% | 8.0% | 7.2% | 4.8% | 2.3% | 1.4% | 0.7% | 0.5% | 0.1% |
| q8 | 15.1% | 8.4% | 7.8% | 5.3% | 2.6% | 1.6% | 0.7% | 0.5% | 0.1% |
| q9 | 15.0% | 8.6% | 8.2% | 5.6% | 2.8% | 1.7% | 0.8% | 0.6% | 0.2% |
| q10 | 14.7% | 8.8% | 8.6% | 6.0% | 3.0% | 1.9% | 0.9% | 0.7% | 0.2% |
| q11 | 14.5% | 9.0% | 8.8% | 6.2% | 3.2% | 2.0% | 0.9% | 0.7% | 0.2% |
| q12 | 14.3% | 9.1% | 9.0% | 6.4% | 3.4% | 2.1% | 1.0% | 0.7% | 0.2% |
| q13 | 14.0% | 9.2% | 9.2% | 6.6% | 3.5% | 2.2% | 1.0% | 0.8% | 0.2% |
| q14 | 13.8% | 9.3% | 9.3% | 6.8% | 3.7% | 2.3% | 1.1% | 0.8% | 0.2% |
| q15 | 13.7% | 9.3% | 9.5% | 6.9% | 3.8% | 2.4% | 1.1% | 0.9% | 0.2% |
| q16 | 13.5% | 9.4% | 9.6% | 7.1% | 3.9% | 2.5% | 1.2% | 0.9% | 0.3% |
| q17 | 13.3% | 9.5% | 9.6% | 7.2% | 4.0% | 2.5% | 1.2% | 0.9% | 0.3% |
| q18 | 13.1% | 9.5% | 9.7% | 7.3% | 4.1% | 2.6% | 1.3% | 0.9% | 0.3% |
| q19 | 13.0% | 9.5% | 9.8% | 7.3% | 4.2% | 2.7% | 1.3% | 1.0% | 0.3% |
| q20 | 12.9% | 9.6% | 9.8% | 7.4% | 4.2% | 2.7% | 1.3% | 1.0% | 0.3% |

Fig. 19Q

METHOD AND SYSTEM FOR PREDICTING CREDIT RATINGS TRANSITIONS

BACKGROUND OF THE INVENTION

1. Field of the Invention

The present invention relates to systems and methods for predicting credit ratings transitions conditional on macroeconomic factors and rating facts. In particular, the systems and methods may be used for predicting credit rating transition probabilities, including default probabilities, over multiple horizons at the issuer or portfolio level.

2. Discussion of the Related Art

The measurement of default risk has been one of the major advances in finance in the last decade. Managers of a portfolio of obligations subject to default risk are interested in the average or expected loss associated with the portfolio, and the range of possible losses surrounding that expectation, which constitutes the true credit risk of the portfolio.

Default studies of issuers of corporate bonds have yielded three principal results. The first is an estimate of the default rate associated with a given rating class. The second is an estimate of the variance of that default rate over time. The third are estimates of the probabilities not only of default, but also of changing to any other possible rating from a given initial rating. These estimates of "transition" probabilities are summarized for all initial rating classes in a rectangular table called the transition matrix. Examples are shown in FIGS. 1A and 1B. Bond default rate data are used to assign loss rates to classes of borrowers and to determine the loss risk associated with a single borrower, sometimes by reference to the default rate alone and sometimes by reference to the transition probabilities.

Risk management systems used by market participants take a transition matrix, such as the examples shown in FIGS. 1A and 1B, as an input to model credit risk. In addition to studying default risk, portfolio managers are interested in understanding how changes in economic conditions are going to affect the expected loss of their portfolios. These risk management systems have had difficulty incorporating macroeconomic assumptions or producing a transition matrix conditional on the economy.

Historical approaches to predicting future credit rating transitions have had several limitations. In general, these approaches are limited as a predictor of future rating transitions because actual historical transitions are correlated to economic conditions (pro-cyclical) and generally influenced by, not only the current rating category, but also the path of historical rating changes (non-Markovian). As evidence of actual transitions being pro-cyclical, FIG. 2A compares the one year default rates with the one year change in the U.S. unemployment rate. In this example, the default rate for a given pool of issuers over a given horizon is the share of those issuers which are observed to enter default at some point within that horizon. No adjustment for withdrawal is made. As evidence of actual transitions being generally non-Markovian, FIG. 2B compares Kaplan-Meier estimates of the cumulative probability of downgrading for newly issued single-B issuers, those just downgraded, and those just upgraded The probability of downgrading further is substantially higher for those credits which were just downgraded themselves, and substantially lower for upgraded issuers.

More specifically, a first limitation of historical approaches has been that the historical average default rate can deviate significantly from the actual default rate even when all loans within a grade have the same default rate. Similarly, the historical transition probabilities can deviate significantly from the actual transition probabilities. One reason for this is because the historical approaches fail to take into account macroeconomic factors. Credit ratings are only intended as relative assessments of expected loss. They are not intended to capture a particular default probability over a particular horizon. As shown in FIG. 3, default rates rise and fall over time within a rating category and the default cycle is strongly correlated with economic cycle. FIG. 3 shows a correlation between U.S. recessions and the cycle of the default rate. Credit ratings have proven ineffective at addressing a particular default probability of an issuer, and the changes that occur in the default probability as the economic cycle changes.

Another limitation is that there are substantial differences of default rate within a bond rating grade, with some bonds in a higher grade having greater default rates than some bonds in a lower grade, i.e., there is overlap in default probability ranges. The overlap can be substantial. For instance, there are some Baa rated bonds with Aa default rates and some with B default rates. The overlap in default probability ranges appears to be caused by a lack of timeliness in upgrade and downgrade decisions. Further, the lack of timeliness in rating changes causes a significant bias in transition probabilities. The probability of remaining at the same quality is overstated by about double for most grades, whereas the probabilities for changing to other non-default grades are significantly understated.

In addition, a third limitation is that the range of default rates within a rating grade can cause the mean default rate to significantly exceed the median default rates within a grade. Specifically, the mean may be almost twice as large as the median, and as many as 75% of the borrowers within a rating grade may have default rates that are less than the mean. In short, historical default rates are statistics for the mean default rate, and thus may be biased upwards by as much as double from the typical default rate within the grade.

More sophisticated models of rating transition in general, and default in particular, have been advanced which address these limitations. Most share the drawback that they are horizon dependent, such that obtaining transition probabilities for different horizons requires different models. This is at least statistically inefficient, and at worst may yield contradictory forecasts. In addition, prior art models do not consider withdrawal and do not typically adjust default probabilities based on withdrawal of issuers. This is problematic, as unadjusted numbers as estimates of the "five year default rate" for an exposure which was going to last at least five years, underestimate the true risk by, in some cases, nearly half. Finally, none of the models described in the prior art are capable of producing baseline transition intensities and rating transitions other than default, conditioning on macroeconomic factors, and flexibly conditioning on additional factors.

There remains a need for systems and methods for predicting credit transitions that address one or more of the limitations of the prior art. There remains a need for a system and method of rating transitions conditional on the economy and other rating facts that may be applied at multiple horizons of time and includes a complete set of rating transitions. There is a need for a system and method for generating an accurate forecast of withdrawal for the purpose of forecasting a withdrawal adjusted default rate. There is also a need for a system and method for applying the credit transition model to pertinent rating facts and a future path of macroeconomic drivers, such as unemployment rates and high yield spreads, and outputting a display of issuer or portfolio level reports, including rating migration matrices, marginal default rates, cumulative default rates, first passage probabilities, default distributions, fallen angel rates, rising star rates, forecasted ratings, drill-through reports, and/or summary reports, or any one or combination of the foregoing.

SUMMARY OF THE INVENTION

Accordingly, the present invention reflects a system and method of predicting probabilities of credit rating transitions that substantially obviates one or more problems due to limitations and disadvantages of the related art. Various embodiments of the present invention provide a credit transition model for predicting probabilities of default, upgrade, and downgrade conditional on the future path of the economy for portfolios of issuers over variable time horizons. The model may be a multiple-destination proportional hazards model and may forecast results, in quarterly increments, using a single, internally consistent model. In some embodiments, the credit transition model conditions on various rating facts, such as an issuer's current rating, outlook/watchlist status, how long it has maintained that rating, how long it has maintained any rating, and whether the issuer was upgraded or downgraded into its current rating, and the future path of macroeconomic factors, such as the unemployment rate, and the spread of high yield credits over Treasuries. By conditioning on various rating facts, the credit transition model is capable of differentiating between default probabilities of similarly rated companies, anticipating rating changes prior to actual rating actions by the rating agency, and accounting for the overlap in default probability ranges across rating categories. Further, in some embodiments, the credit transition model may provide the entire distribution of default probabilities within a rating category, allowing the mean, median, skewness, and other related factors to be viewed.

Various embodiments of the present invention include a system and method for allowing users to create portfolios of issuers and macroeconomic scenarios. The portfolios and scenarios may be used to determine pertinent rating facts and to access or receive information about the future paths of the macroeconomic factors. The system and method of the present invention may generate multiple outputs from the credit transition model using the rating facts and future path of the macroeconomic factors. The present invention may generate a complete set of rating transitions, including predicting the probability of default, upgrade, and downgrade while taking into account withdrawal of issuers to more accurately reflect default rates. Finally, various embodiments of the present invention provide users with multiple choices for outputs from the credit transition model and can easily and quickly generate results from the model. The outputs may be generated at the issuer or portfolio level and include rating migration matrices, marginal default rates, cumulative default rates, first passage probabilities, default distributions, fallen angel rates, rising star rates, forecasted ratings, drill-through reports, and/or summary reports, or any one or combination of the foregoing.

Additional features and advantages of the invention will be set forth in the description which follows, and in part will be apparent from the description (including the drawings), or may be learned by practice of the invention as described It is to be understood that both the foregoing general description and the following detailed description are exemplary and explanatory.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

Figures 1A, 1B:
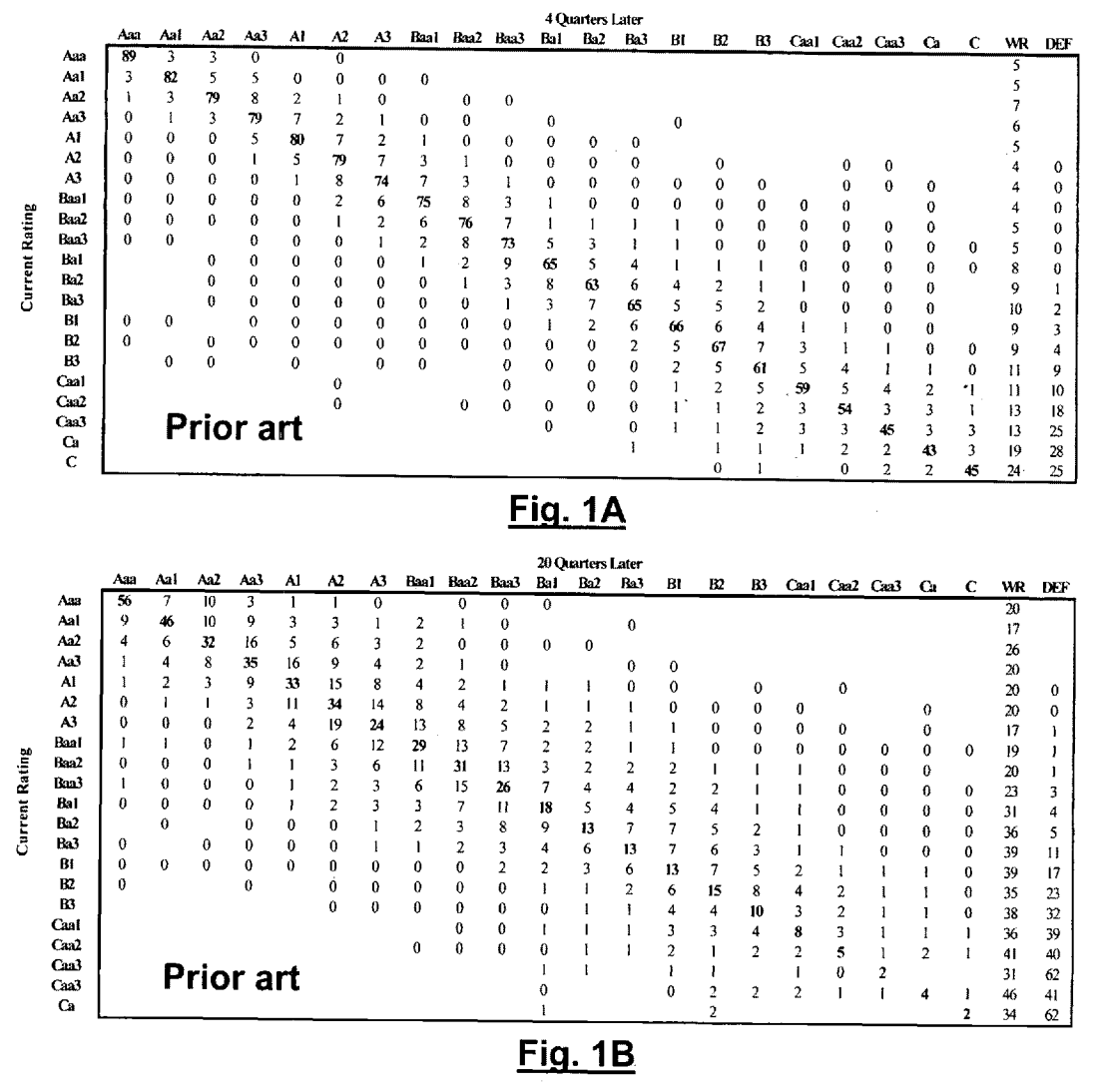

FIG. 1A-1B are transition matrices known in the prior art;

FIG. 3 is a graph showing default rates;

FIG. 4 is used in the CreditMetrics™ approach;

FIGS. 6A-6C are matrices displaying historical transition frequencies;

FIGS. 7A-7B are examples of matrices showing transition probabilities;

FIGS. 13A-13G are examples of various interfaces for using portfolios;

FIGS. 15A-15D are examples of various interfaces for using scenarios;

DETAILED DESCRIPTION OF THE INVENTION

Figure 2A:
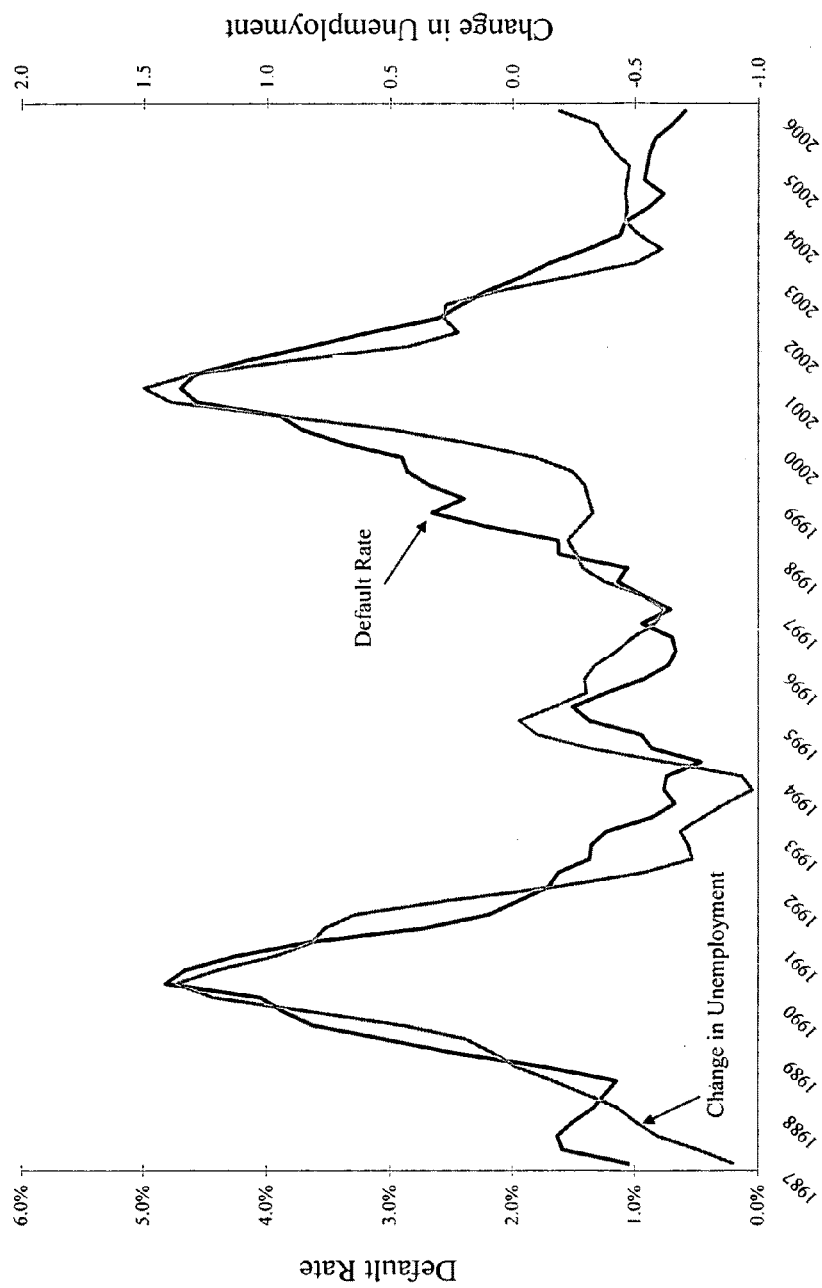
FIG. 2A is a graph showing the pro-cyclical nature of default rates.
Figure 2B:
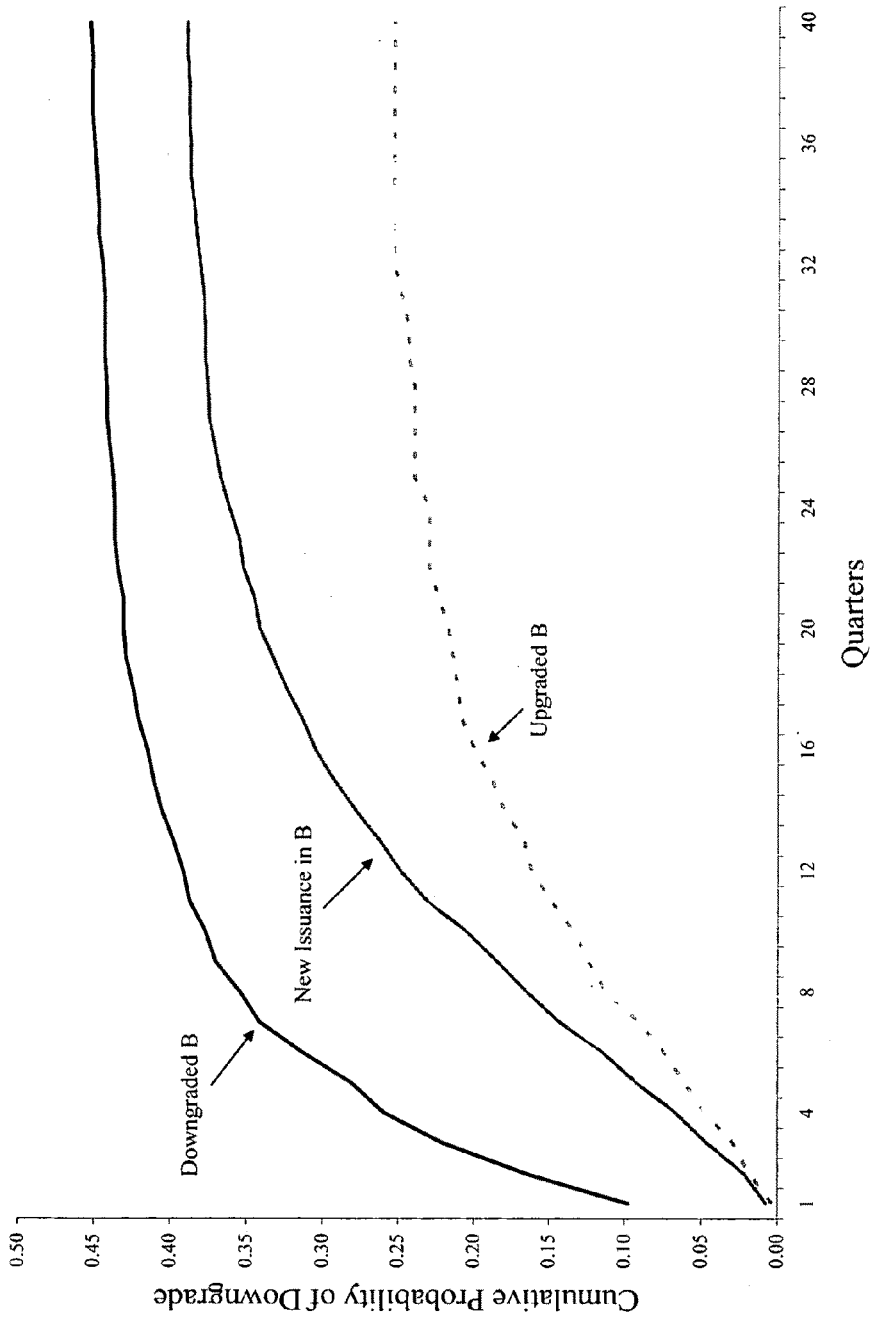
FIG. 2B is a graph showing the non-Markovian nature of actual transitions.

Reference will now be made in detail to the present exemplary embodiments of the invention illustrated in the accompanying drawings. Whenever possible, the same reference numbers will be used throughout the drawings to refer to the same or like parts.

The present invention is particularly useful for predicting probabilities of default, upgrade, and downgrade conditional on the future path of the economy for portfolios of issuers over variable time horizons using a credit transition model ("CTM"). The CTM may condition on various rating facts, such as an issuer's current rating, how long it has maintained that rating, how long it has maintained any rating, and whether the issuer was upgraded or downgraded into its current rating, and the future path of macroeconomic factors, such as the unemployment rate and the spread of high yield credits over Treasuries. The CTM generates outputs that may include any or one or more of rating migration matrices, marginal default rates, cumulative default rates, first passage probabilities, default distributions, fallen angel rates, rising star rates, forecasted ratings, drill-through reports, and summary reports at the issuer or portfolio level.

The outputs generated by the CTM may be used in a variety of applications including as inputs in credit risk models or other economic forecasting models. For example, the CTM is useful in various applications including measuring default risk, analyzing credit rating changes conditioned on macroeconomic factors, analyzing the credit risk of a collateralized debt obligation ("CDO") transaction, determining first passage probabilities, valuing financial instruments, and performing correlation calculations.

analyzing the credit risk of a collateralized debt obligation ("CDO") transaction, determining first passage probabilities, valuing financial instruments, and performing correlation calculations.

Measuring Default Risk

Bond default rate data are used to assign loss rates to classes of borrowers, and are used to determine the loss risk associated with a single borrower, sometimes by reference to the default rate alone and sometimes by reference to the transition probabilities. These uses are illustrated by the following examples. While the examples are described in connection with Moody's rating schemes, it should be apparent that the invention may be used with other rating schemes.

Example 1

Expected Loss of a Loan

Consider a portfolio consisting of loans, with a certain quantity of exposure in each of a given set of numbered rating classes (e.g., ranging from 1 to 6). The manager of the portfolio has determined that loans rated 3 are equivalent to bonds rated BBB. On this basis, the manager associates with 3-rated loans the historical annual default rate of BBB-rated bonds (e.g., 0.18%). The manager also determines that the likely loss in the event of default is 35%. Thus the expected loss of each loan, per dollar of exposure, is calculated as the default probability times the loss given default, or 0.0018*0.35, or 0.063%. Multiplying by the total exposure for loans in that rating class, the dollar expected loss for the rating class is determined. By repeating this process for each rating class and summing, the dollar expected loss on the entire portfolio is calculated. This dollar expected loss may be used to determine loss reserves for accounting purposes, but may also be used to set pricing guidelines or to calculate profitability of portfolio holdings.

Example 2

Simplified Approach to Determining Default Risk

The simplest approach to determining the default risk of a single loan is to assume that the only thing that can happen to the value of the loan (e.g., within one year) is that it defaults. In this case, there are two possible outcomes, default and no-default. In the first case the loss is 35%, and in the second case the loss is zero. This is a simple random process and the standard deviation of the loss, called the "unexpected loss (UL)", is equal to the loss given default (LGD) times the square root of the product of the default rate (e) times one minus the default rate:

$$UL = LGD\sqrt{e(1-e)}$$

For the case of a 3-rated bond, this would be $0.35*\sqrt{(0.0018*0.998)}$, or approximately 1.4%. This number defines the range of variation of loss outcome around the expectation for a single loan. This number may then be used in conjunction with default rate correlations to calculate the range of variation of loss outcome for the entire portfolio.

Example 3

CreditMetrics™ Approach

This method for determining the default risk begins with the same general approach, but it allows for the possibility of changes in value of the loan due to credit quality changes, even if the loan does not default. In this view, the non-default event is broken into a number of different events, corresponding to credit quality getting better, remaining the same, or getting worse. With each event there is an associated loan value. By multiplying the probability of each event by the resulting loss (or gain) associated with the event, one can determine the expected loss. By multiplying the probability of the event times the square of the deviation of the loss in the state from the expected loss and summing over all states, one can calculate the variance of loss. Taking the square root then gives the unexpected loss. For this calculation, it is natural to use rating transition probabilities, such as those generated by the CTM. A sample calculation reproduced from the CreditMetrics™—Technical Document is shown in FIG. 4.

With reference to FIG. 4, Column 1 of the table gives the probability of ending up in the particular rating grade at the measurement horizon, in this case, one year; the highest probability is associated with staying at the current rating grade, BBB. Column 2 gives the value of the asset in one year, conditional on the rating grade in one year. Multiplying the probability of each rating grade (transition probability in Column 1) by the respective instrument value (Column 2), yields the probability weighted value (Column 3). Summing the data in Column 3, one obtains the expected value (the mean) of the asset at the horizon, in this case, $107.09. In other words, the expected value is the probability weighted average of the possible asset values at the horizon. Subtracting the expected value ($107.09) from the grade conditional value (Column 2) yields the deviation from the expected value, i.e., the data in Column 4. Squaring each deviation (Column 4) and multiplying it by the probability of ending up in the particular rating grade (Column 1) yields the data in Column 5. Finally, summing the results in Column 5 gives the variance of the values listed in Column 2. In other words, the variance is the probability weighted average of the squared deviations from the mean. The unexpected loss is the square root of the variance, or the standard deviation, which is a measure of the range of possible outcomes for the asset at the risk measurement horizon. As in the case of the calculation above in Example 2, the individual unexpected loss values—based now on value changes, not just default—may be combined with correlations to yield an estimate of the overall portfolio unexpected loss.

CDO Credit Risk Estimates

When analyzing the credit risk of a CDO transaction, an objective is to assess the likelihood that obligors in the asset pool will suffer credit events and the resulting credit loss to investors. In other words, the credit exposure borne by investors is described as the expected loss on the rated notes, due to default risk on the underlying assets—the probability of a loss multiplied by the severity of that loss for a given class of notes. This applies to both cash and synthetic transactions.

The probability distribution of credit events and the corresponding losses to investors may be derived in order to assess the overall expected loss on each class of notes. The assessment is complicated by the fact that, in any CDO transaction, investors are exposed to the credit risk of multiple reference entities. Potential linkages to the credit risk of the originating bank or to a third party, as well as the impact on the expected loss on each note of the selected settlement rule that applies if a credit event occurs may also be considered when analyzing risk.

First Passage Probabilities

When a portfolio is subject to strict credit rating investment criteria, a risk manager needs to determine the probability of a rating crossing a given threshold and when that transition might occur. For example, a credit might currently be rated Baa2, and the risk manager may need the probability that within two years it will have fallen below Baa3. A typical transition matrix, such as those shown in FIGS. 1A-1B, does not provide such first-passage probabilities. A two year transition matrix may show the probability that, two years from now, the credit will be spec-grade. However, there is some probability that the rating would fall below Baa3 but then reverse, and while that probability might be "small," it may be important to a risk manager—especially if several credits have correlated transition paths. Published transition matrices may include a withdrawn state, but provide no information as to what share of withdrawn issuers had first transitioned below Baa3, for example. To use a transition matrix, such as those shown in FIGS. 1A-1B, to conclude that a Baa2 issuer has a 12% probability of becoming spec-grade over the next five years grossly underestimates the actual probability of approximately 18%.

Even in cases where the cumulative downgrade probability and the cumulative first-passage probability are essentially the same (since reversals are rare, especially over short horizons), a risk manager may need to know the transition probability at each particular date. While there might be a 10% chance of the credit becoming spec-grade over two years, what may be of interest is the probability of becoming spec-grade in the first quarter from now versus the second versus the third and so on. In short, marginal transition probabilities might be required. These can only be crudely approximated by chaining together or differencing various transition matrices, but the CTM generates them easily.

Using the CTM, a portfolio manager can forecast the expected default rate over the next three years for several different portfolios, or the probability of some issuers becoming fallen angels or rising stars over the next eighteen months, all conditional on different economic scenarios. Fallen angels are issuers whose ratings move from Baa3 or higher to Ba1 or lower. The fallen angel rate is the number of fallen angels divided by the number of investment-grade issuers at the beginning of the sample period. Rising stars are issuers whose ratings move from Ba1 or lower to Baa3 or higher. The rising star rate is the number of rising stars divided by the number of speculative-grade issuers at the beginning of the sample period. These forecasts are internally consistent because of the aggregation of different sets of credits over different horizons. Further, the CTM may be one model and not a series of disconnected models.

Valuation

Instruments with embedded options change in value based on the credit quality of the instrument. As a result, when valuing these instruments, it may be important to understand how the credit quality of that instrument changes over time with precision. The CTM may calculate forward transition matrices. Specifically, while many models can forecast results from time A to time B and from time A to time C, the CTM may forecast from time B to time C. In short, the CTM is suited toward generating precise estimates of credit quality at specific points in time. Similarly, the model is capable of producing the term structure of default, i.e., the probability of default at various points in time.

Correlation Calculations

The CTM may be estimated under an assumption of conditional independence, namely that all correlation is driven by a common dependence on ratings and macroeconomic drivers. In a concentrated portfolio, this assumption does not necessarily hold true. Nevertheless, the results of the CTM have a practical application in concentrated portfolios. Given a time series of actual and predicted default rates, the correlation coefficient which would maximize the likelihood of observing the data can be estimated. Because the CTM provides the predicted default rate, it provides the necessary identifying assumption for calculating correlation, a key component in the analysis of portfolio risk.

Estimation of the Credit Transition Model

In general, a baseline hazard is a change in a hazard rate as a function of elapsed time. For example, if a credit rating is assigned at time A, a user may be interested in knowing what the probability is that the rating will be downgraded one day, one week, one month, one quarter, one year, or five years from time A. It is likely the probability of downgrading in one day, one week, or one month is zero or close to zero. The probability of downgrading will likely increase at one year and five years. This example describes how the transition probability changes as a function of elapsed time (i.e., the transition intensity). In the CTM described herein, the baseline transition intensity may be scaled up or down based on various factors, such as the state of the economy (i.e., macroeconomic factors) and rating facts, such as the issuer's rating and whether the issuer was upgraded or downgraded into that rating. The method used to estimate the CTM is described below.

The CTM uses the following basic notational conventions. The density governing the probability of transitioning from a rating category r to an exiting state s after elapsed time u conditional on no prior exit from r is shown below. This density is a function of elapsed time u in the rating category r, observed (time-varying) covariates $x_t$, and an unobserved (time-invariant) mixing factor v:

$$h_s^r(u|x,v) = \Psi_s^r(u)\theta_s^r(x)v \qquad \text{(equation 1)}$$

where $\Psi_s^r(u)$ denotes the baseline transition intensity for rating category r to exit state s and $\theta_s^r(x)$ is a strictly positive function of the observed covariates for rating category r to exit state s. The transition intensities describe the probability of rating category r transitioning to state s after elapsed time u conditional on not having made any previous transition. Elapsed time u is distinguishable from calendar time t and may be described as the time spent in rating category r or the time since the last transition or initial rating assignment. These transition intensities are used to obtain the densities governing the probability of exiting from rating r to state s at time u:

$$f_s^r(u|x,v) = h_s^r(u|x,v) \cdot \overline{F}(u|x,v) \qquad \text{(equation 2)}$$

$$\overline{F}(u|x_t,v) = \exp\left\{-\sum_{s=1}^{S}\int_{t-u}^{u} h_s^r(\tau|x_{t+\tau},v)d\tau\right\}. \qquad \text{(equation 3)}$$

Finally, integration over the marginal distribution of v is performed to obtain the empirical density:

$$f_s^r(u|x) = \int f_s^r(u|x,v)dG_s^r(v) \qquad \text{(equation 4)}.$$

This is an application of a multiple-destination proportional hazards model and is based on the assumption of conditional independence across issuers. In some embodiments, time is measured discretely, thus equation 4 is used to obtain the probability of an exit to a particular state s occurring within a window of time (a, b]:

$$Pr(a < T \le b, S = s | r, x) = \int_a^b f_s^r(u|x) du. \quad \text{(equation 5)}$$

Owing to the parameterizations discussed below, this simplifies to:

$$\frac{h_s^r(b|x)}{\sum_{i=1}^{S} h_i^r(b|x)} \cdot \left(1 - \exp\left\{-\sum_{i=1}^{S} h_i^r(b|x)\right\}\right) \cdot F(a|x). \quad \text{(equation 6)}$$

A proportional hazards model is a sub-class of survival models in statistics. Survival modeling involves modeling the time to an event. Survival models consist of two parts: the underlying hazard function, which describes how a hazard (risk) changes over time, and the effect of parameters, which describe how the hazard relates to other factors. In the CTM, a credit rating is assigned to an issuer, and the rating may change because the issuer is upgraded, downgraded, defaults, or withdraws. In a multiple-destination proportional hazards model, it is assumed that factors which make downgrade more likely are related to the factors that make upgrade less likely. This example demonstrates that the different exiting events may not be independent. A multiple-destination proportional hazards model relaxes the assumption that the two events are independent. In some embodiments, the model may be "mixed" because of the use of a non-degenerate mixing distribution.

The CTM differs from other applications of the multiple-destination proportional hazards model in three main respects: more elaborate treatment of the baseline, the treatment of upgrades and downgrades, and the treatment of economic covariates. With respect to the treatment of the baseline, modelers using the multiple proportional hazards model generally do not give much thought to the shape of the baseline curve. Most statistical packages, such as SAS or Stata, only offer two baselines: constant or Weibull. The former assumes that the baseline is constant, the latter assumes that the baseline monotonically rises or falls. Analysis of the data show that the baseline both rises and falls and the CTM takes this into account by providing different baselines for different groups of ratings.

Specifically, the CTM may not estimate a free transition intensity from every rating category to every viable exit state, but instead imposes certain restrictions across categories that allow for a more elaborate treatment of the baseline transition. For example, three classes of ratings can be defined: the investment-grade IG process (Moody's Baa and above), the non-C speculative-grade SG process (Ba1; Ba2, Ba3, B1, B2, B3), and the C process (Caa1, Caa2, Caa3, Ca, and C). Individual rating categories within these larger processes may be distinguished only as scalar transformations of their underlying process.

For example, the transition intensity for an Aaa rating is given by:

$$h_s^{Aaa}(u|x,v) = \alpha_s^{Aaa} \cdot h_s^{IG}(u|x,v) = \alpha_s^{Aaa} \cdot \Psi_s^{IG}(u) \theta_s^{IG}(x) v_s^{IG} \quad \text{(equation 7)}.$$

By including the appropriate indicator variables within x, this is written as: $h_s^{Aaa}(u|x,v) = \Psi_s^{IG}(u) \theta_s^{Aaa}(x) v_s^{IG}$, (equation 8), with the understanding that $\theta_s^{Aaa} = \alpha_s^{Aaa} \theta_s^{IG}$. The scale effect is allowed to change over calendar time. In particular, a structural break is allowed in all means pre- and post-1997, corresponding to the introduction of additional C rating modifiers.

Another aspect of the CTM that is different from other applications of the multiple destination proportional hazards model is the treatment of upgrades and downgrades. For example, one could easily reference a "yes" or "no" value for upgrade or downgrade. A more elaborate approach would assume that the time elapsed since upgrade or downgrade impacts the results. In most applications of the latter approach, however, the upgrades and downgrades would need to impact the results proportionally over time. The data show that the effect on the results is very different at different quarters, rejecting the notion of proportional impact over time. As such, the CTM takes an even more sophisticated approach that allows upgrades and downgrades to impact the results differently depending on the amount of time that has elapsed since the rating change and giving disproportional weights to different amounts of time.

Specifically, while the parameters of the IG, SG and C processes are independent of each other, the parameters related to the age of an issuer may be constrained to be equal across processes, but are independent across exit states.

The following states may be used: upgrade, downgrade above C, downgrade to C, default and withdraw. Every rating process does not transition to every exiting state. In particular from IG, a process can upgrade, downgrade above C or withdraw. All exiting states are viable from SG. From C, downgrade above C is undefined, but all other exit states are viable.

These exiting states apply to individual rating categories, not just whole aggregate processes. In other words, a particular IG rating can "exit to downgrade" to a different IG rating—not just downgrade from one aggregate process to another. The use of aggregate processes imposes some structural discipline on estimates: up to scale, all IG ratings are identical, having the same baseline transition shapes and the same betas to the macroeconomic drivers. Movement is tracked within the broader processes as upgrades and downgrades. This implies certain rating category-specific restrictions beyond those described above. The Aaa category cannot exit to upgrade, even though the broader IG process may have a defined upgrade transition. Similarly, the B3 category cannot exit to downgrade, but only to downgrade to C.

In general, all of the information the CTM conditions on is forecasted into the future. In the case of the macroeconomic drivers (the U.S. unemployment rate and high yield spread), a separate forecasting tool exogenous to CTM is used. In various embodiments, the CTM itself forecasts the issuer-specific information (e.g., current rating, elapsed time in rating, whether upgraded or downgraded into that rating, and the elapsed time since the issuer was first rated).

The issuer's Watchlist or Outlook assignment may not be directly forecasted by the CTM. Instead, a model which forecasts future Watchlist-Outlook assignments could be used. In this case, the future Watchlist-Outlook assignments need to be reconciled with the future rating transitions. As a result, the CTM may use an approach which avoids generating forecasts of future assignments. This approach may be applied to any other issuer-specific conditioning information which is difficult to forecast, such as the issuer's current bond spreads, Credit Default Swap (CDS) spreads, or Expected Default Frequency (EDF), or any other relevant factor. The conditioning information described below are examples of information that can be used to predict transition probabilities.

Elapsed time u: The time spent in rating category r or the time since the last transition or initial rating assignment.

Rating Category: The specific rating category determines the scale of the underlying process.

Rating History: Rating history conditions on whether and when an issuer was upgraded or downgraded into its current rating. The present invention allows a flexible dynamic response for a time period (e.g., up to 12 quarters) following the upgrade or downgrade.

Age: Age is defined as how long the issuer has continuously maintained any rating (e.g., any Moody's rating). In those few cases where an issuer defaults or withdraws and later re-enters the dataset, its Age is reset to 0. Age enters as a quadratic function, and may be capped at, for example, 40 quarters.

Outlook or Watchlist Status: The outlook or watchlist status may be defined as whether the issuer has been given a positive or negative outlook or whether the issuer will be reviewed for upgrade or downgrade. An approach for forcasting the outlook or watchlist status is described. The CTM chains together 5 separate models of rating transitions which are formally identical to forecast outlook or watchlist status. The first model, M1, conditions on the usual information and on the issuer's current Watchlist-Outlook assignment. M1 is used to generate rating transition predictions over the first quarter. The second model, M2, conditions on the usual information and on the issuer's Watchlist-Outlook assignment of one quarter ago. M2 is used to generate model predictions from the first to the second quarter in the future. Similarly, models M3 and M4 condition on the usual information and the issuer's Watchlist-Outlook assignment of two and three quarters ago, respectively. Finally, model M0 does not condition on Watchlist-Outlook assignments at all.

These models may be used sequentially as follows. For example, at quarter zero (q0), the issuer's Watchlist-Outlook assignment is known. M1 is used to predict its distribution of rating states one quarter from now (q1) conditional on that information. The future rating states include new ratings as well as the default and withdrawal states. It also includes the possibility that the issuer's rating remains unchanged. Often this is the single most likely event.

While the model M1 predicts new ratings for the issuer in q1, it may not predict new Watchlist-Outlook assignments associated with those ratings. Considering all further rating transitions for those states, the model M0 is applied, which does not condition on such information. However, M1 may also predict that, with some probability, the issuer's rating does not change. In this case, while the Watchlist-Outlook assignment at q1 is not known, the assignment at q0 is known—in other words, from the point of view of q1, the assignment one quarter ago is known. From this single state on q1, the model M2 is applied, which conditions on the one-quarter-lagged Watchlist/Outlook assignment, which is the assignment on q0. For the "new" rating states on q1, all future transitions are predicted by model M0. But for the "stable" rating state on q1, the next set of transitions (from q1 to q2) will be predicted by the model M2. These predicted states on q2 will include new ratings, which will then be governed by M0, but, again, it will also include the possibility that the rating did not change. Transitions from that state will be governed by M3.

An example is shown below using only three rating states A, B and C. The default and withdrawal states are ignored. Consider an issuer which is rated B on q0 and has a negative outlook. M1 is applied to obtain the following:

| q0 Rating | | q1 Model | RatingProbability |
|---|---|---|---|
| B | M1 | A | 10% |
| | | B* | 80% |
| | | C | 10% |

For the rating states A and C, the Outlook-Watchlist assignment is not known. Further transitions from those states will be controlled by M0. For the case where the rating do not change, B*, the assignment one quarter ago is known. Further transitions will be controlled by M2.

| q1 Rating | | q2 Model | RatingProbability |
|---|---|---|---|
| A | M0 | A | 85% |
| | | B | 10% |
| | | C | 5% |
| B* | M2 | A | 10% |
| | | B* | 80% |
| | | C | 10% |
| C | M0 | A | 5% |
| | | B | 10% |
| | | C | 85% |

From rating states A and C, there is some chance the rating would transition in q2 to B. But this is not the "same" as the rating never having changed, B*. Future transitions from these new B states will also be controlled by M0. From B*, the model M3 is used, which conditions on the Watchlist-Outlook assignment from two quarters ago (q0).

| q2 Rating | | q3 Model | RatingProbability |
|---|---|---|---|
| A | M0 | A | 85% |
| | | B | 10% |
| | | C | 5% |
| B | M0 | A | 10% |
| | | B | 80% |
| | | C | 10% |
| B* | M3 | A | 10% |
| | | B* | 80% |
| | | C | 10% |
| C | M0 | A | 5% |
| | | B | 10% |
| | | C | 85% |

Again, the new states B are distinguished from the original state B*. The probability of being in B* on q3 is 0.8×0.8×0.8=51.2%. Further transitions are governed by the last model to condition on Watchlist/Outlook assignments, M4, which references the assignment three quarters in the past (q0).

| q3 Rating | | q4 Model | RatingProbability |
|---|---|---|---|
| A | M0 | A | 85% |
| | | B | 10% |
| | | C | 5% |
| B | M0 | A | 10% |
| | | B | 80% |
| | | C | 10% |
| | | A | 10% |

-continued

| q3 Rating | | q4 Model Rating | Probability |
|---|---|---|---|
| B* | M4 | B | 80% |
| | | C | 10% |
| | | A | 5% |
| C | M0 | B | 10% |
| | | C | 85% |

Beginning in q4, conditioning on the issuer's assignment that was obtained on q0 is no longer performed. All transitions are controlled by model M0. In effect, beginning one year from now, the issuer's current Watchlist-Outlook assignment may be ignored.

| q4 Rating | | q5 Model Rating | Probability |
|---|---|---|---|
| | | A | 85% |
| A | M0 | B | 10% |
| | | C | 5% |
| | | A | 10% |
| B | M0 | B | 80% |
| | | C | 10% |
| | | A | 5% |
| C | M0 | B | 10% |
| | | C | 85% |

Cumulative Change in Unemployment: An exemplary embodiment of the CTM conditions on the cumulative change in unemployment since the issuer entered its current rating. The cumulative change in unemployment will differ depending on the issuer because it is related to how long the issuer has maintained its respective rating. The assumption is that a period of increasing unemployment should increase the probability of default and downgrade even if the current economic state is relatively strong. Various embodiments of the CTM may use information related to the current quarterly change in unemployment, the level of trend in the unemployment rate, and the level of cycle in the unemployment rate. This information about unemployment rates is the same for all issuers.

High Yield Spread Over Treasuries: An exemplary embodiment of the CTM conditions on the spread of high yield credits over Treasuries.

Other embodiments of the CTM may condition on other macroeconomic conditioning factors. For example, any one or more of the gross domestic product, consumption, investment, export, import, employment, industrial productivity, and capacity utilization may be used. Each may be used, for example, as an alternative to the unemployment rate. As evidence that these additional macroeconomic factors are comparable to the unemployment rate, Table 1 shows the high correlation each has with the unemployment rate.

TABLE 1

| | Un-Smoothed | Smoothed |
|---|---|---|
| GDP | −0.48 | −0.7 |
| Cons | −0.29 | −0.56 |
| Inv | −0.51 | −0.68 |
| Export | −0.47 | −0.61 |
| Import | −0.49 | −0.71 |
| Emp | −0.66 | −0.84 |

TABLE 1-continued

| | Un-Smoothed | Smoothed |
|---|---|---|
| IP | −0.68 | −0.8 |
| CU | −0.61 | −0.71 |

Since each macroeconomic variable must be forecasted to use the model, selecting a limited number of factors may improve the performance of the model. Since many of the macroeconomic variables are strongly correlated, another variable to predict the overall health of the economy may be used. The unemployment rate may be used because it is available monthly and has certain unique properties that are useful for modeling. Namely, the level of unemployment rate and its rate of change both have significance. The unemployment rate is also commonly forecasted, and reliably available on a monthly basis, making it easier for practitioners to use the model.

Figure 5:
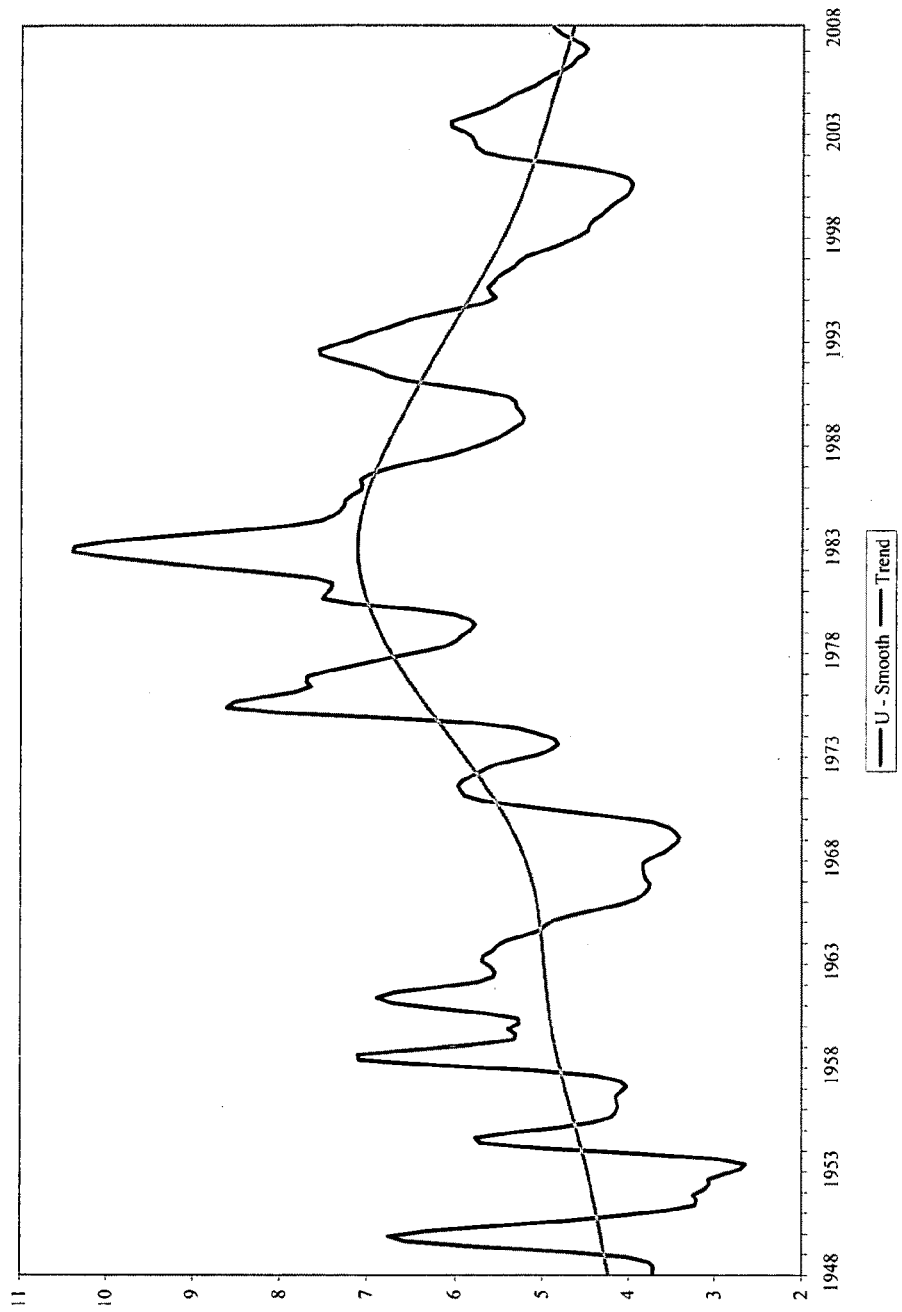
FIG. 5 is an example of separating the cycle from the trend using a Hodrick Prescott filter.

Another aspect of the CTM is the treatment of economic covariants using the multiple-destination proportional hazards model. For example, one or more (e.g., two) smoothing functions may be applied. The three quarter centered tent smoothing function serves to introduce the lead and the lag. Specifically, one can assume that this quarter is the weighted average between last quarter, this quarter, and next quarter. The model does this assuming a 25% weight for last quarter, a 50% weight for this quarter, and a 25% weight for next quarter. This allows for 1 free beta implied by the smoothing, rather than 3 betas as would result from other common methods. While differing views exist, econometricians generally agree that it is acceptable to have a leading variable. The Hodrick Prescott filter separates the cycle from the trend. An example is shown in FIG. 5. This allows us to assume that deviations from the trend are the cycle.

Embodiments of the CTM use macroeconomic conditioning information. The model may apply a filter, such as a three quarter centered tent smoothing filter, to both the unemployment rate and the high yield spread to filter out the highest frequency noise in each series. For the high yield spread, the CTM may condition on a smoothed series. The use of the unemployment rate may include time-series analysis that indicates different frequency responses between the default rate and the unemployment rate. In such a case, the CTM may extract three different frequencies and condition on those. First, the model may take the difference of the (smoothed) unemployment rate to extract and amplify the high frequencies. Second, the model may apply the Hodrick-Prescott filter ($\lambda=160000$) to extract the cycle and long-run trend. The stochastic trend in unemployment is decreasing even as recessions cycle around it. Separating this downward trend from the cycle is useful for default analysis, since default rates by rating category are positively related to the trend but negatively related to the cycle. Default rates are highest at the start of a downturn (when unemployment rates are low but increasing) as marginal companies are first hit with negative shocks. By the time the recovery starts (when unemployment rates are high but decreasing), these marginal firms have disappeared and default rates are least.

The CTM includes parameterization of the baseline intensities and covariate functions and takes into account a structural shift in rating definitions that have occurred. For example, Moody's ratings are subject to a structural shift in 1997.

Baseline transition intensities $\Psi_s^p(u)$: In embodiments of the CTM, step-function baseline intensities where the values are given by a piecewise linear process may be specified. Break points of the linear process can be estimated at quarters {1, 2, 3, 4, 5, 6, 8, 12, 16} and the scale normalization that to $\Psi_s^p(u)=1$ for $u \geq 20$ quarters are imposed.

Covariate functions $\theta_s^r(x)$: Standard practice is followed and it is assumed $\theta_s^r(x)=\exp\{x\beta_s^p\}$.

Pre-1997 structural changes: In 1997, Moody's introduced Caa rating modifiers and subsequently expanded the use of all C rating categories. Some issuers which previously might have been rated B3 were moved into one of the new C categories. This changed the upgrade, downgrade and default dynamics of several rating categories. This may be captured by allowing all means—the scale effects of rating categories in all transitions—to change post-1997.

Figure 6C:
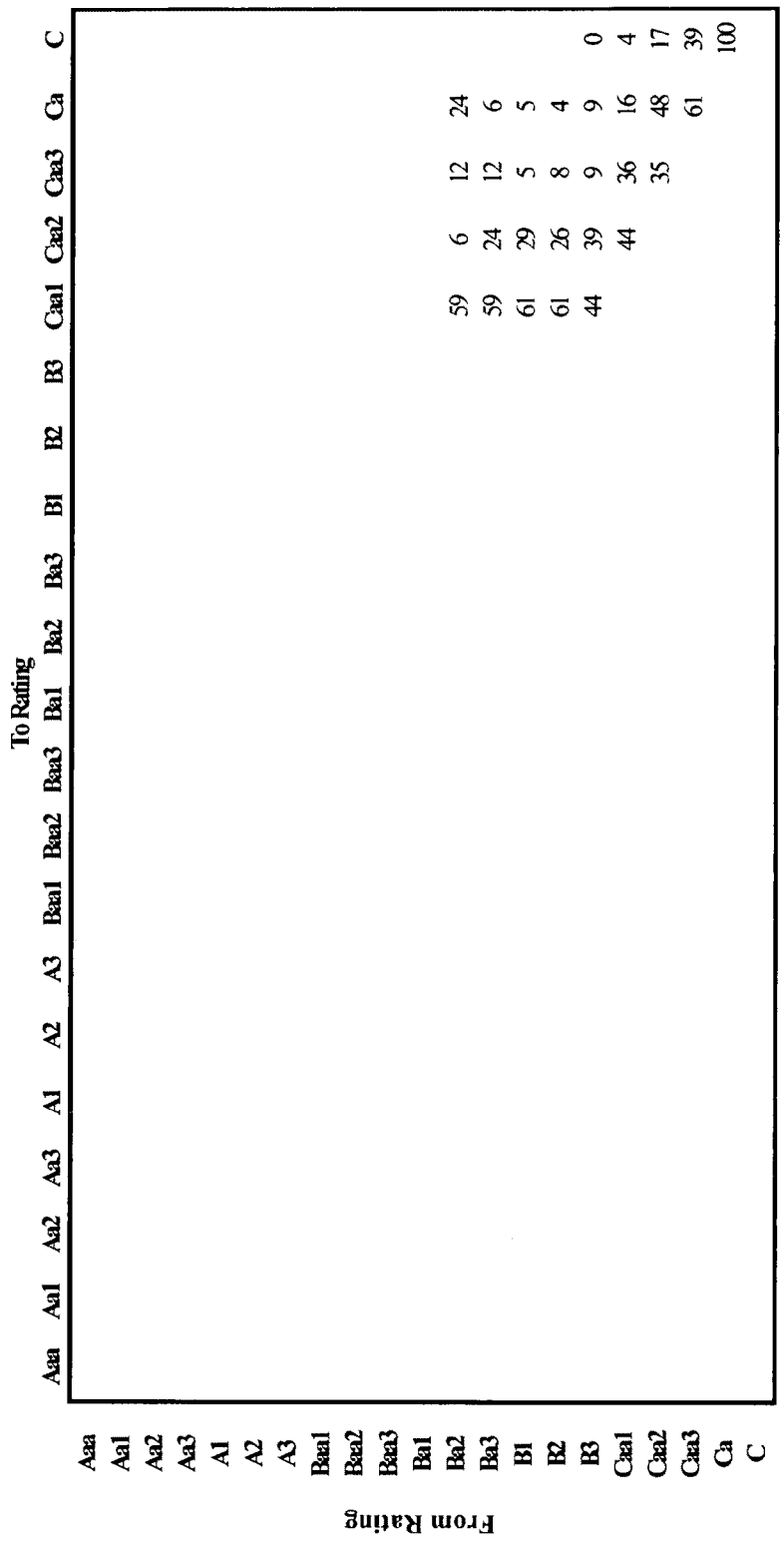

The CTM may define exiting states upgrade and downgrade, but by themselves these do not specify to which specific rating category the issuer upgrades or downgrades. To make that determination, historical transition frequencies can be used. Examples are presented in FIGS. 6A-6C. These matrices are conditional on the exit states upgrade (FIG. 6A), downgrade above C (FIG. 6B), and downgrade to C (FIG. 6C). This data may be stored in one or more databases (see 2004). For example, if an issuer transitions to the state upgrade, FIG. 6A may be consulted to determine the probability of transitioning from its current rating to each specific rating. It is noted an issuer currently rated Aa1 can only transition to Aaa conditional on exiting to upgrade. If an issuer transitions to the state downgrade to C; FIG. 6B may be consulted if the ratings are B2 and above. For IG ratings and Ba1, FIG. 6B includes non-zero transition probabilities to C ratings and to default. If an issuer transitions to the state downgrade to C, FIG. 6C is consulted if the ratings are between Ba2 and Ca, inclusive.

The macroeconomic and rating facts change the absolute (and hence relative) probabilities of upgrade and downgrade, but not the probability of a d-notch change conditional on being changed. For example, the CTM may output the probability of being upgraded, but does not distinguish between being upgraded one notch or being upgraded two notches. In various embodiments of the CTM, there may be an assumption that the probability of being upgraded 1, 2, 3, or d notches is the same. Based on this assumption, the state of the economy can influence whether an issuer is upgraded, but it may not influence how far the issuer is upgraded in the event they are upgraded. This restriction may be binding if large upgrades and downgrades are more likely in extremely good or bad economic times. The model may be extended to define the exiting states Upgrade/Downgrade 1 Notch and Upgrade/Downgrade 2+ Notches to allow the macroeconomic environment to have some impact on volatility.

Examples of the model output from the estimated CTM are presented in FIGS. 7A-9B. These examples use baseline forecasts conditioned on a static economy with unemployment trend constant at 5.6% and the high yield spread constant at 530 bps, which are their sample averages. FIG. 7A shows the model output for a newly issued B2 credit. These are the probabilities that, conditional on this economic scenario, this credit in these states at the indicated horizons would be observed. For example, one quarter from now, there is a 96% probability that this issuer would still be rated B2. Twenty quarters from now, there is a 15% chance the issuer would have entered default and a 36% chance the rating would have otherwise been withdrawn. Therefore, there is only a 48% chance that the rating would still be outstanding, and this is distributed across the rating scale as indicated. There is only a 2.5% chance that this credit will transition to investment-grade over the next 20 quarters conditional on this economy.

Figure 8A:
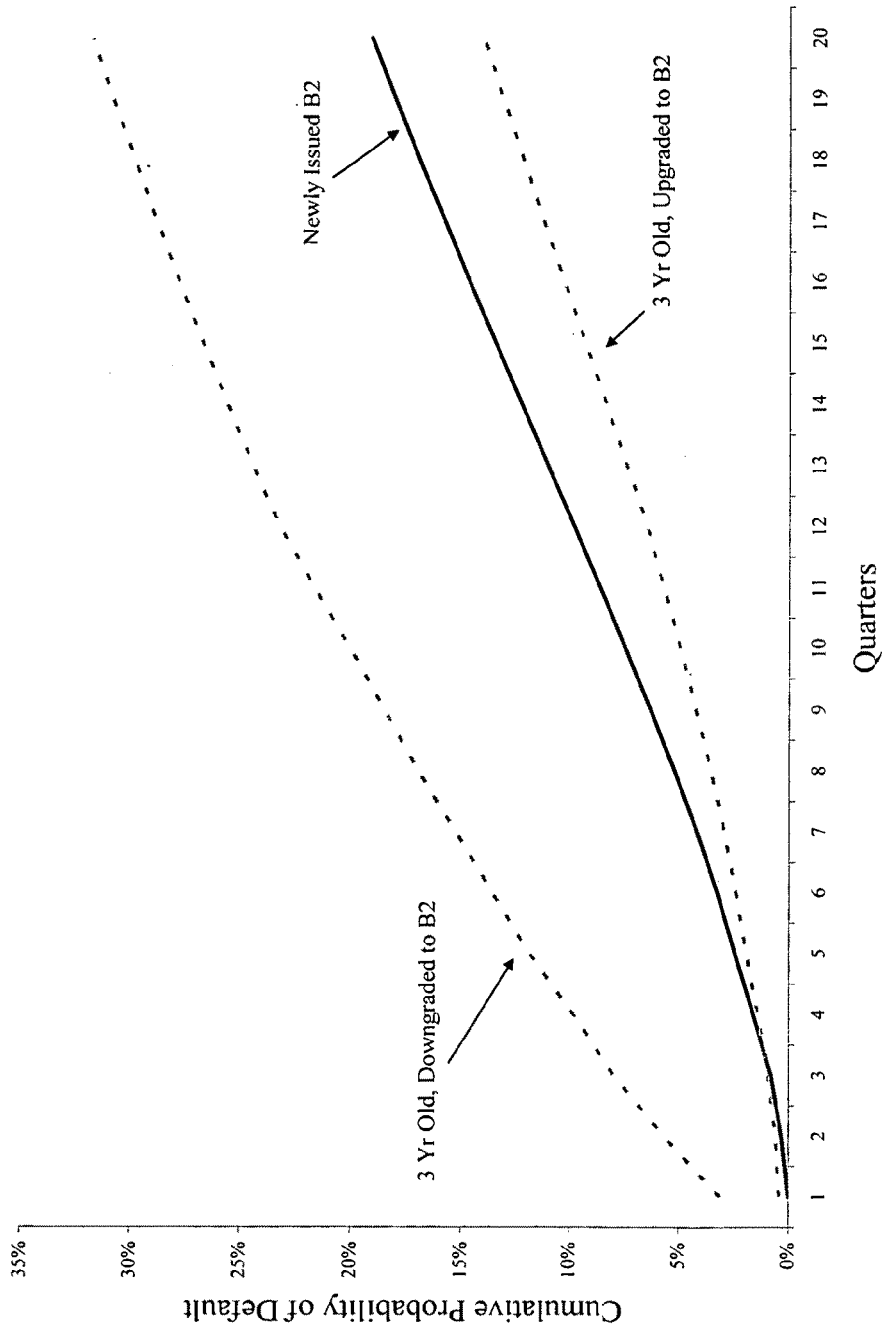
FIGS. 8A-8D are examples of output from the credit transition model.

FIG. 8A compares the five year cumulative default forecast for a newly issued B2 credit with a three year old credit just downgraded to B2 and a three year old credit just upgraded to B2. There is little difference between the new issuance and the upgraded credit, but the default probabilities for the downgraded issuer are substantially greater. At four quarters, there is a 1.6% default probability for the new issuer versus 1.4% for the upgraded and 9.8% for the downgraded.

Figure 8B:
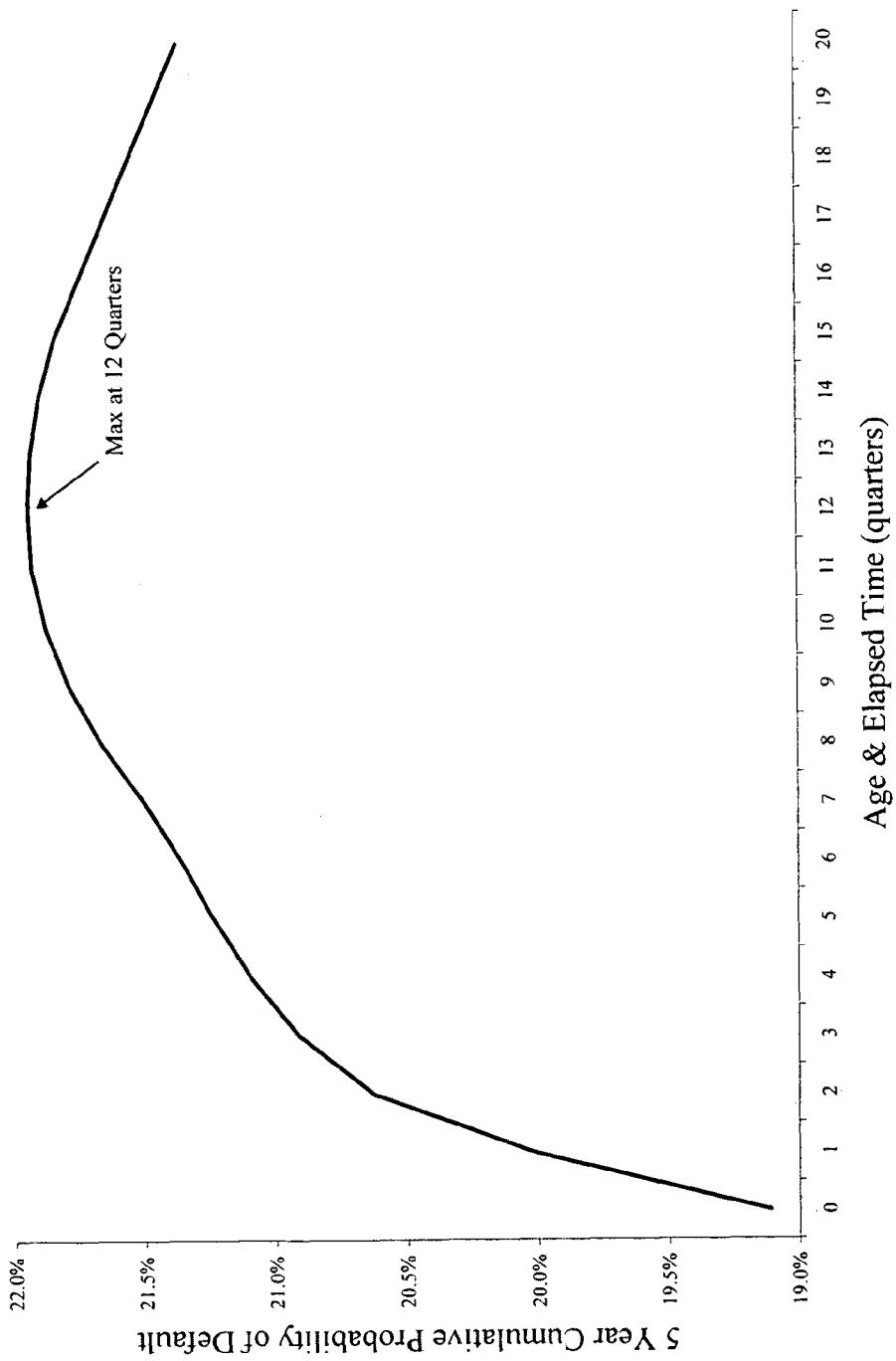

A seasoning effect is evident in FIG. 8B. This presents the cumulative five year default probability for an original issue B2 credit as a function of the issuer age and time elapsed in the B2 rating. There is a significant increase, peaking at 12 quarters after which it slowly declines. It is noted that FIGS. 8A-8D are adjusted for withdrawal.

Figure 8C:
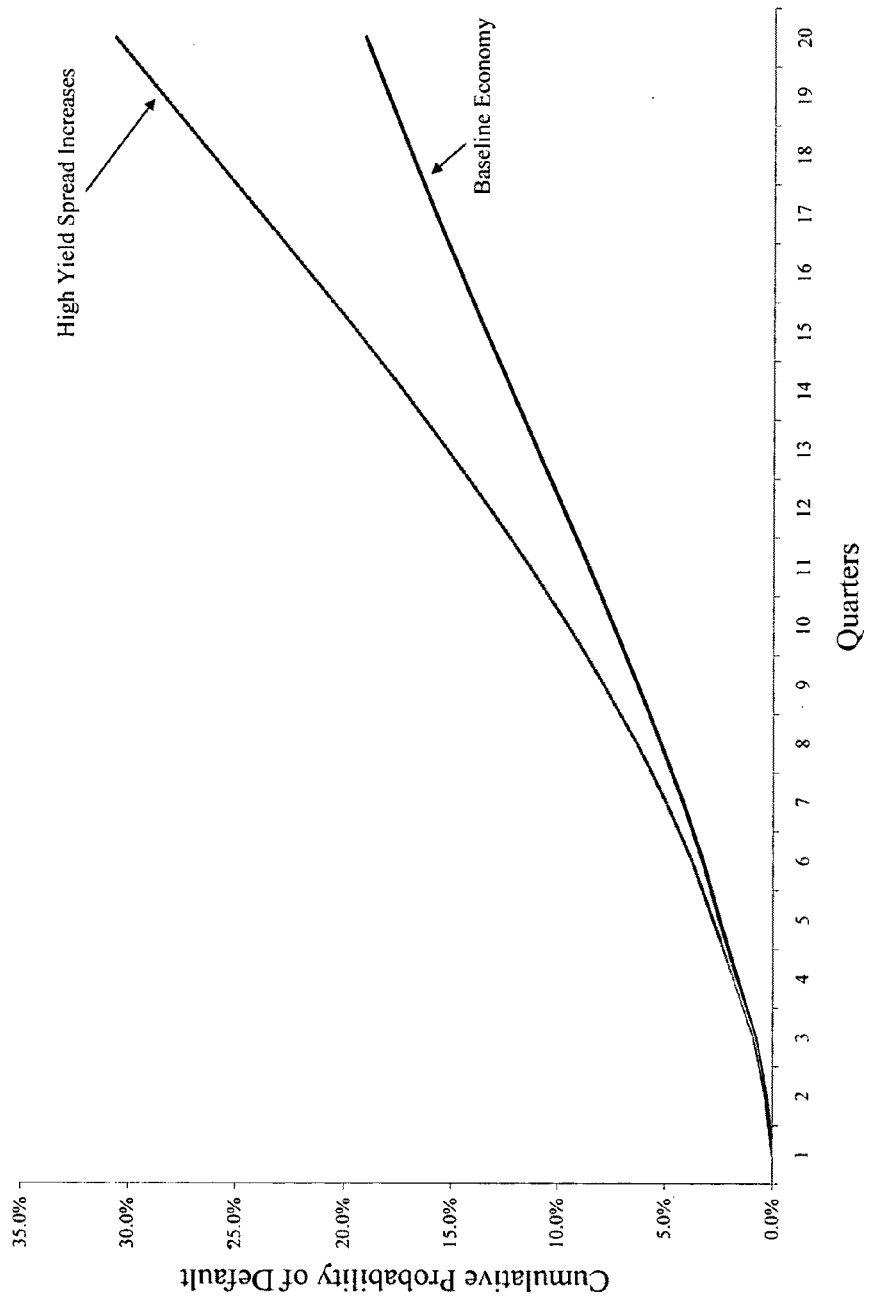

In FIG. 8C, this baseline forecast is compared against an economy where the unemployment rate continues to be static at 5.6%, but the high yield spread steadily increases from 530 bps to 1,060 bps over the forecast horizon. As expected, the forecast under the deteriorating economy is substantially worse.

Figure 8D:
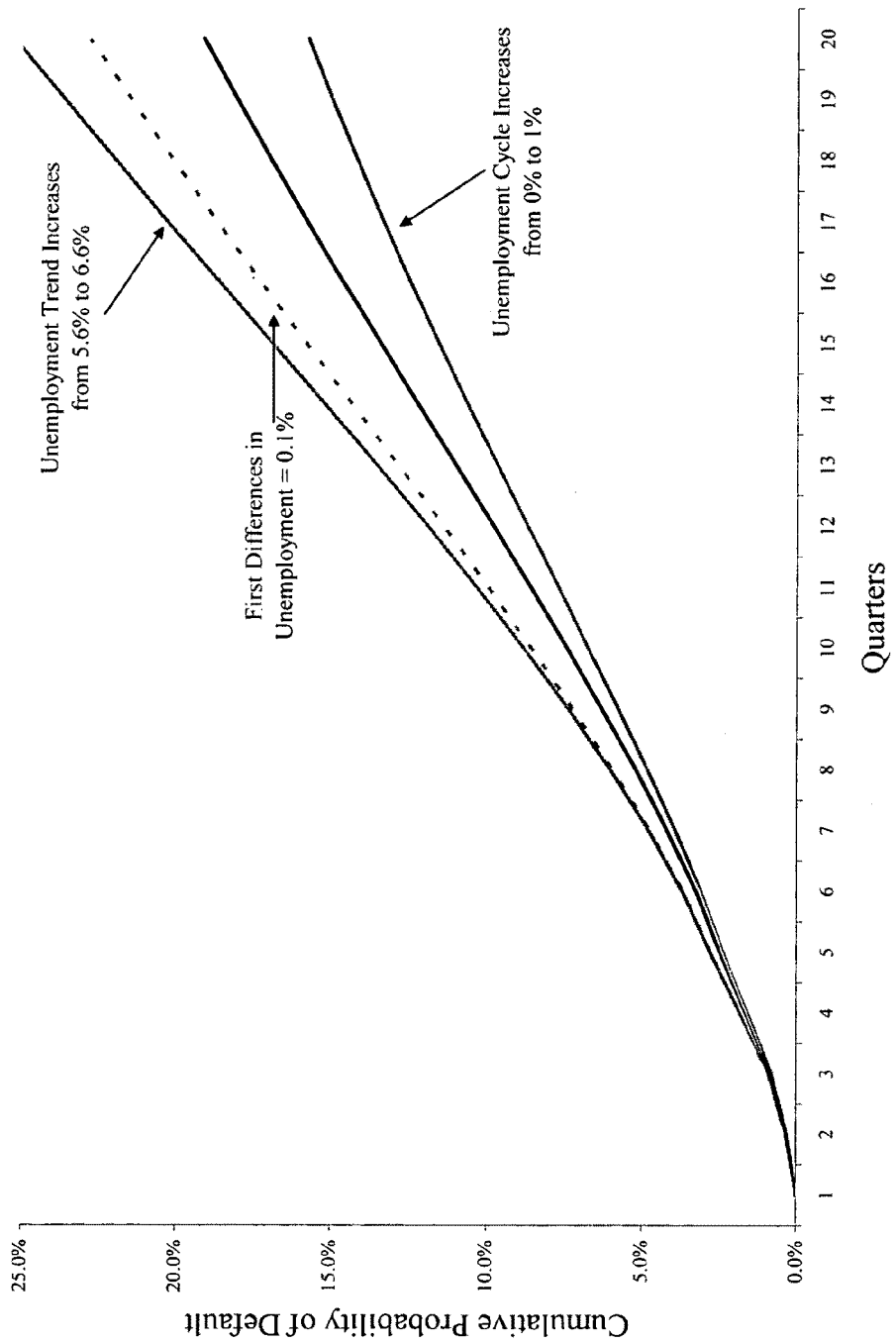

Default rates have very different responses to different frequencies of the unemployment rate. FIG. 8D compares the response to increases in the underlying trend from 5.6% to 6.6%, increasing the cycle from 0% to 1%, and constant first differences of 0.1%. There is a positive relationship with the trend and with differences, but a negative association with the cycle. The baseline forecast is repeated for reference.

When generating transition probabilities, there are two sources of forecast uncertainty: estimated model parameters and conditioning on an economic forecast. To incorporate parameter uncertainty into the forecasts, the Delta method may be used. The results for the baseline forecast are presented in FIG. 9A. The 95% confidence interval for the 20 quarter (adjusted) default rate ranges from 14.6% to 23.6%.

Figure 9A:
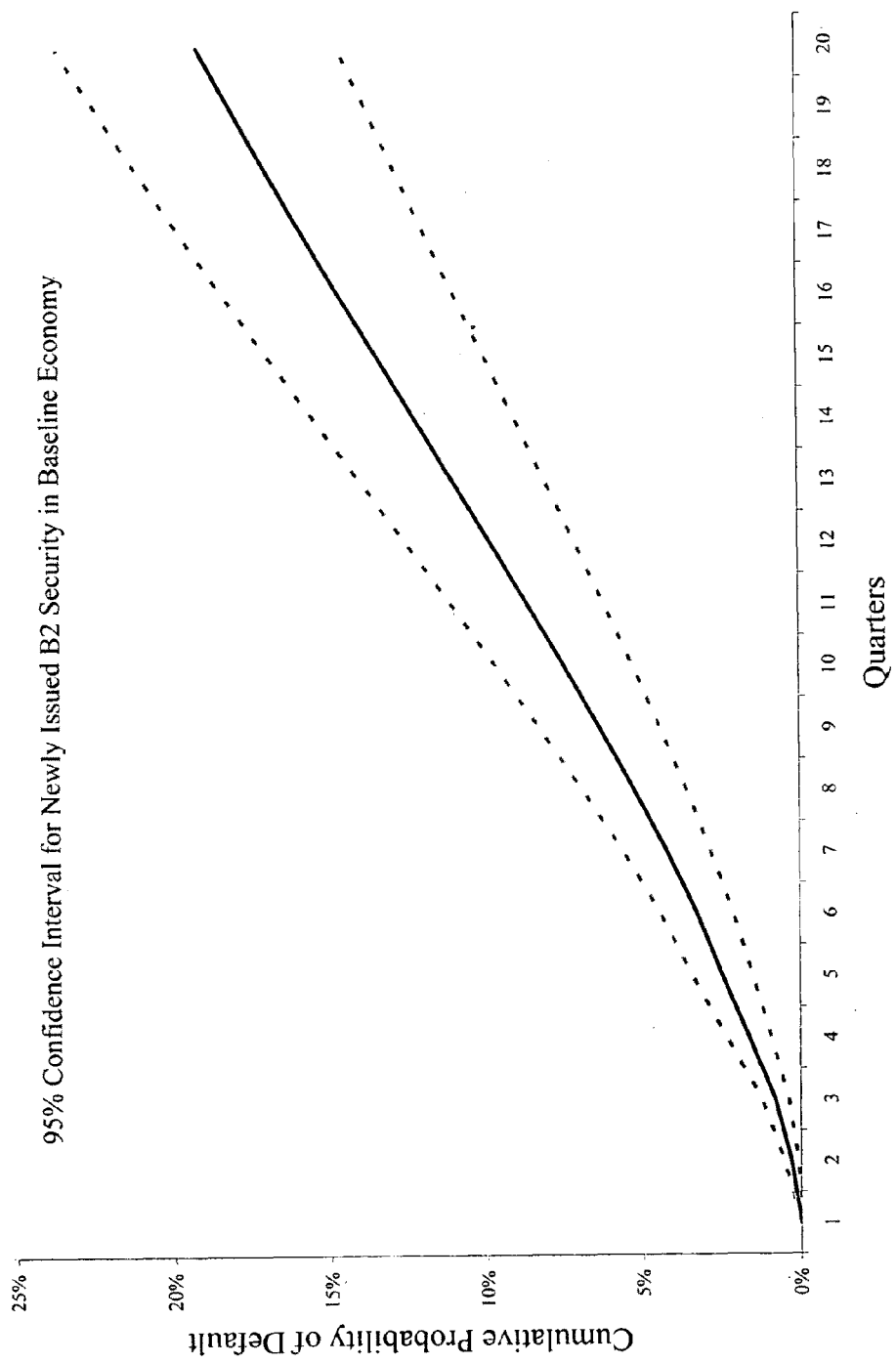
FIGS. 9A-9B are examples of output from the credit transition model.
Figure 9B:
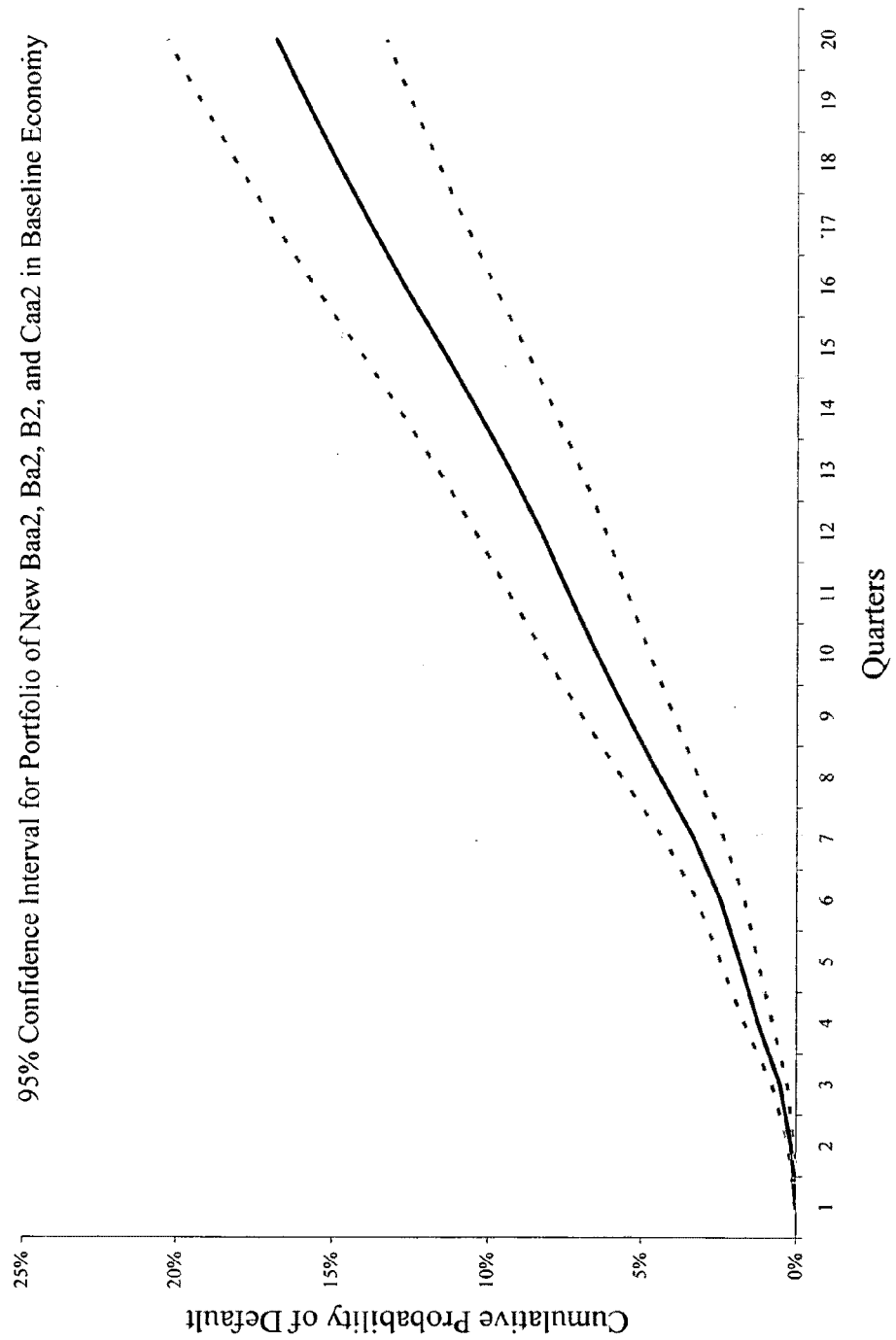
Figure 9C:
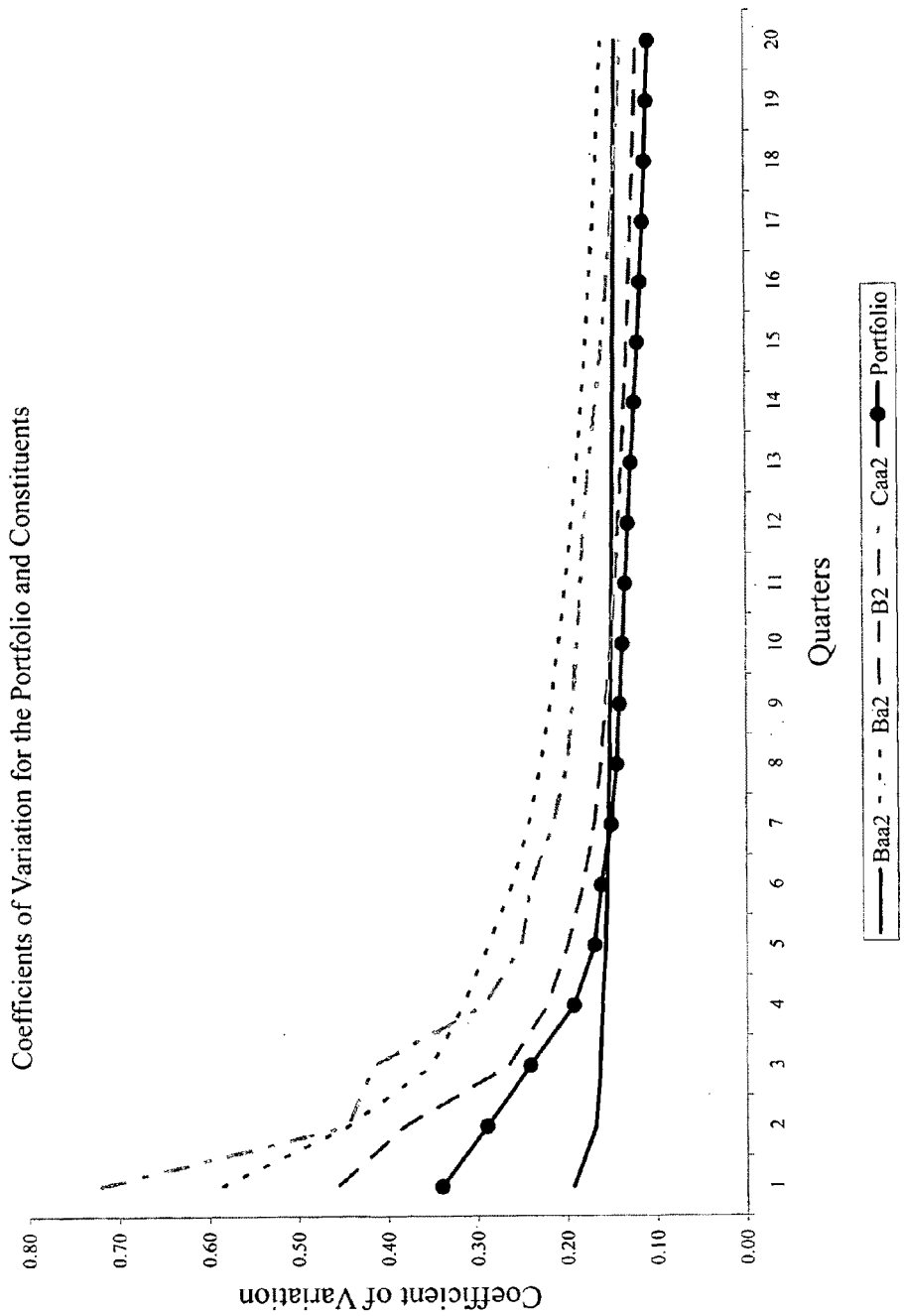
FIG. 9C is an example of the coefficient of variation for an individual issuer and a portfolio.

The following example is provided for a small portfolio. The portfolio contains new Baa2, Ba2, B2, and Caa2 issuers. FIG. 9B presents the 95% confidence interval for this portfolio. For the 20 quarter forecast, the standard errors for the individual issuers are 0.3%, 1.4%, 2.3% and 5.1% respectively. For the portfolio, it is 1.8%. FIG. 9C plots the coefficient of variation for the individual issuers and for the portfolio. They are monotonically decreasing with the forecast horizon. While there is a large degree of uncertainty for any individual issuer, the coefficient of variation will likely decrease as the portfolio size increases.

Several options may be used in forecasting economic uncertainty. For example, the first option is to use the Delta method mechanics. Applying the Delta method mechanics involves taking a first order linear approximation to the function and applying the known economic forecast covariance matrix. A second option is to perform a Monte Carlo analysis of the expected default rate as a function of the economic forecast. This may be computationally unfeasible for large portfolios. A third option is to take a first or second-order approximation to the model and perform a Monte Carlo simulation on that. Considering the computational time required to perform a second-order approximation, the first-order approximation may be the better choice.

The distribution of default rates may not be symmetric or normal; a proper confidence interval takes this into account. The Monte Carlo simulation over the complete function indicates a 95% confidence interval for the $20^{th}$ quarter default rate forecast of 16.4% to 30.5%. The second-order Taylor approximation comes close, yielding an interval of 16.0% to 29.8%. The "Delta method" approach is the least accurate, suggesting an interval of 16.0% to 29.5%.

Figure 10A:
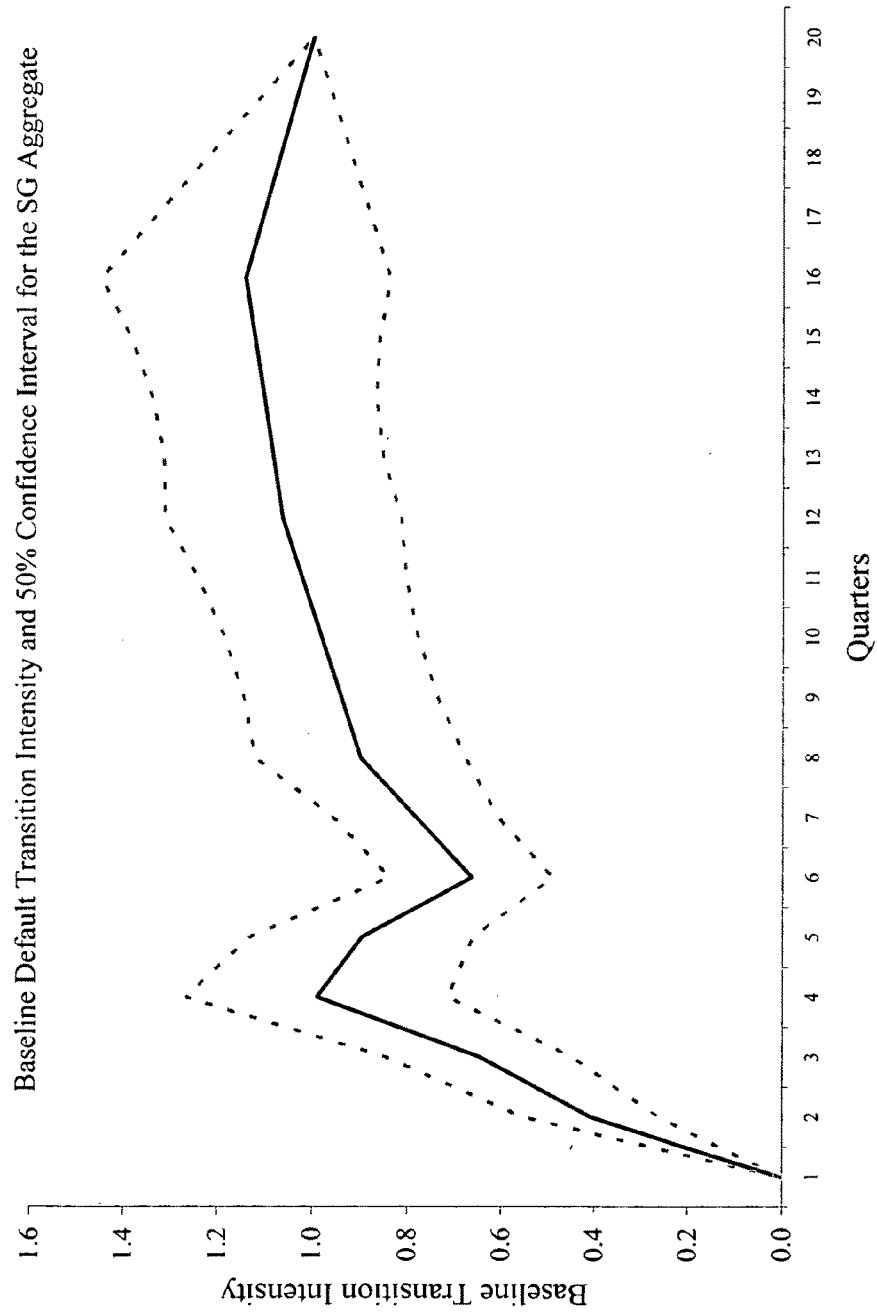
FIGS. 10A-10D are examples of estimates of the baseline transition intensities generated when estimating the credit transition model
Figure 10B:
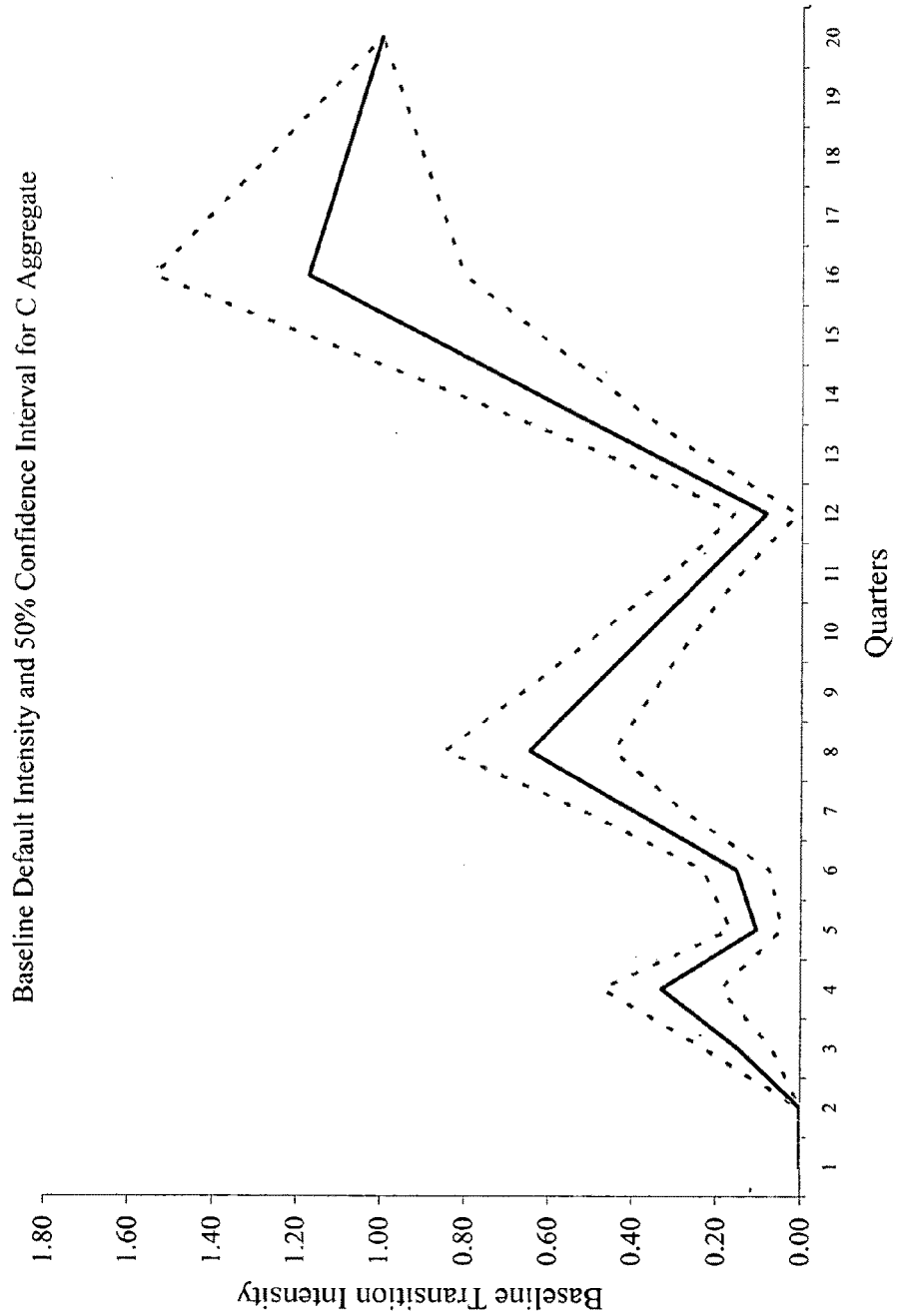
Figure 10C:
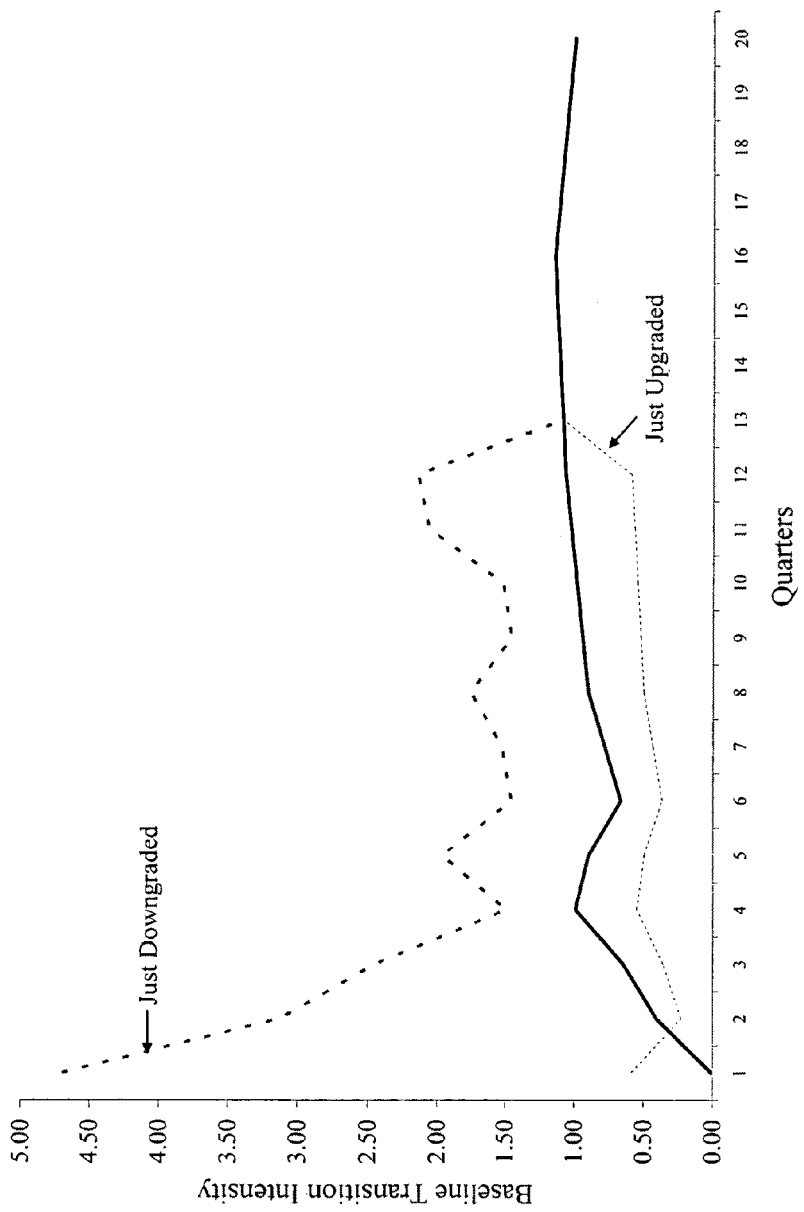
Figure 10D:
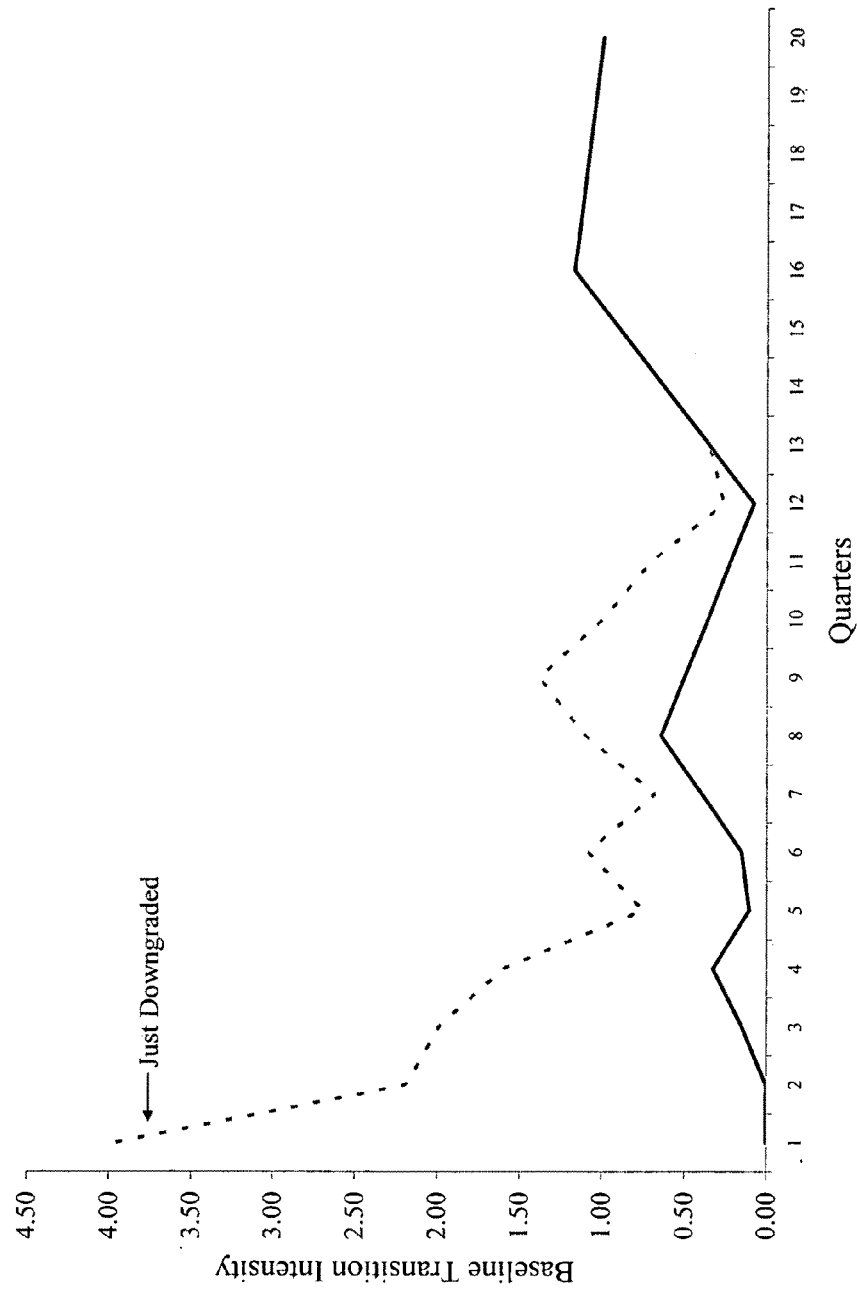

The parameter estimates of the credit rating transition model are determined for each exiting state. For example, estimates of the baseline transition intensity from the non-C speculative grade ratings directly to the default state are presented in FIG. 10A. The individual ratings Ba1 through B3 are scale adjustments of the underlying aggregate process. FIG. 10A presents this aggregate baseline up to scale (within the 50% confidence interval). All baselines are constant at the value "1" after 20 quarters. FIG. 10B presents the baseline intensity for the C aggregate process, again with the value normalized to 1 at 20 quarters. FIG. 10C compares the baseline intensity for new issuance with that of an upgraded or downgraded issuer for the SG process. FIG. 10D is analogous to FIG. 10C for the C process. However, in the dataset there are too few cases of upgraded C issuers defaulting to estimate a separate process.

An individual transition process can be affected by the economic covariates. For example, if someone wants to know the impact of an increase in credit spreads on default rates, there are four avenues by which such an increase can impact the observed default rate. It can increase the probability of transitioning directly from a rating to default. It can increase the probability of downgrading (which subsequently increases default rates). It can decrease the probability of upgrading or it can decrease the probability of withdrawing. Any of these will result in an increase in the observed default rate.

The individual economic covariates that may affect the individual transition processes include current changes in the unemployment rate, cumulative changes in the unemployment rate, the unemployment cycle, the unemployment trend, and the high yield spread. Each economic covariate can affect the default transition intensity, the withdrawal transition intensity, the upgrade transition intensity, the downgrade above C transition intensity, and the downgrade to C transition intensity. Coefficient estimates and T-statistics can be generated for each transition intensity. Examples of coefficient estimates and T-statistics for the economic covariates and the baseline transition intensities are provided in Appendix A. The parameter estimates may be reestimated quarterly.

For example, the effects of coefficients of the economic covariates on the default transition intensity can be examined. Increases to the unemployment rate increase the transition intensity for both the SG aggregate and the C aggregate. The SG aggregate is positively related to the trend in unemployment as well, though the C aggregate is nominally negative. Higher levels of the unemployment cycle are associated with lower default rates for both processes. The default transition intensity is positively related to the high yield spread for the spec-grade aggregate, but statistically and numerically it has no relation for the C aggregate. This analysis can be performed for all of the transition intensities and the associated individual transition processes.

Examples of outputs generated during the estimation of the CTM are provided in FIGS. 11A-11F. The parameters are estimated in-sample, but to take just one example, a default forecast beyond one quarter requires generating probabilities of every possible transition in the interim (and every subsequent transition from every transition, and so on). Suppose a new issuer is assigned a B3 rating on Jan. 1, 2000. On Apr. 1, 2000 there is some probability that it will have been upgraded to one of several ratings, or downgraded to one of several ratings, or defaulted, or withdrawn. All of those probabilities must be calculated. From each one of those possible new ratings, the issuer may again upgrade or downgrade (or default or withdraw) on Jul. 1, 2000. These calculations may continue for each consecutive quarter. The "probability of default" within the next five years, given the five year path of the economy, requires good predictions of each of these transition probabilities. It is somewhat analogous to using a sample of data to estimate the parameters of a Vector Auto-Regression (VAR), but then applying the VAR sequentially to see what would have been forecasted had the parameter values been in hand at that time. The resulting forecasts are not truly "out-of-sample," but neither are they trivially in-sample, as is the case when comparing data to a fit line from ordinary least squares (OLS), for instance.

Figure 11A:
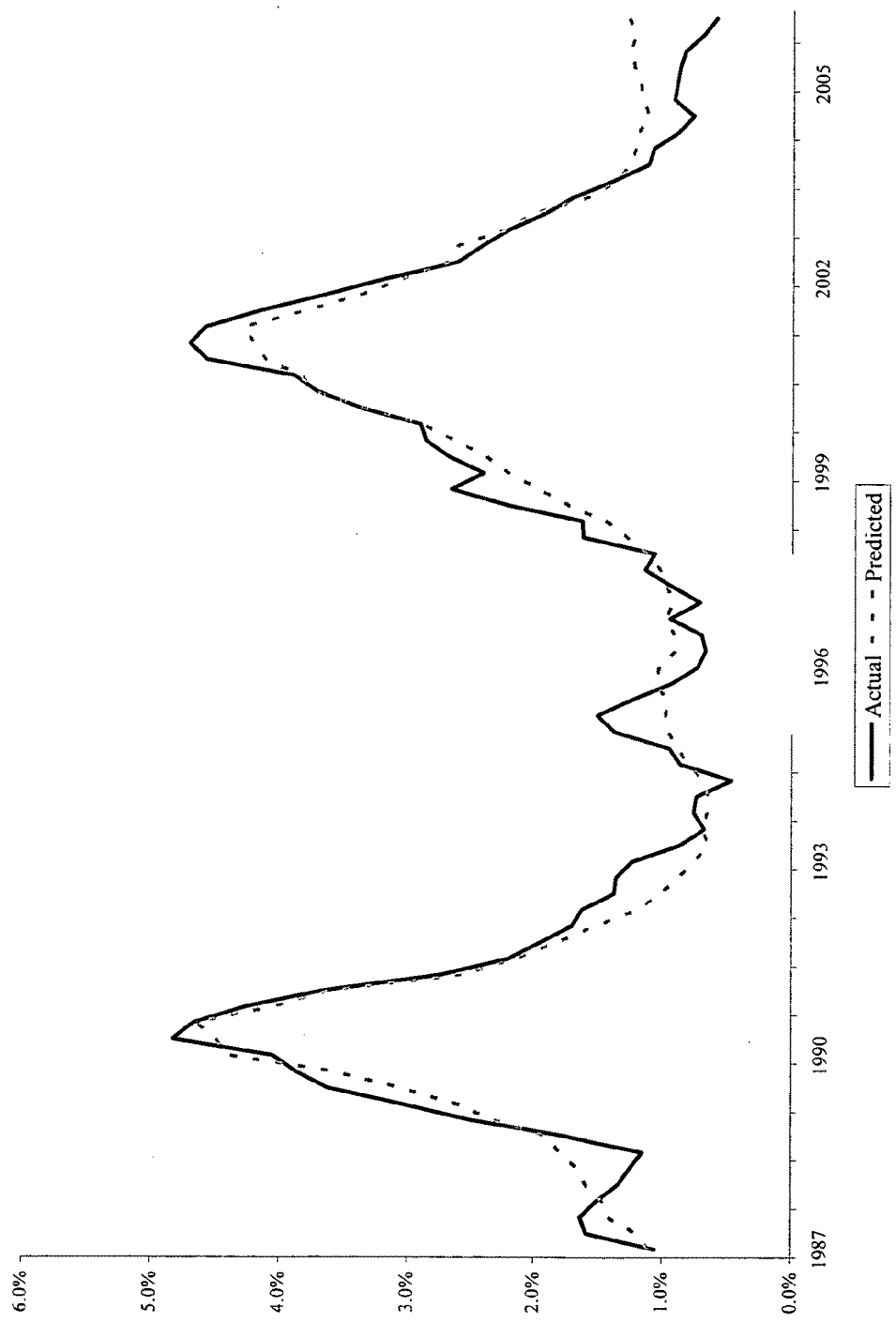
FIGS. 11A-11F are examples of the outputs generated during the estimation of the credit transition model.
Figure 11B:
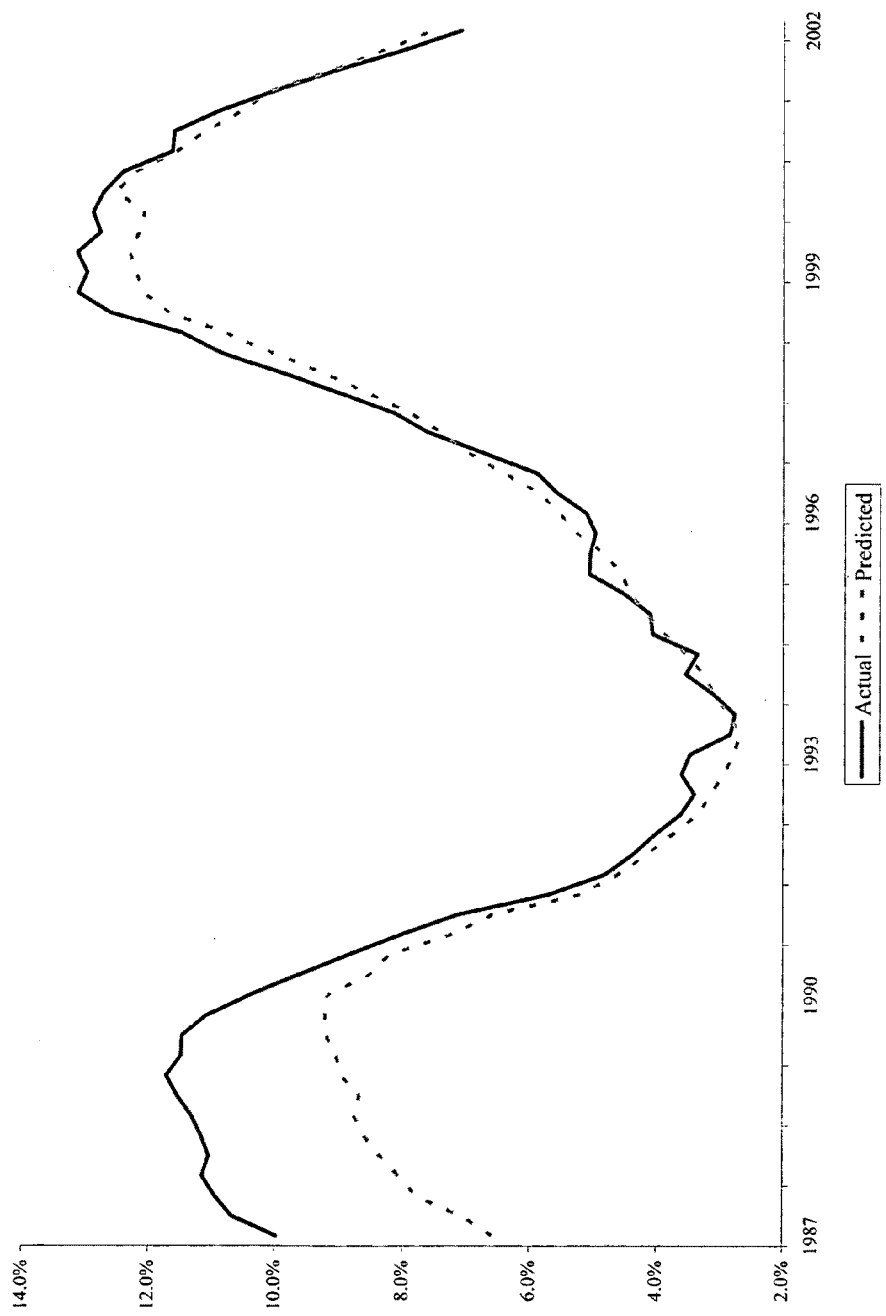

FIG. 11A compares the actual and predicted one year default rates. For example, a cohort of all North American rated issuers on Jan. 1, 2000 is formed. The cohort is observed to see what percent of them default by Jan. 1, 2001. This is compared with the average probability of default over that year. FIG. 11B compares the actual with the predicted default rates over a five year horizon. In both cases, the correspondence is very tight.

Figure 11C:
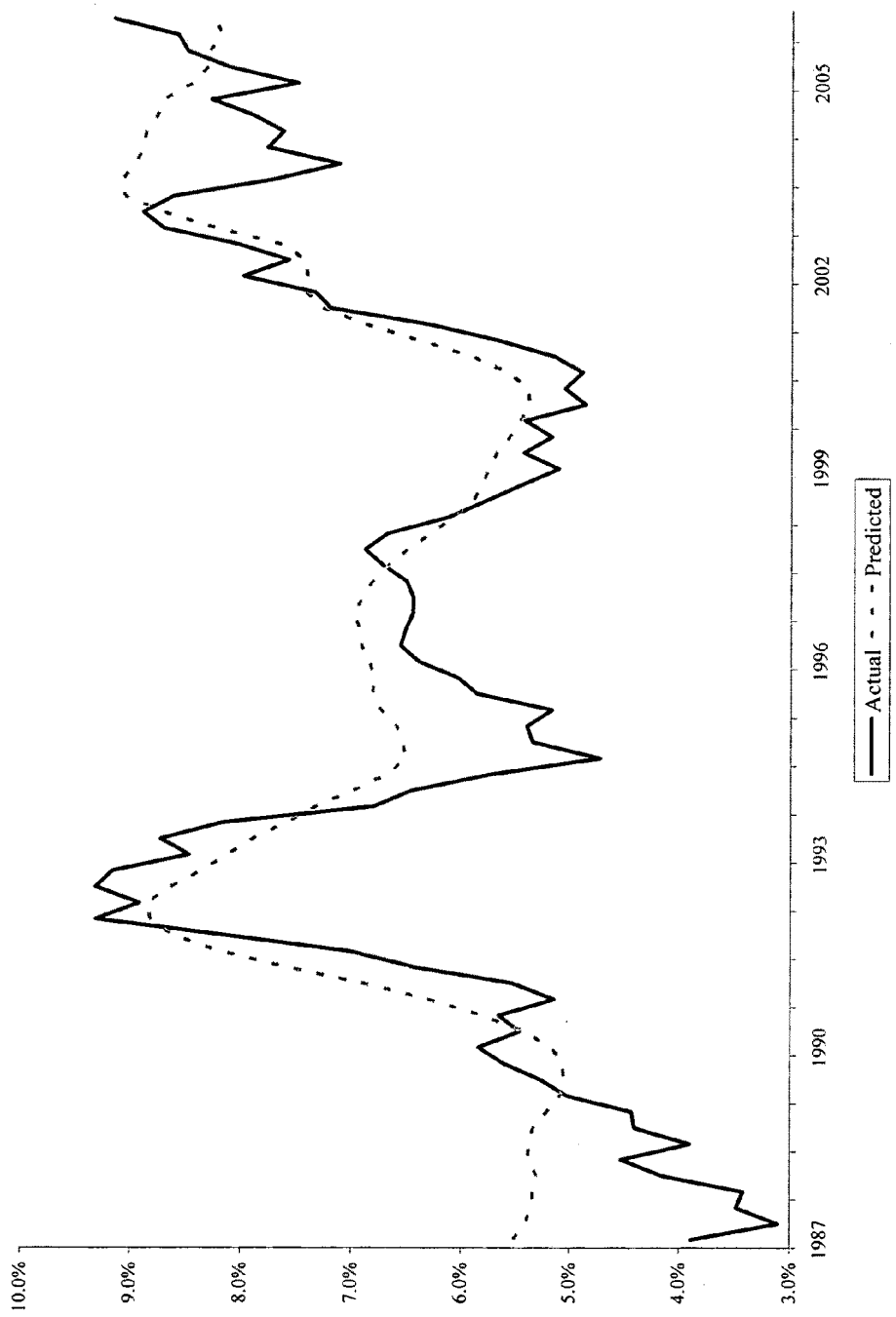
Figure 11D:
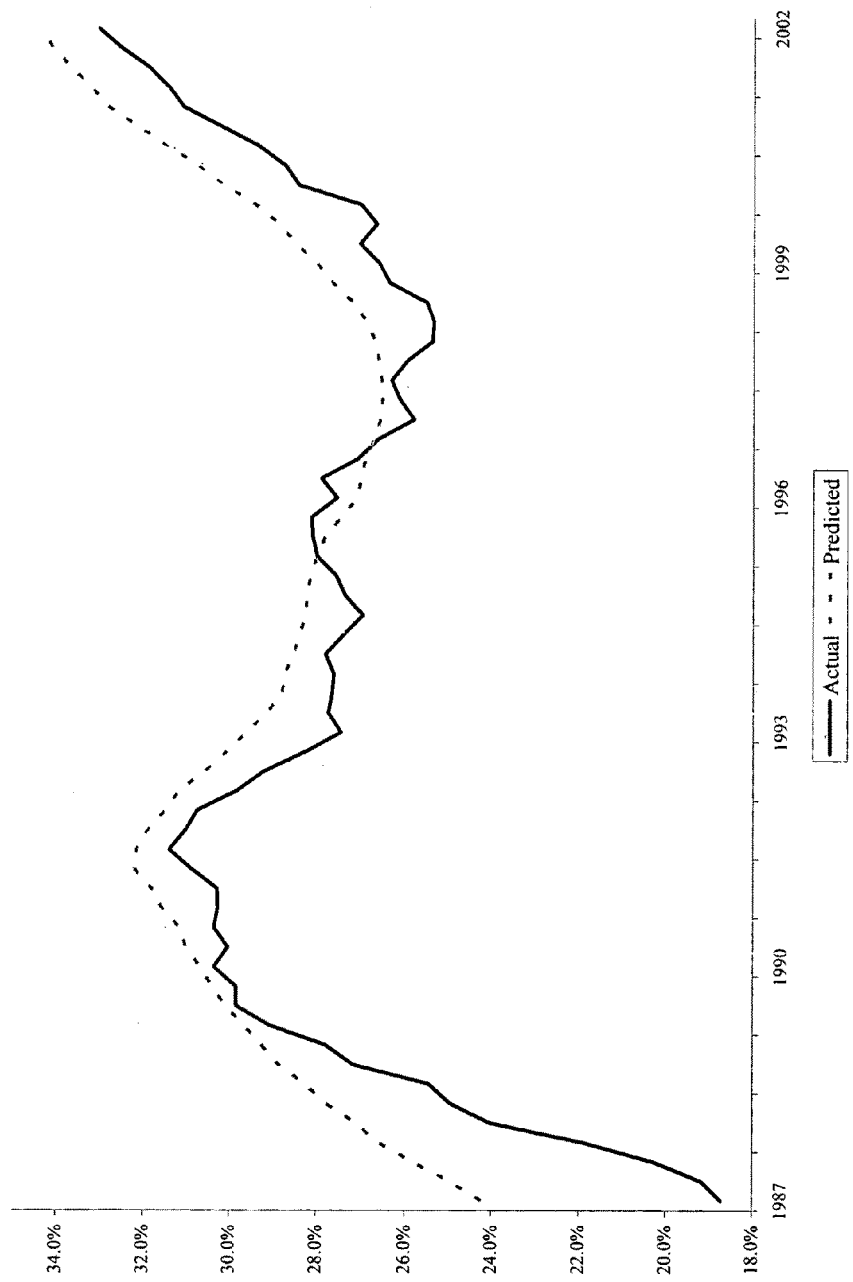

FIG. 11C and FIG. 11D present analogous comparisons for the withdrawal forecast. An accurate forecast of withdrawal is necessary to construct a good forecast of the withdrawal-adjusted default rate.

Figure 11E:
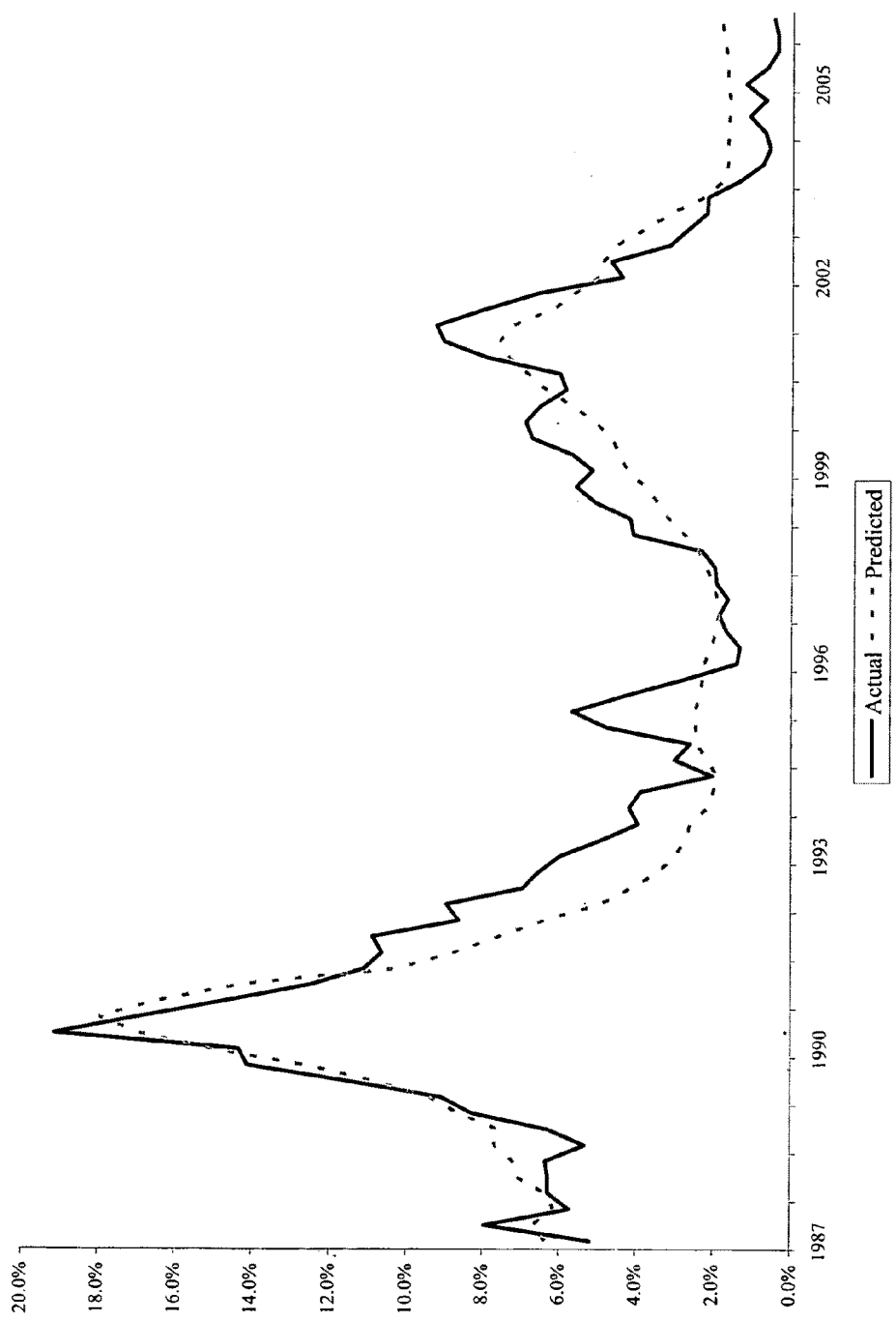
Figure 11F:
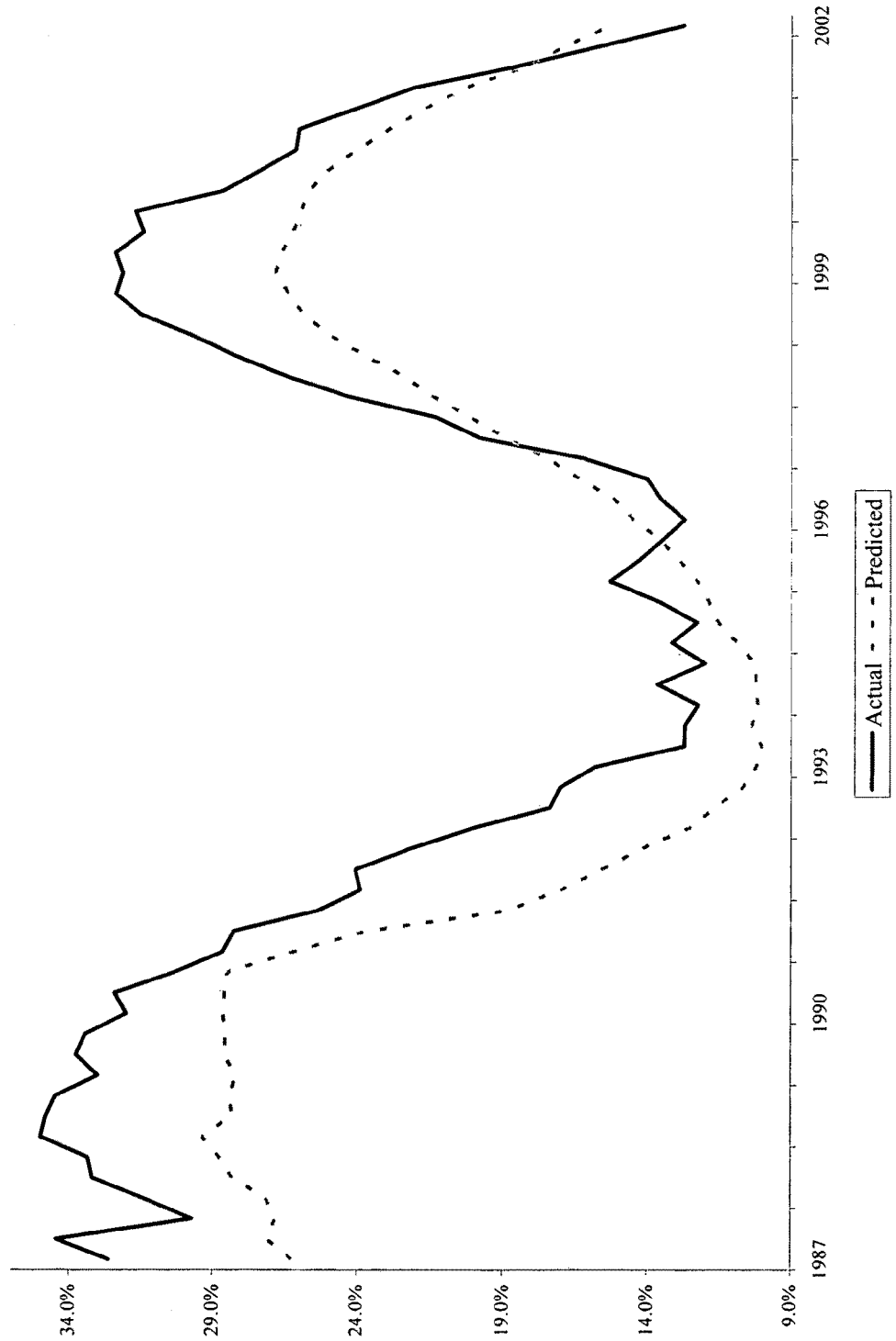

These are predictions over the entire North American rated universe, but since the model may be designed as an issuer model, predictions for portfolios can be generated. As an example, the single-B rated universe is considered. In other words, cohorts of all issuers that are rated B1, B2 or B3 on the start date are formed, and their observed and predicted default rates over one and five years are compared in FIGS. 11D and 11E. Close correspondence is shown in FIGS. 11D and 11E. In general, the (partial) effect of the macroeconomic drivers conforms with expectations: downgrades and defaults are increasing with changes in the unemployment rate and the level of high yield spreads, upgrades are decreasing with spreads. One result which may appear anomalous is that defaults are decreasing with the level of the unemployment cycle. This may be explained by the timing of the business cycle: default rates are highest at the start of a downturn, which is characterized by low but increasing unemployment, and lowest at the start of the recovery, where unemployment is high but decreasing.

As a partial effect, recent rating actions generally dwarf changes in the economic environment when it comes to default transitions, especially over short horizons. Having been downgraded drastically increases the default transition for both the SG and C aggregates. However, since the economic environment impacts these rating actions, it remains true that the general impact of the economic drivers is significant, especially over long horizons.

In various embodiments, the CTM adjusts the probabilities for withdrawal. To illustrate the concept of withdrawal adjustment, consider a portfolio having one hundred B rated bonds. After one year, ten may default and twenty may withdraw. If there is no adjustment for withdrawal of issuers, then the default rate on the portfolio is ten percent. This assumes that the twenty that withdrew did not default. However, if there is an adjustment for withdrawal, then it may be reasonable to assume that the twenty that withdrew would have defaulted at the same rate as the bonds that were fully observed. In this example, eighty bonds were fully observed and ten defaulted, implying a default rate of 12.5%.

Figure 7B:
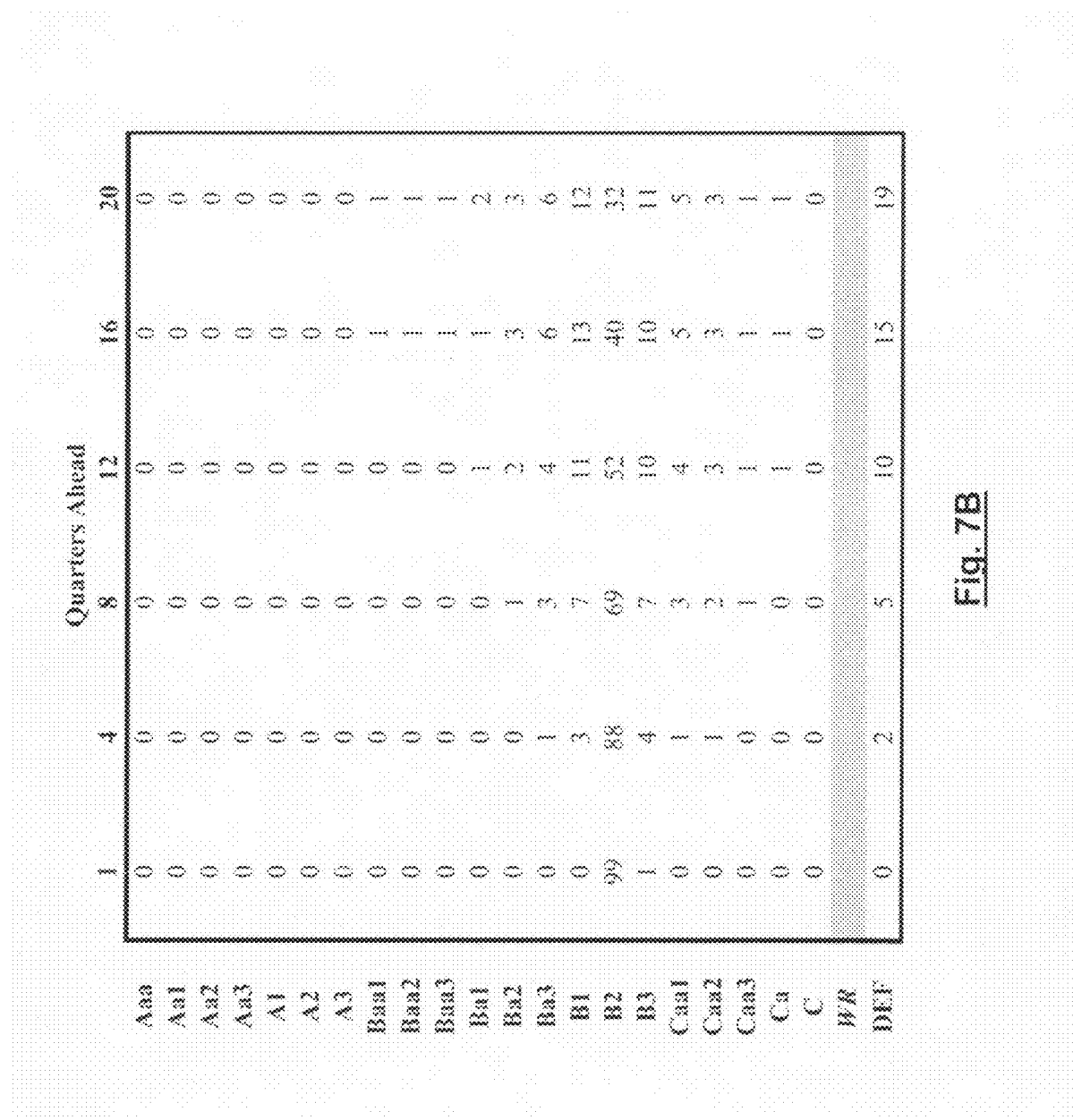
Figure 7C:
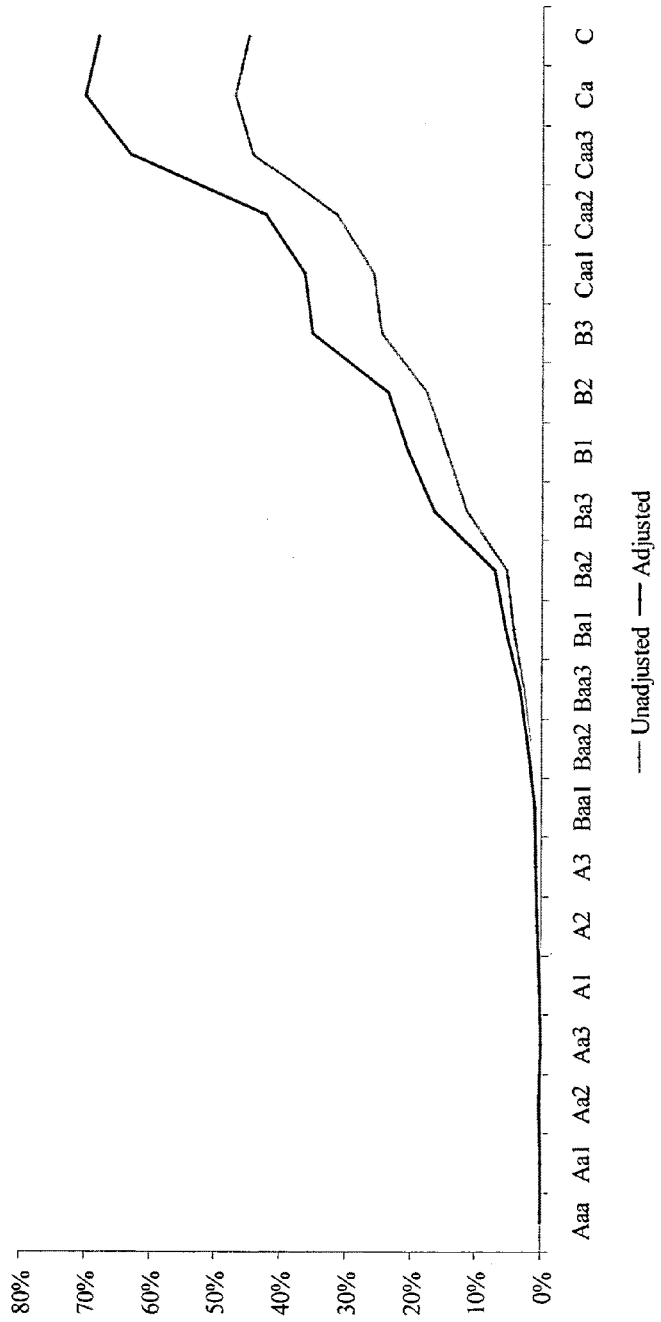
FIG. 7C is an example of adjusted and unadjusted default rates.

FIGS. 7A-7C highlight the importance of considering the withdrawal state, especially over long horizons. Unadjusted numbers as estimates of the "five year default rate" for an exposure which was going to last at least five years, underestimate the true risk by, in some cases, nearly half as shown in FIG. 7C. In many applications, analysis may be performed based on what the probability is that an issuer will default within a specified time period (e.g., 20 quarters) assuming the rating otherwise remains outstanding. In this example, this is done using the transition probabilities conditional on not withdrawing. The results are presented in FIG. 7B. If there is no possibility of the rating otherwise withdrawing over the next 20 quarters, there is a 19% chance it would have defaulted by then, a 32% chance that it would still be rated B2, and a 4% chance it would have transitioned to investment-grade.

Method and System for Applying the CTM

Methods and systems for applying the CTM to generate various model outputs are described herein. The methods and systems may include obtaining pertinent rating facts and macroeconomic factors from various sources to use as inputs to the CTM and applying the CTM to the inputs to generate various model outputs. In an exemplary embodiment, the inputs into the model include rating facts and macroeconomic factors. The rating facts may include, for example, data related to a current rating of an issuer or portfolio of issuers, rating momentum (e.g., whether the issuer or issuers were recently upgraded or downgraded), rating history (e.g., how long the issuer has maintained its current rating or how long the issuer has maintained any rating), and outlook or watchlist status. The macroeconomic factors may include data related to unemployment rate and high yield spread over Treasuries.

Portfolios

Figure 12:
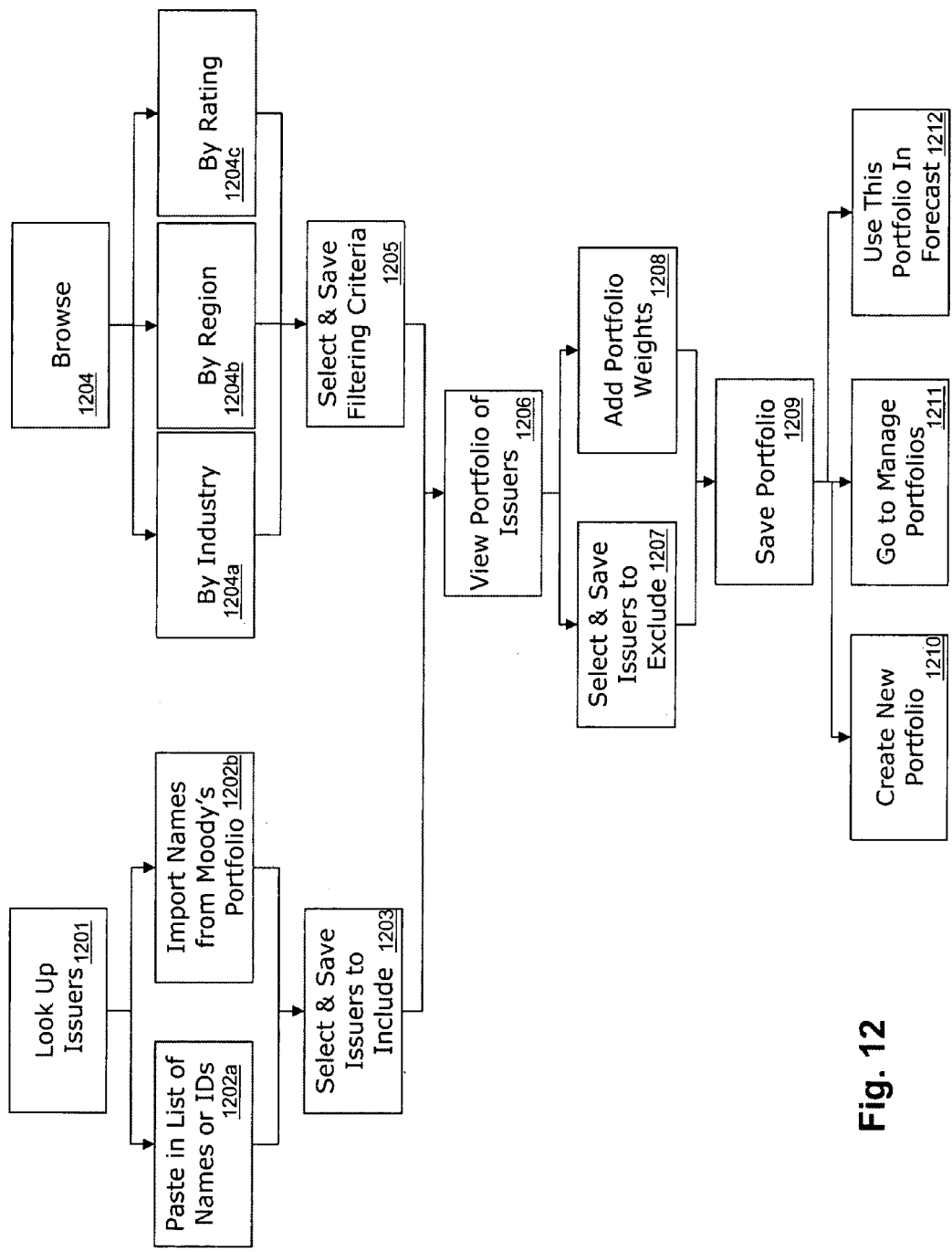
FIG. 12 is an exemplary workflow diagram for using portfolios.

FIG. 12 schematically illustrates an exemplary workflow for setting up custom portfolios. The custom portfolios may be used to gather data for the model. The portfolio module may be used to generate a list of issuers that the model will draw on to identify the rating facts used as inputs to the model. Advantages of various embodiments of the portfolio module include allowing users to use portfolios that have already been created and stored outside of the application and to easily create and update portfolios within the application.

Figure 13A:
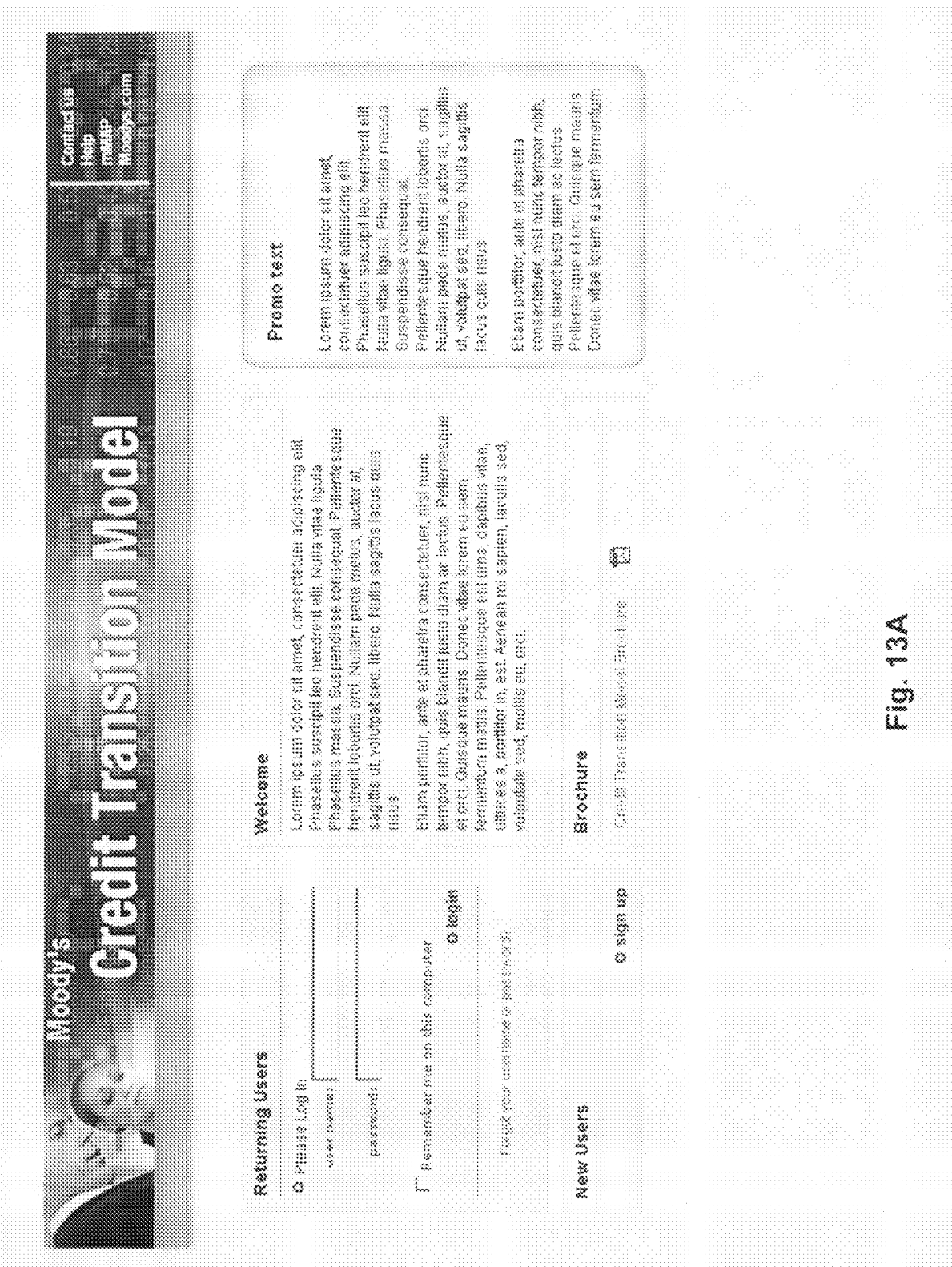
Figure 13B:
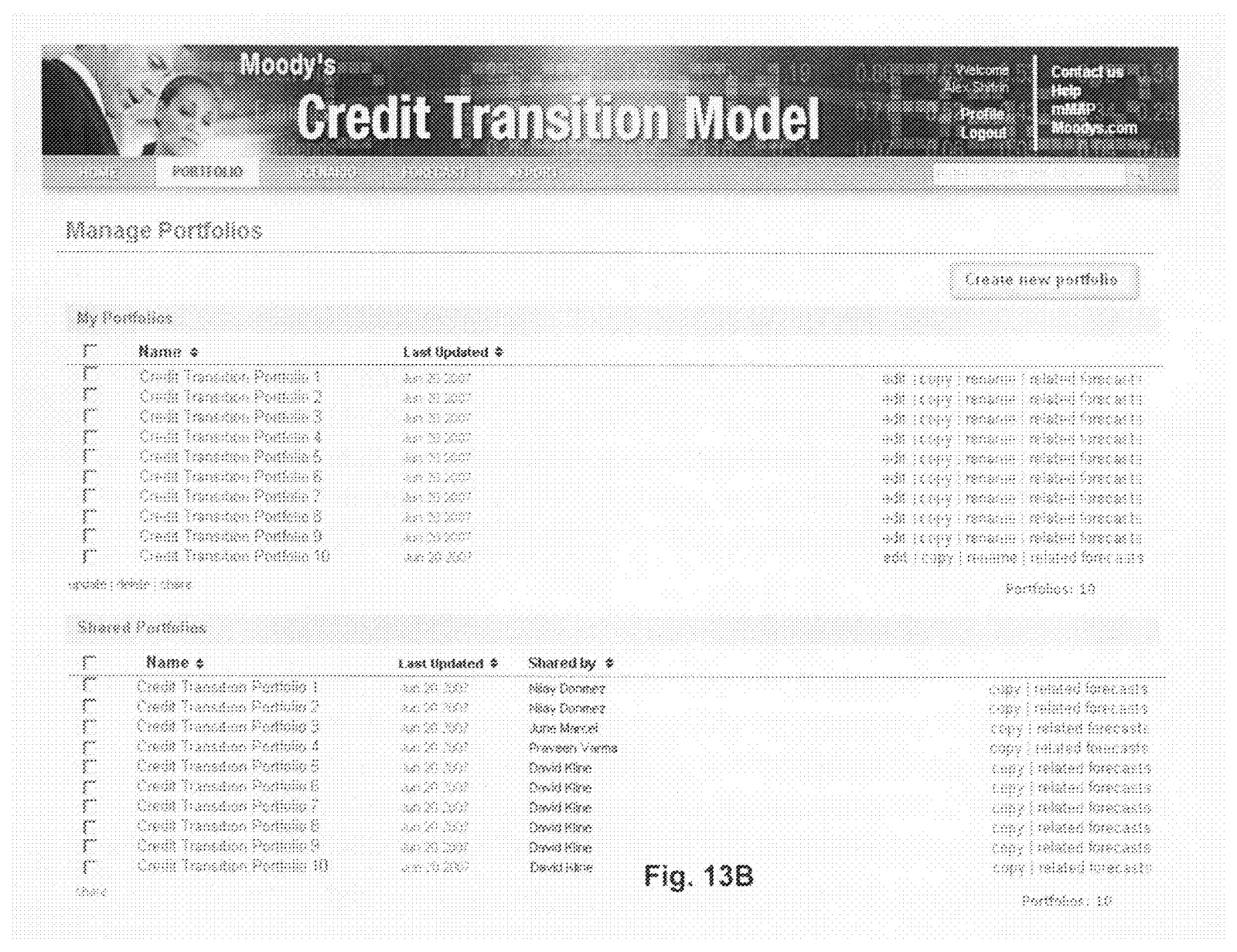
Figure 15A:
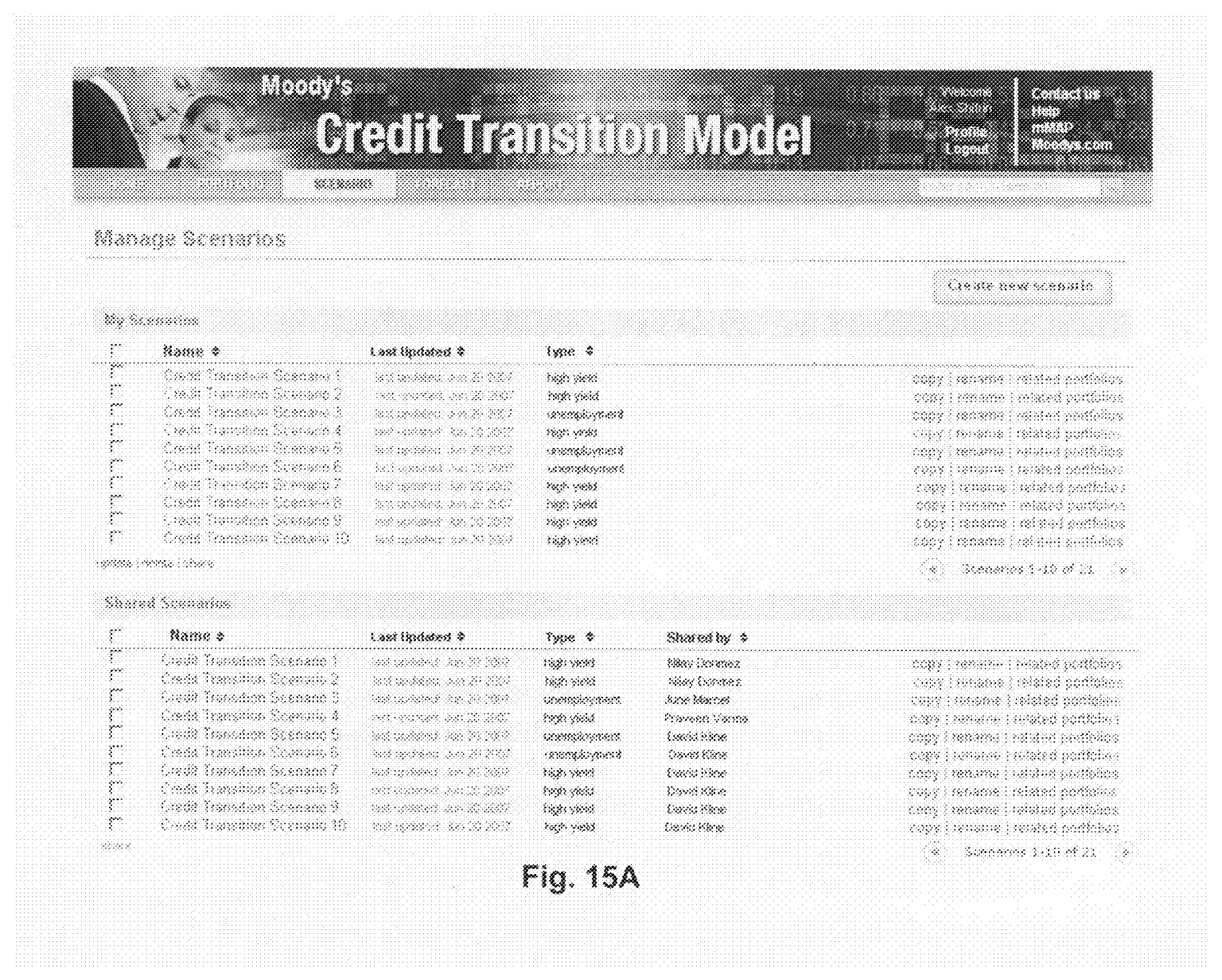

In an exemplary embodiment, a user accesses modules of the credit transition software through a website or other interface. FIG. 13A is an example of a website used to access a login module. A user is able to register with the system 2000 or login if the user is a returning user. When a user logs in to the system, the login module may retrieve any data associated with the user. For example, the login module may retrieve the user's portfolios, scenarios, and forecasts as shown in FIG. 13B or 15A.

At step 1210, a user may access the portfolio module through a website or other interface to create a new portfolio. At step 1211, a user may access the portfolio module to manage portfolios that they have already created. FIG. 13B is an exemplary interface for managing portfolios. The portfolio module may also allow a user to select existing portfolios rather than having to set up portfolios. In addition, the credit transition software may include existing portfolios based on certain indices that can be used for benchmarking various portfolios. For example, the indices may include CDX, iTraxx, or high yield indices.

Figure 13C:
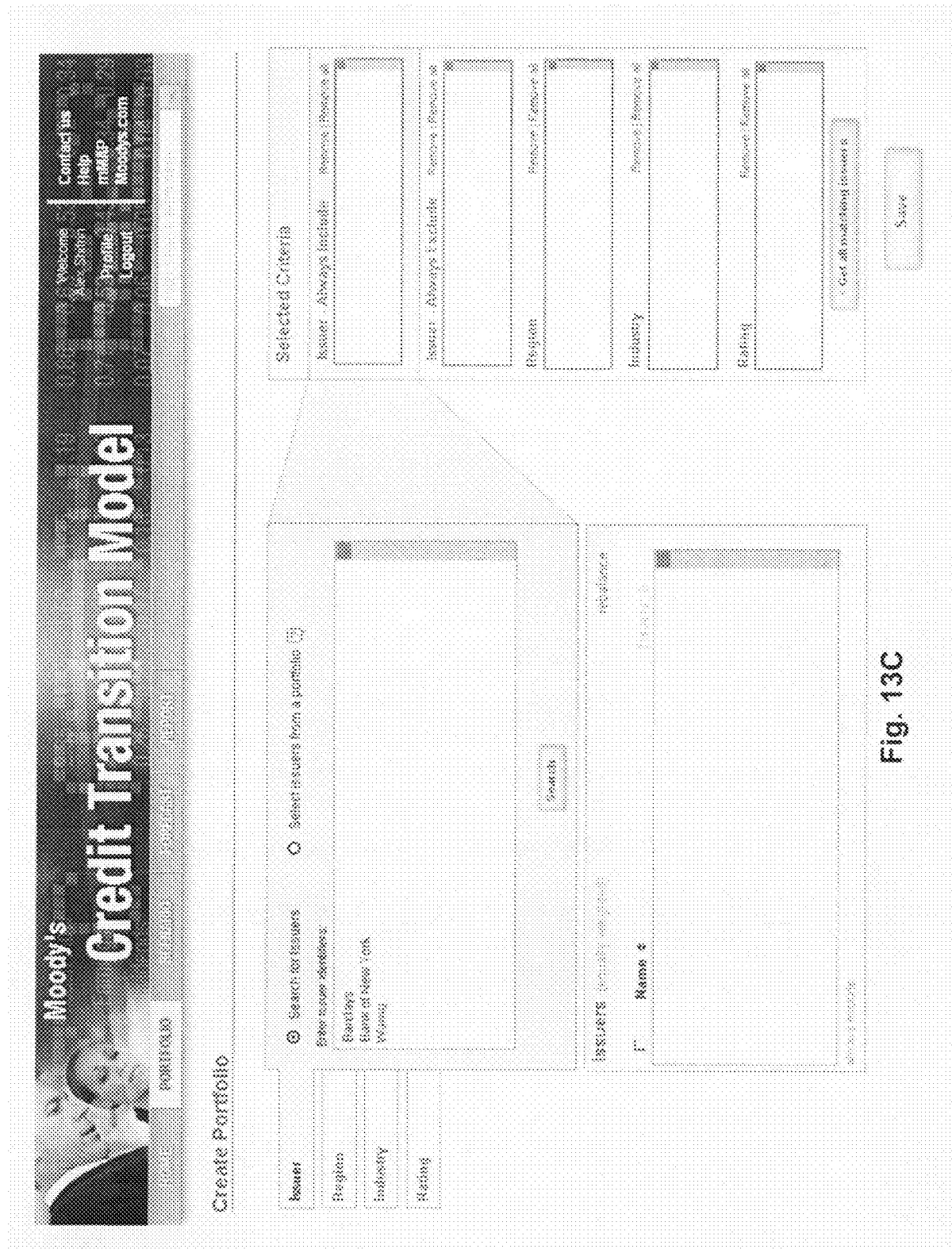
Figure 13D:
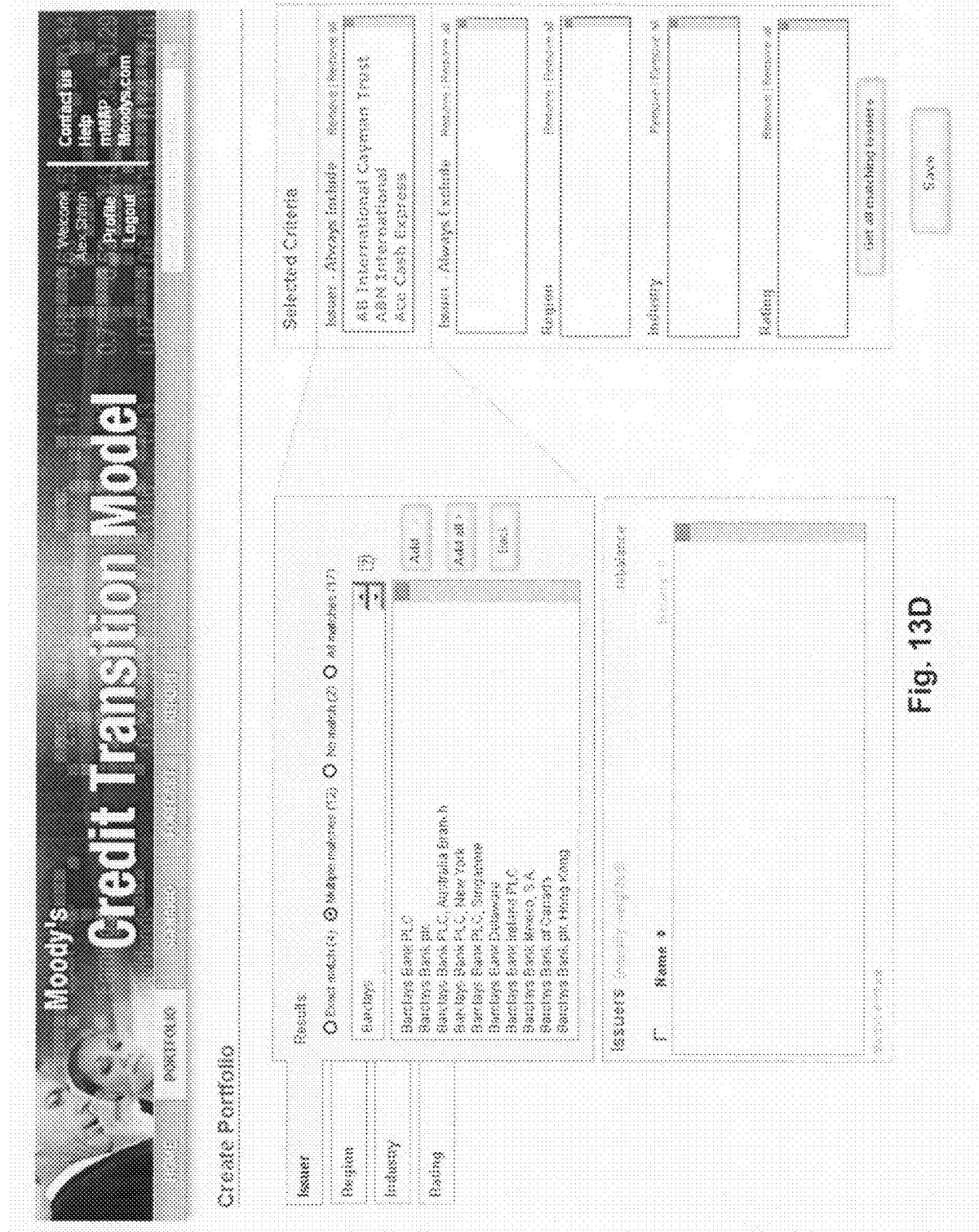

Steps 1201-1203 in FIG. 12 show one exemplary embodiment for capturing data related to issuers. At step 1201, a user may look up issuers of interest to the user. The data about these issuers may be stored in datastore 2004. A user may select issuers from a list of issuers that the user has looked up and the list of issuers is then saved in a datastore 2004. FIG. 13D is an example of an interface used to search for issuers and subsequently add them to a list of issuers to include or exclude. The portfolio module provides access to the interface for searching. At step 1202a, a user may paste a list of names or other identifiers into a web browser 2005a or other interface. FIG. 13C is an example of an interface used to paste in a list of identifiers or names. At step 1202b, a user may import names from a Moody's portfolio or other portfolio.

Figure 13E:
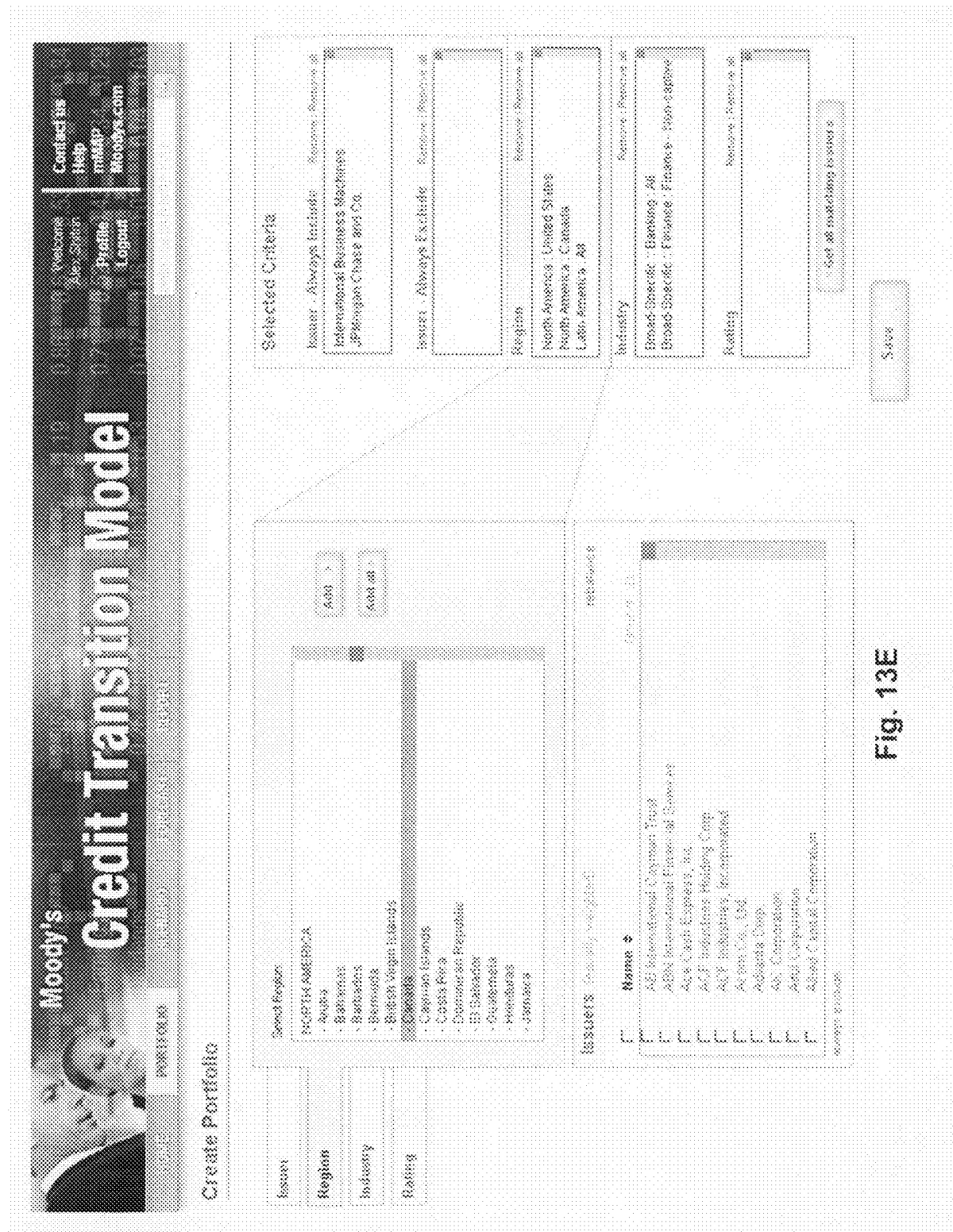
Figure 13F:
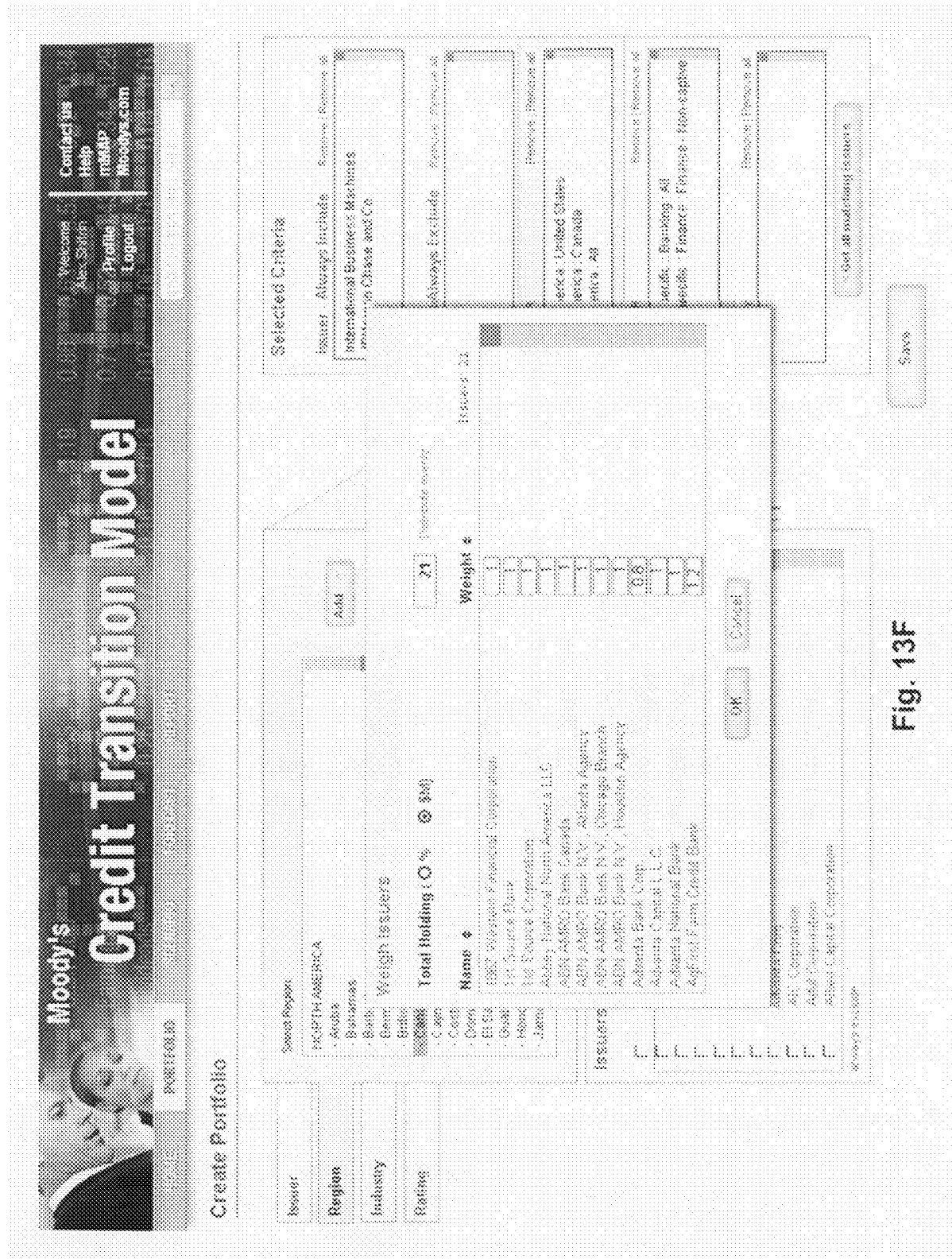

In another exemplary embodiment, or as an additional feature, a user is able to select filtering criteria 1205 based on industry 1204a, region 1204b, or rating 1204c. Other filtering criteria, such as outlook/watchlist status or company size, may be used. The user can also choose issuers to exclude. The filtering criteria limit the issuers and the associated rating facts that are subsequently used by the CTM as inputs. FIG. 13E is an exemplary interface for a user to select filtering criteria based on region. At step 1205, the filtering criteria may be saved. At step 1206, based on the filtering criteria and the issuers selected by a user, the portfolio module can generate a portfolio of issuers for the user to view. FIG. 13F is an exemplary interface showing a list of issuers that match the user's filtering criteria. At step 1207, a user can select and save any issuers to exclude. For example, the user may view the list of issuers that match the filtering criteria and determine which issuers to exclude. The portfolio module saves the filtering criteria and issuers to exclude in a datastore 2004.

Figure 13G:
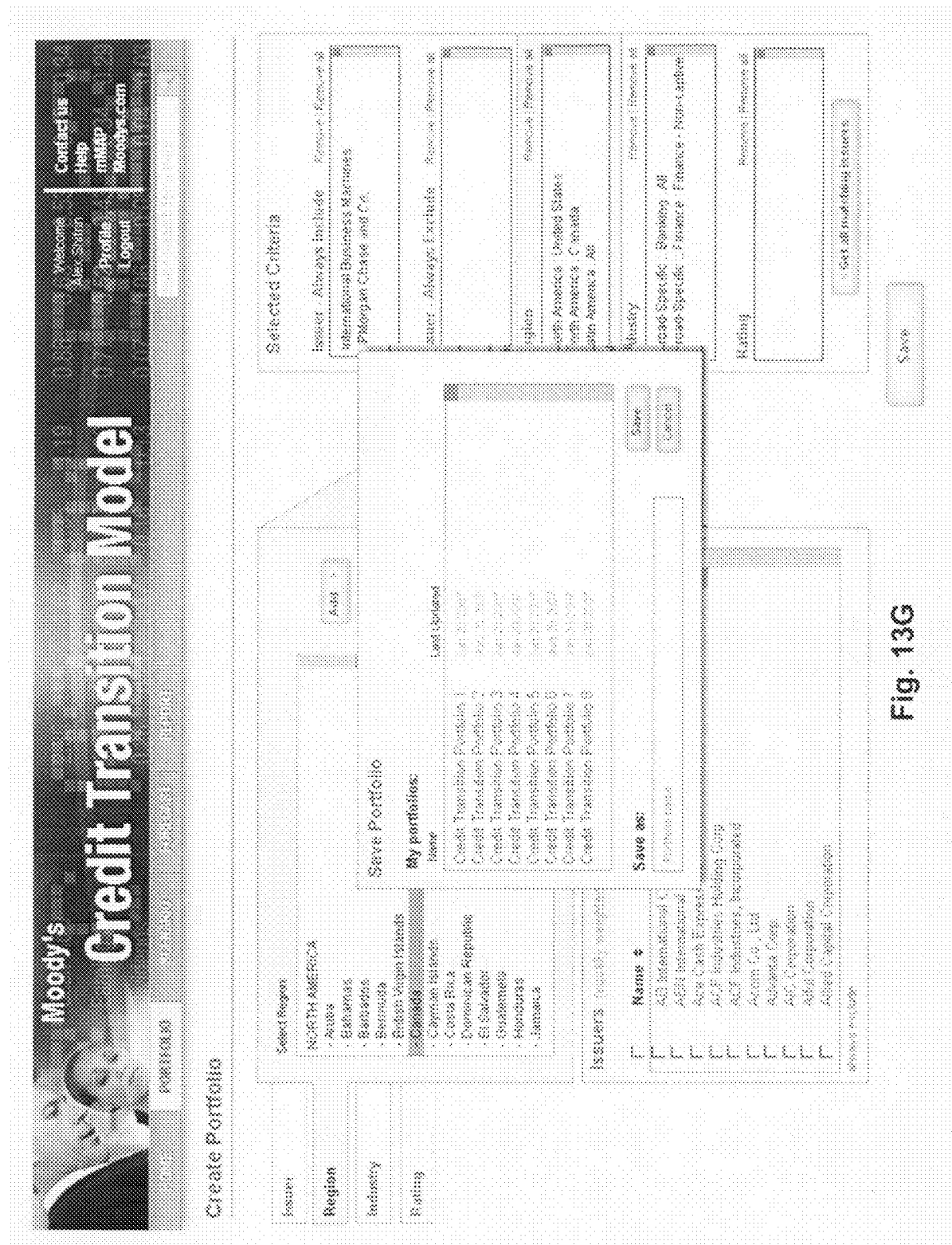

In another exemplary embodiment, the portfolio module obtains portfolio weights from a user (step 1208). FIG. 13F is exemplary interface for a user to enter the portfolio weights. The portfolio weights can be volume weighted or dollar weighted, for example. At step 1209, the data input through the portfolio module may be transmitted from a user's computer system to a datastore 2004 and is stored in the datastore 2004. The information may also be transmitted to the application server 2001 or other processor. FIG. 13G shows an exemplary interface for saving a portfolio.

Figure 16:
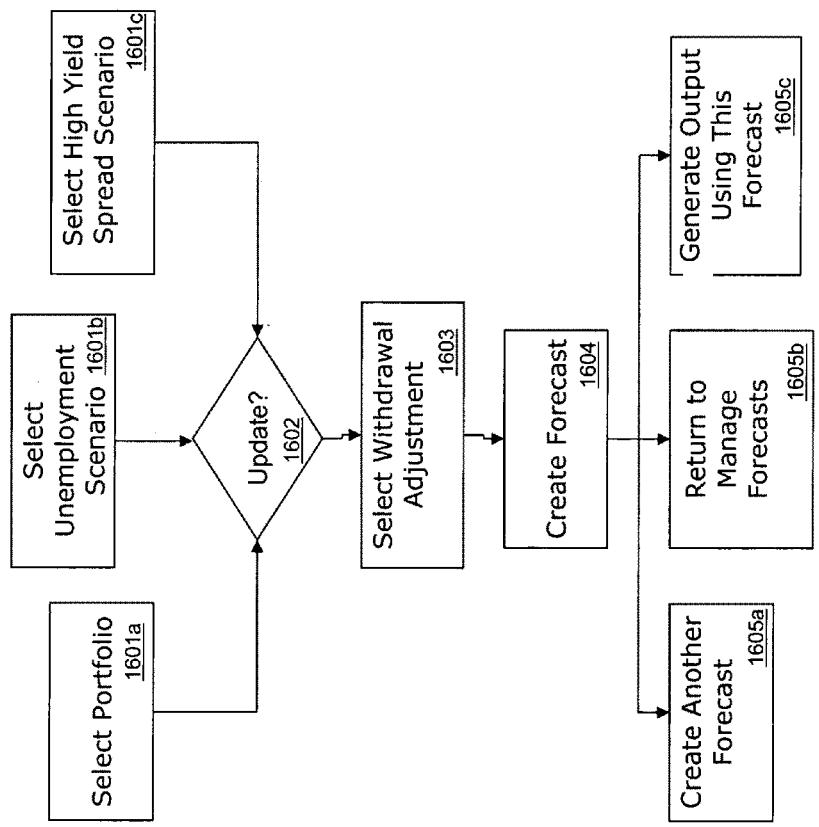
FIG. 16 is an exemplary workflow diagram for using forecasts.

A firm that is rated in one time period, but not rated in the next time period is considered to be withdrawn. In FIG. 16, at step 1603, the portfolio module may allow a user to select a withdrawal adjustment. Default rates predicted by the CTM can be more accurate if withdrawal is taken into account, especially as time horizons increase. If withdrawal is not taken into account, then issuers with lower ratings, such as Ca or C, may have lower default rates than a higher rated issuer, such as a B-rated issuer.

Figure 17A:
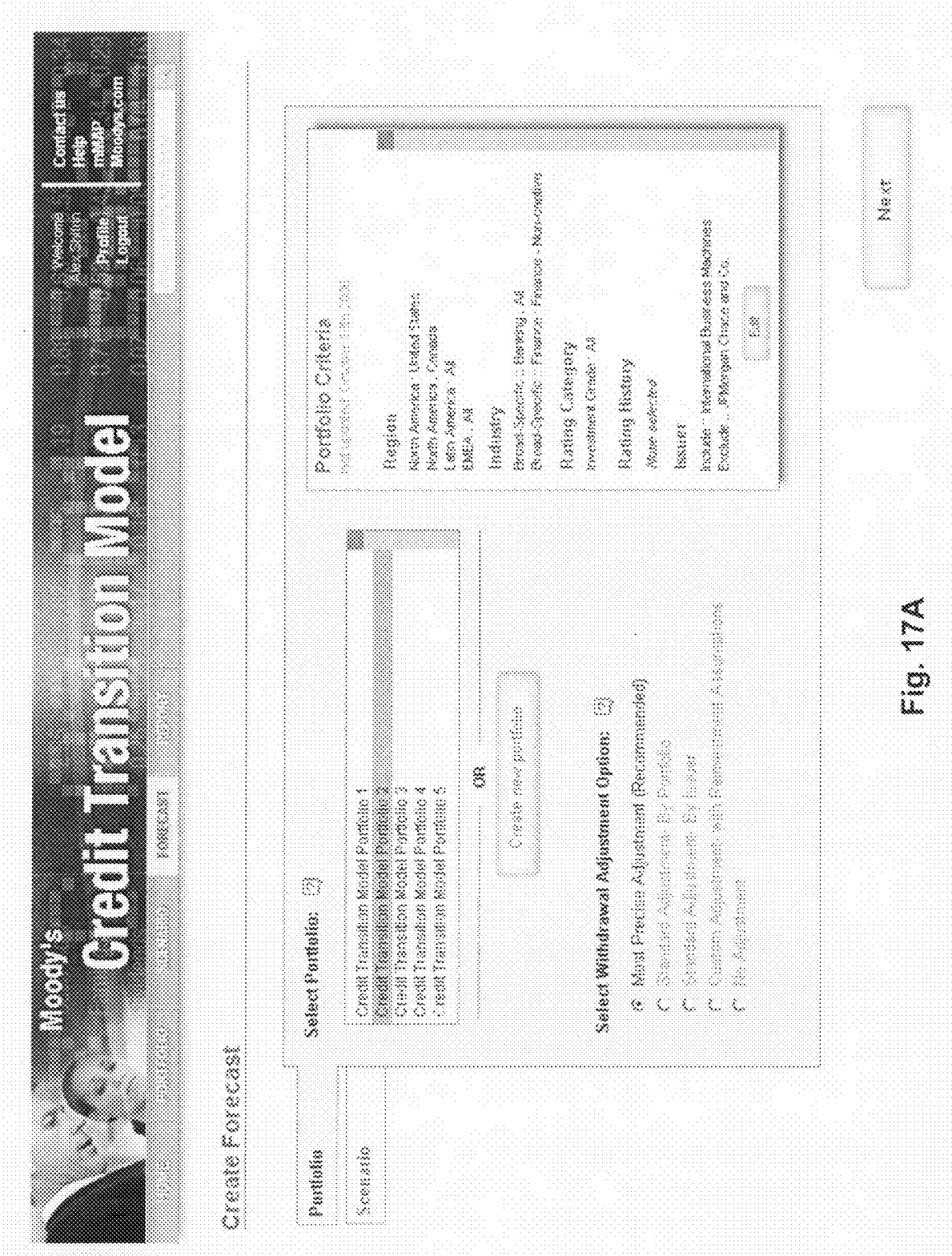
FIGS. 17A-17B are examples of various interfaces for using forecasts.

In the exemplary interface shown in FIG. 17A, there are three options for withdrawal adjustment. In other embodiments, different withdrawal adjustments may be used. Sophisticated Adjustment: The CTM allows for analysis of the default and transition probabilities of an issuer conditional on its rating not otherwise withdrawing through the sophisticated adjustment.

For historical comparison: Users of the CTM often want to produce forecasted default rates for their portfolios which can be compared directly to the historical record. In an exemplary embodiment, this can be readily accomplished by applying the Moody's adjustment to their portfolios' average default and withdrawal rates. This is analogous to how Moody's calculates historical rates.

With re-investment assumption: Clients that have strict investment criteria may not choose to keep a credit that crosses below a certain rating threshold. They might instead choose to trade away that credit and replace it with another credit that corresponds to their investment guidelines. This adjustment allows users to set a threshold and a re-investment rating. The model then assumes that if the rating goes below the threshold, the rating should be replaced with the re-investment rating.

No Adjustment: No adjustment for rating withdrawal is performed.

Scenarios

The scenario module may receive the macroeconomic inputs to the CTM. Various embodiments of the scenario module allow users to easily create and maintain custom scenarios and limit or avoid the need for customers to reenter information for each custom scenario. Embodiments of the scenario module can be used to independently create different types of scenarios. For example, the scenario module may create a scenario of high yield spreads or a scenario of unemployment rates. This may allow users to mix and match scenarios used as input for the CTM.

Figure 14:
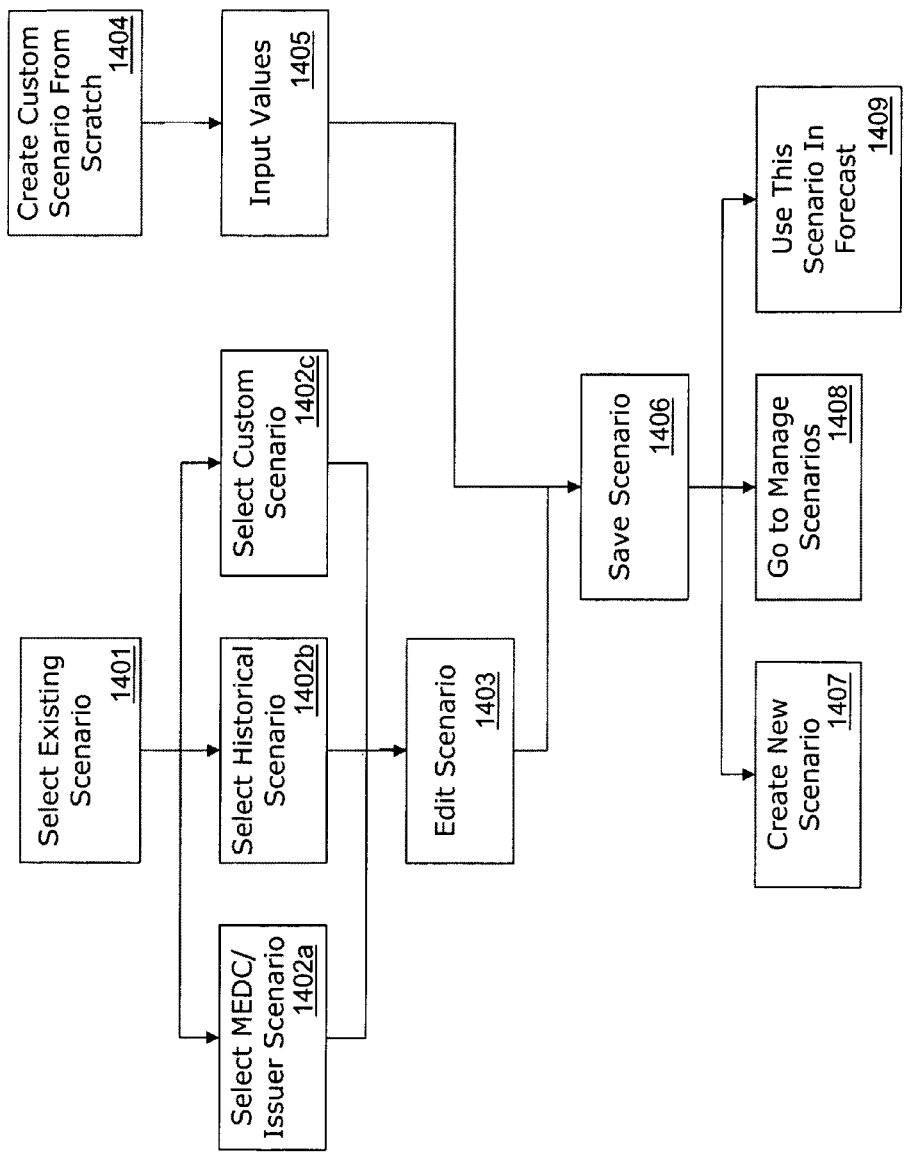
FIG. 14 is an exemplary workflow diagram for using scenarios.

In an exemplary embodiment, the scenario module receives data related to the unemployment rate and high yield spread over Treasuries from various data sources, which are used as inputs to the CTM. An exemplary process for creating a custom scenario for the unemployment rate or a custom scenario for the high yield spread is described in FIG. 14.

Figure 15B:
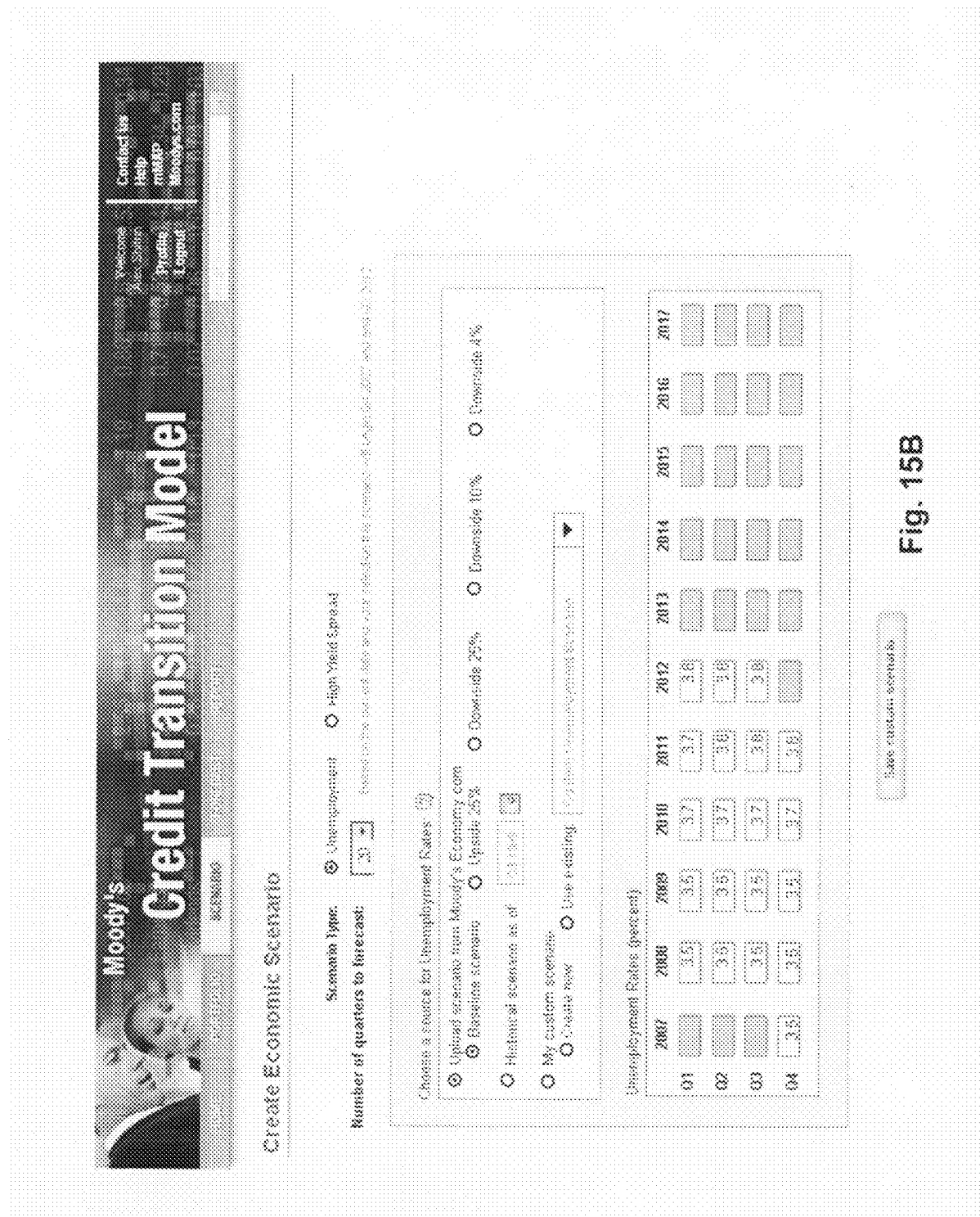
Figure 15C:
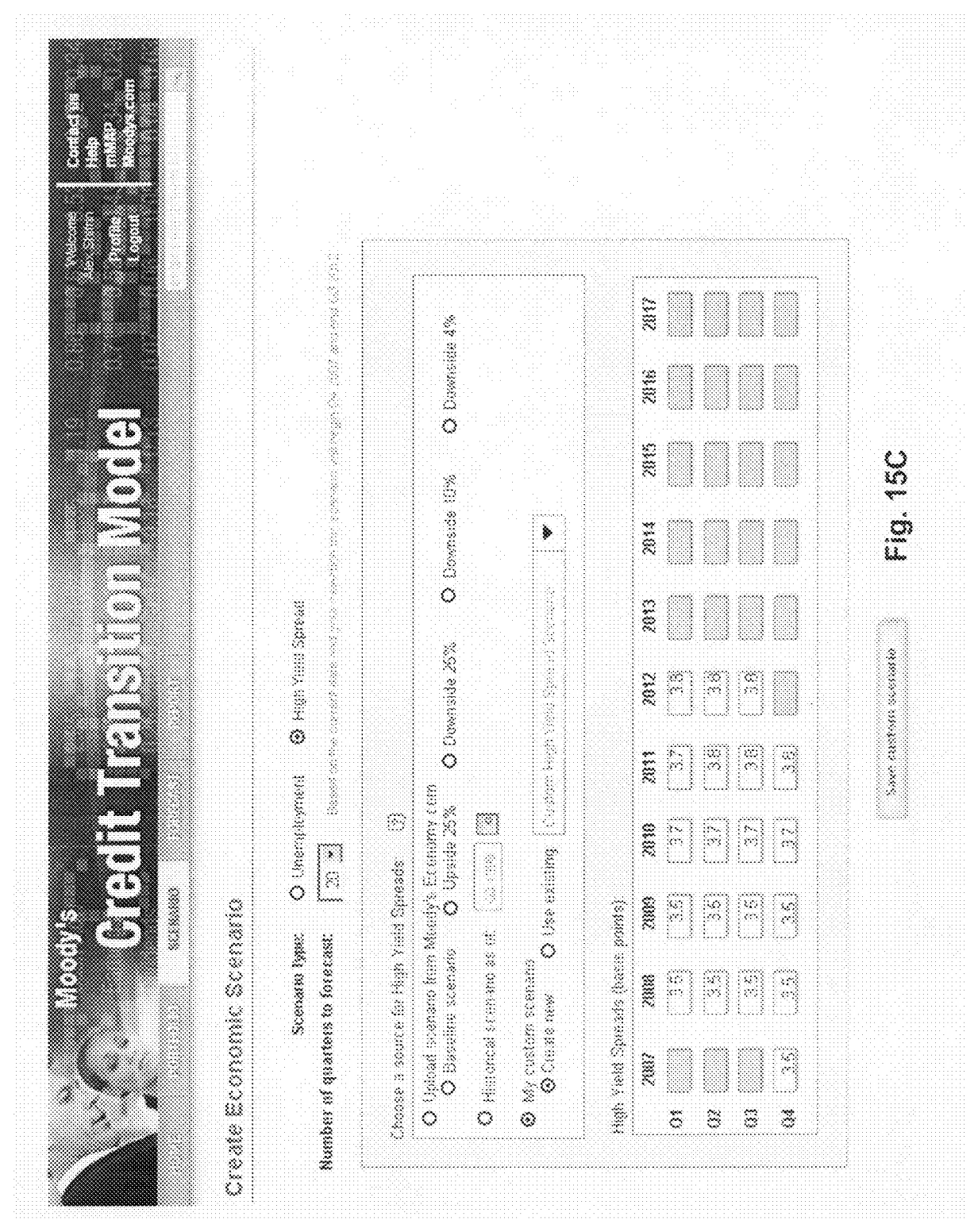

At step 1407, a user may access the scenario module through a website or other interface to create a new scenario. At steps 1401 or 1404, the scenario module may display an interface on the user's computer to allow a user to select an existing scenario or to create a new custom scenario. Exemplary interfaces are shown in FIGS. 15B and 15C. As shown in FIGS. 15B and 15C, the scenario module may obtain data related to the number of quarters for which the unemployment rate or high yield spread will be forecasted. The scenario module may obtain data from a user related to a data source for unemployment rates or high yield spreads. This may include selecting a scenario to be uploaded from a datasource, such as Moody's Economy.com (see step 1402a), a historical scenario (see step 1402b), or a custom scenario from a user (see step 1402c).

If a user selects a scenario to be uploaded from a datasource, for example from Economy.com, the scenario module may gather data related to the type of scenario to be used. A variety of scenarios may be used. For example, as shown in FIGS. 15B and 15C, the type of scenario can be a baseline scenario. A baseline scenario is an economic state that is most likely to happen according to a given forecaster. Another option for a scenario includes one where the upside is twenty five percent. This is a scenario where there is a twenty five percent chance that the state of the economy may be better than the baseline. In this scenario, the unemployment rate may be lower and the high yield spread may be lower. Other examples for options for scenarios include scenarios where the downside is twenty five percent, ten percent, or four percent. In these scenarios, there is a twenty five percent, ten percent, or four percent chance that an economic situation worse than the baseline scenario will occur. In these scenarios, the unemployment rates may be higher and the high yield spread may be higher.

The scenario module provides access to an interface for users to select a historical scenario, a custom scenario, or to create a new scenario. Examples are shown in FIGS. 15B and 15C. A historical scenario may include unemployment rates or high yield spreads as of a defined period of time. The historical scenarios, for example, may be based on high yield spread data from Lehman's index or unemployment data from Economy.com for the period of 1987-1988. At step 1403, once a user chooses a source for the scenario, the user is able to edit the scenario. At step 1405, if a user chooses to create a new scenario, the user can input values for the scenario.

Once a source for unemployment rates and high yield spreads is chosen, the scenario module accesses data from a datastore 2004 having appropriate data. Appropriate data may include forecasted data produced by another model, forecasted data provided by the user, or historical data. For example, Moody's Economy.com may store the appropriate data and provide it to the scenario module. A client who selects a historical scenario is choosing to run their current portfolio through the CTM as if the future economic environment were 100% consistent with some historical period. The scenario module may display the unemployment rates and high yield spreads over a future time period.

Figure 15D:
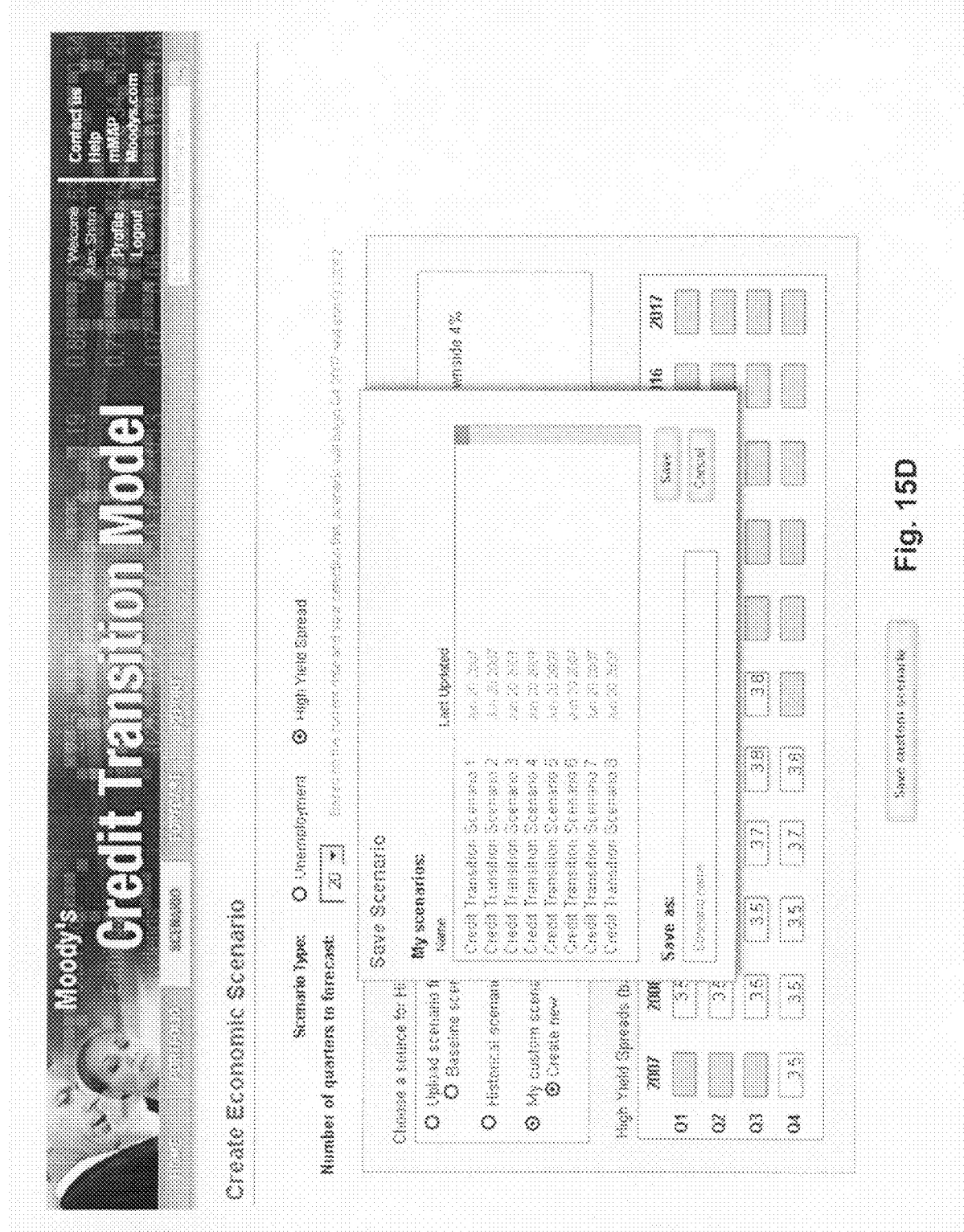

At step 1406, the scenario module saves the user's scenarios. An exemplary interface for saving scenarios is shown in FIG. 15D. Various embodiments of the present invention allow a user to choose to move an existing scenario up or down by a pre-specified amount. This new scenario can be saved as new custom scenarios.

At step 1408, the scenario module allows a user to manage scenarios. These scenarios are retrieved from the datastore by the scenario module when a user logs in to the system. FIG. 15A is an exemplary interface for managing scenarios. The data input or received by the user through the scenario module may be transmitted from a user's computer system to a datastore 2004 and is stored in the datastore 2004. The information may also be transmitted to the application server 2001 or other processor.

Forecasts

In various embodiments of the present invention, the forecast module may allow users to create combinations of portfolios and scenarios that are of interest to a user. The forecast module provides the capability to run the same forecasted information across multiple outputs. The forecasts may be saved as separate items from portfolios and scenarios. In other embodiments, only the portfolio and scenario modules are used.

Figure 17B:
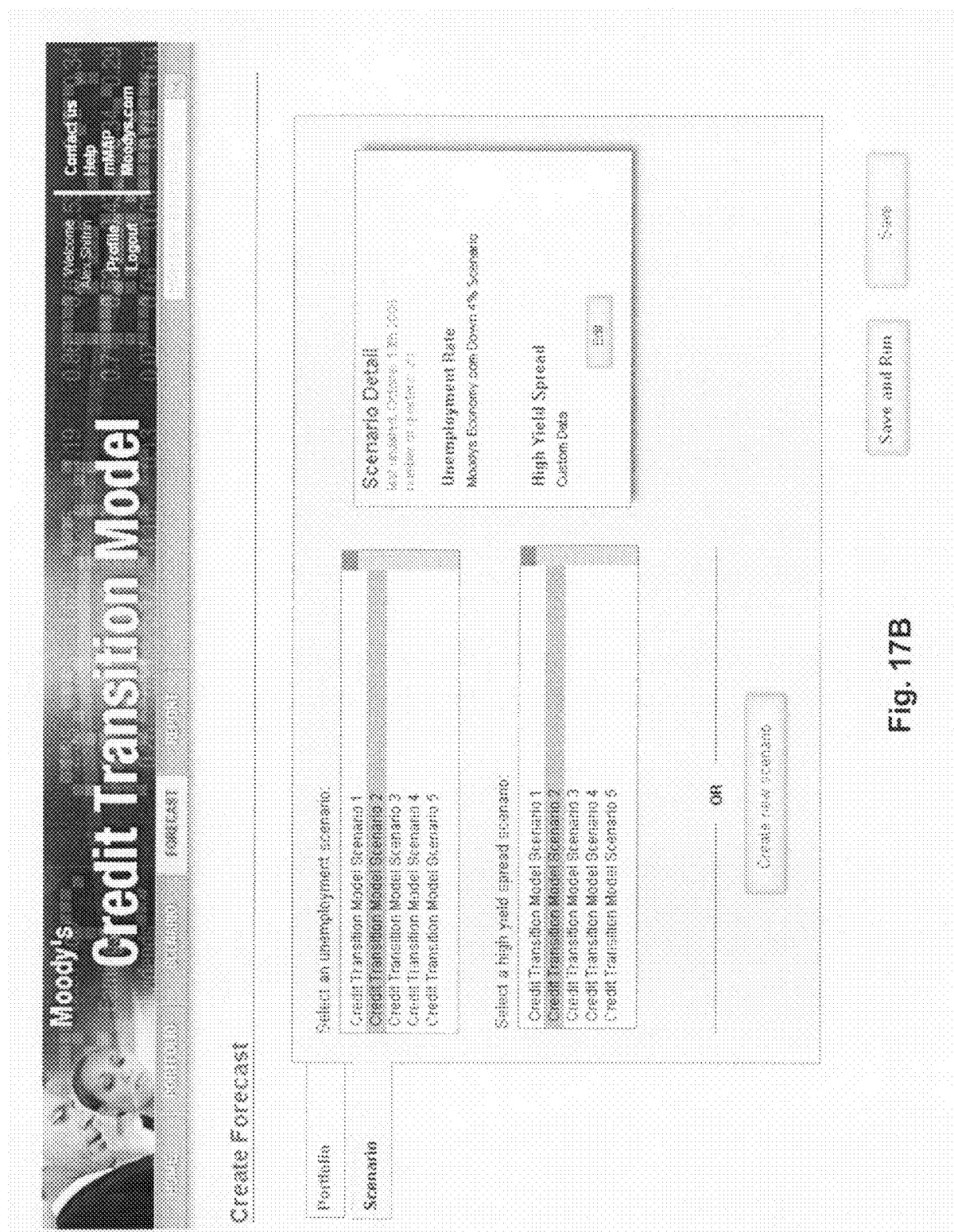

FIG. 16 schematically illustrates an exemplary workflow for setting up forecasts. In an exemplary embodiment, a user accesses the forecast module through a website or other interface. FIGS. 17A and 17B are examples of interfaces for accessing the forecast module. At step 1601a, the forecast module may allow a user to select a portfolio that will be used by the model. FIG. 17A is an exemplary interface for selecting the portfolio. At steps 1601b and 1601c, the forecast module may allow a user to select an unemployment scenario and a high yield spread scenario. FIG. 17B is an exemplary interface for selecting the scenarios. At step 1602, a user may desire to edit the portfolio or scenarios selected. The forecast module may then update the portfolios or scenarios after they are edited. The updated information may be stored in datastore 2004.

Once the user selects all of the information related to portfolios and scenarios, the information may be stored in the CTM database. In some embodiments, a forecast is created by the forecast module (step 1604). Upon creating a forecast, a user has the option of creating another forecast 1605a, managing their forecasts 1605b, or generating output using the forecast that was just created 1605c.

Reporting

Figure 18A:
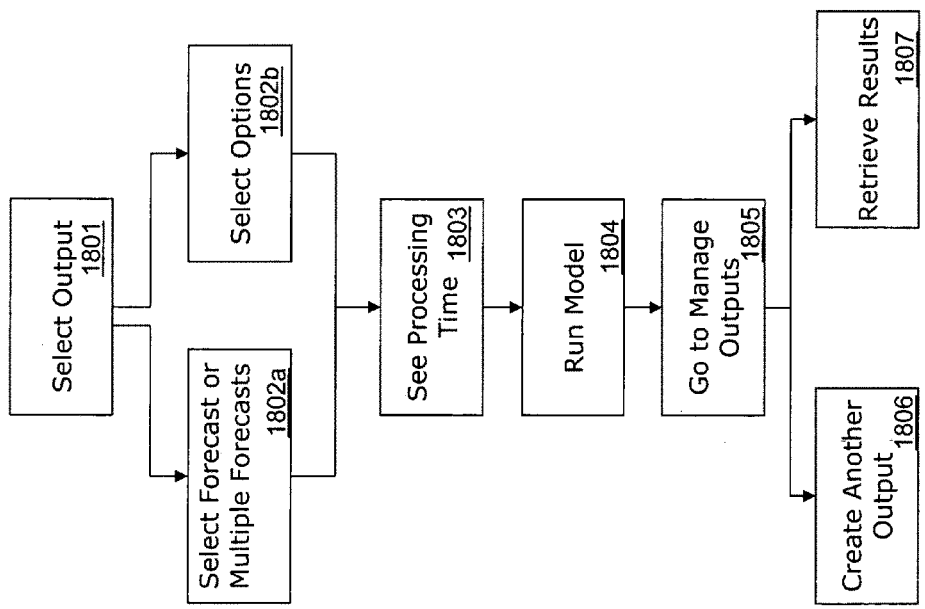
FIGS. 18A-18B is an exemplary workflow diagrams for generating outputs.

FIG. 18A schematically illustrates an exemplary workflow for generating output from the model. Various embodiments of the output module are advantageous because they display and describe available output options and allow users to run output options quickly and efficiently.

Figure 19A:
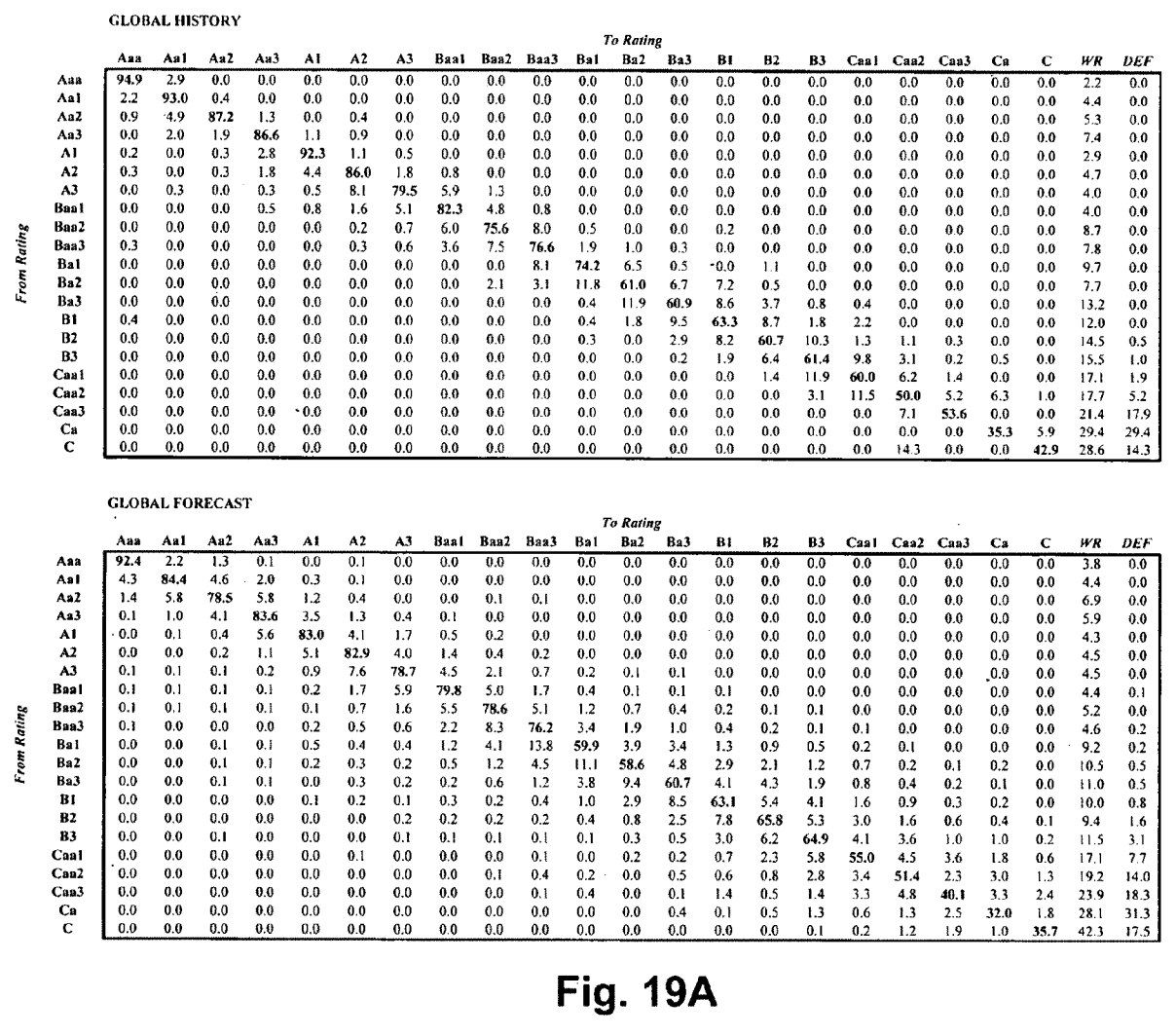

In an exemplary embodiment of the present invention, a user accesses the output module through a website or other interface. The interface provides the user with various selections to generate the model output. At step 1801, a user can select the type of output desired. FIGS. 19A-19Q are examples of the types of output generated by the output module. In some embodiments, at step 1802*a*, a user can select forecasts, portfolios, or scenarios to be used by the model. A user can select one set of portfolios and scenarios or multiple sets. At step 1802*b*, a user can select from various options, such as shortcuts for speeding up the processing time. At step 1803, the output module provides the user with the processing time based on the selected output, portfolios and scenarios chosen, and selected options. The information about outputs selected by the user may be transmitted to the output module. The output module receives the selected information and processes this information.

Figure 18B:
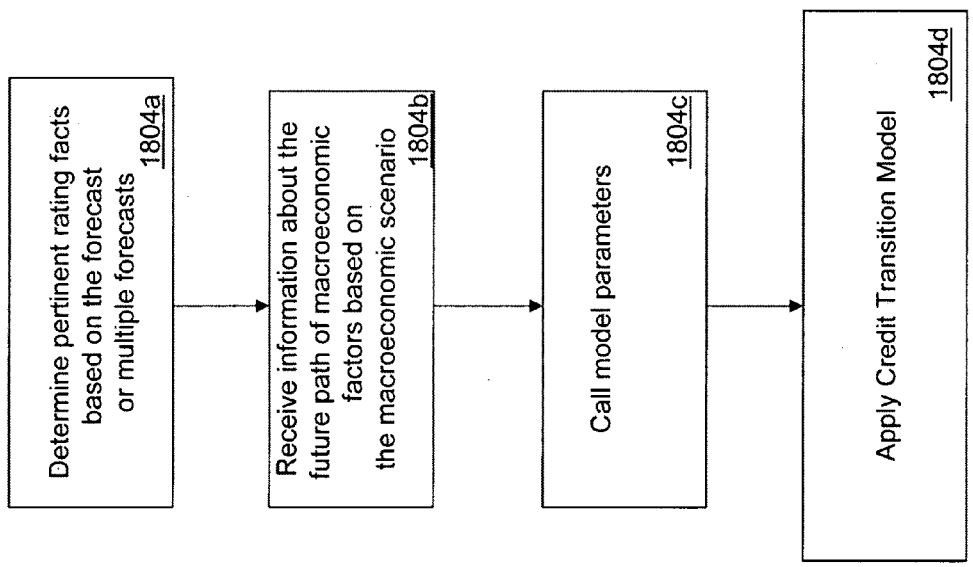

At step 1804, the model is run by a processor. In some embodiments, the processor may be the application server 2001, the database server 2003, or another processor or combination of processors. FIG. 18B is an exemplary flowchart showing steps that may be performed in running the model (see step 1804). A statistical modeling module may receive information from the portfolio, scenario, forecast, or output modules. At step 1804*a*, the statistical modeling module may determine or access pertinent rating facts based on the portfolio selected by a user. These rating facts may include, for example, determining for each issuer the current rating, the rating momentum, and the rating history as discussed above. At step 1804*b*, the statistical modeling module may receive information about the future path of the macroeconomic factors based on the scenario. This may include translating or analyzing macroeconomic data stored in a datastore. At step 1804*c*, the statistical modeling module may call the model parameters. These parameters were discussed above and are included in Appendix A. At step 1804*d*, the statistical modeling module may apply the CTM using the pertinent rating facts, the future path of the macroeconomic factors, and the model parameters to generate the model output. The statistical modeling module may adjust the rating facts for withdrawal when applying the model. For example, the statistical modeling module may apply the model under the assumption that withdrawal is not a possible state.

Once the model is run, the results are made available in a CTM application, such as a web application. At step 1807, a user can retrieve or be provided with the results. At step 1805, a user can manage the model outputs. The user's outputs are stored in a datastore. While the processor is processing the outputs, a user can continue working. For example, the user can create other outputs (see step 1806).

FIGS. 19A-19Q are examples of various outputs generated from the model. The output module may also adjust the results that are outputted based on a withdrawal adjustment selected by the user. The outputs may be exported by the user. The outputs may be at the issuer or portfolio level.

Figure 19C:
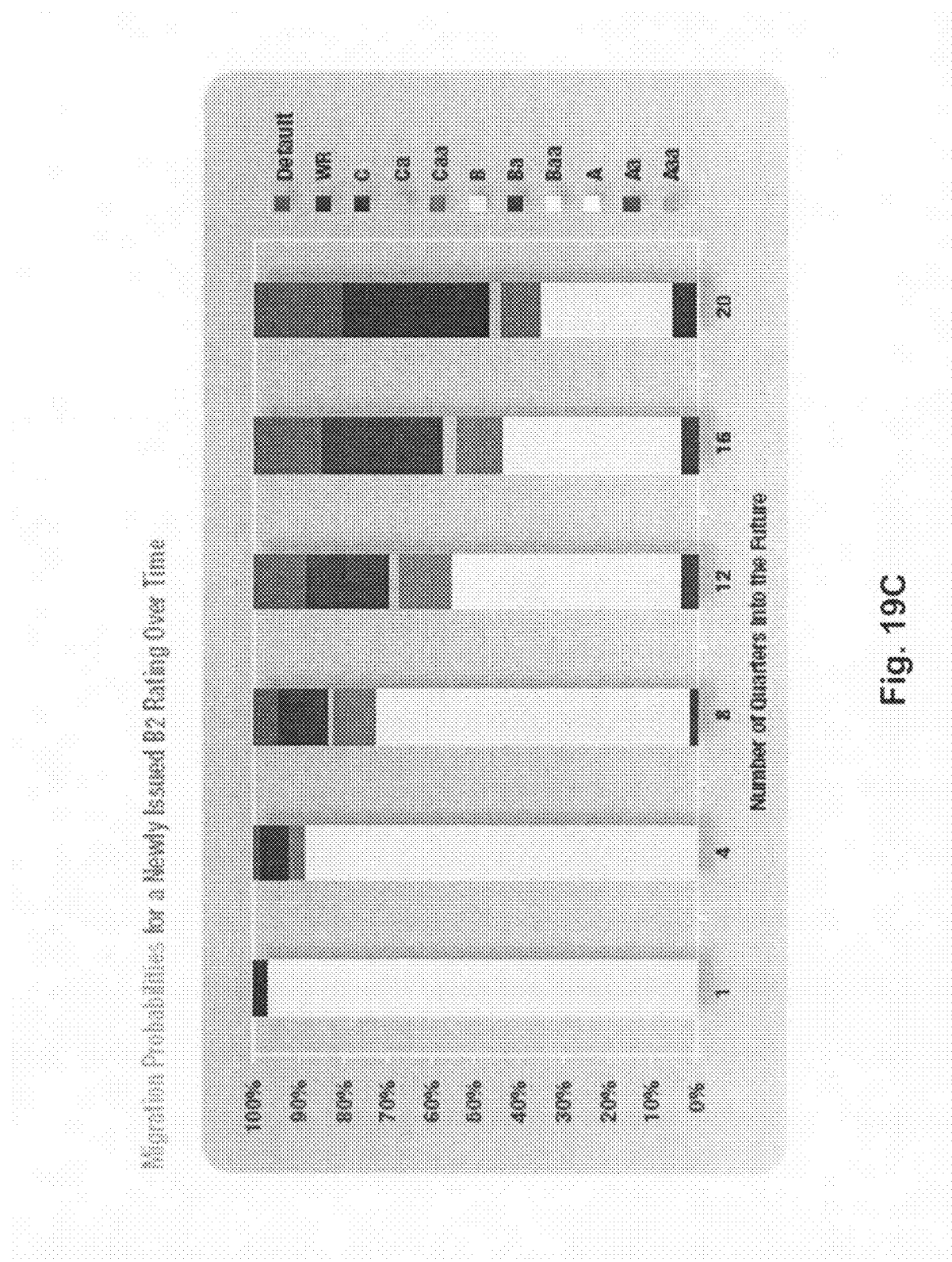
FIGS. 19A-19Q are examples of various outputs from the credit transition model.
Figure 19D:
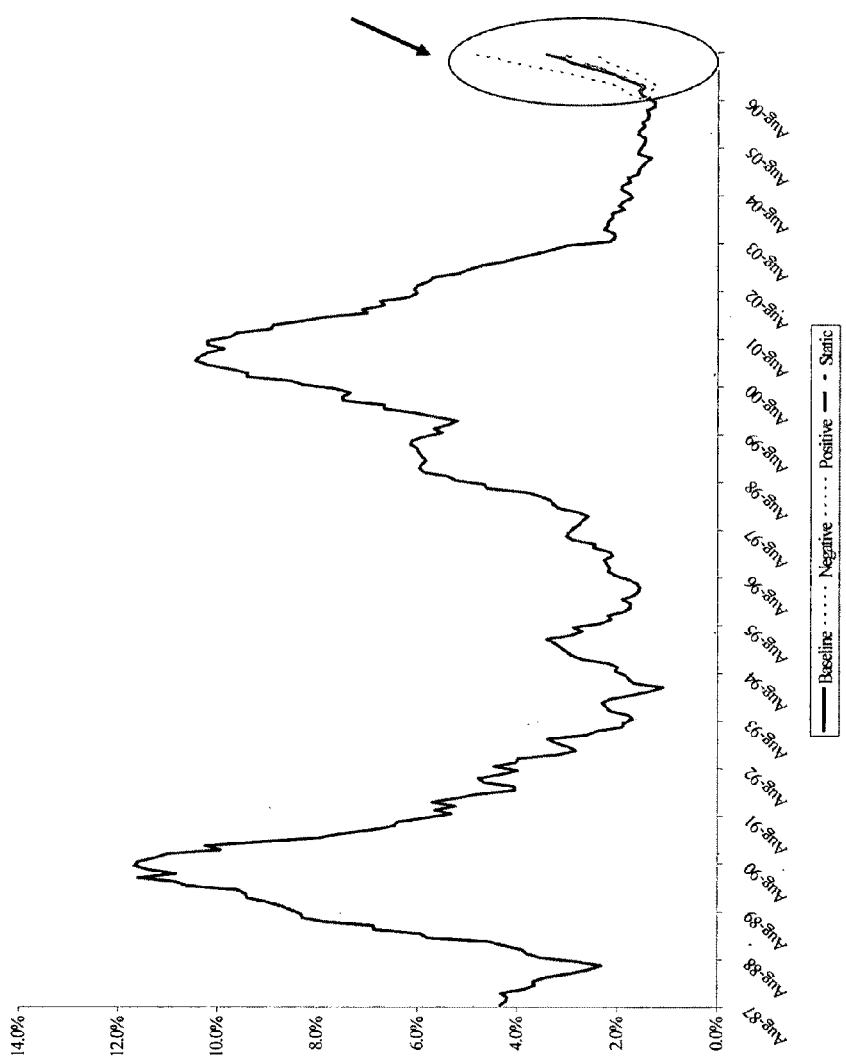
Figure 19E:
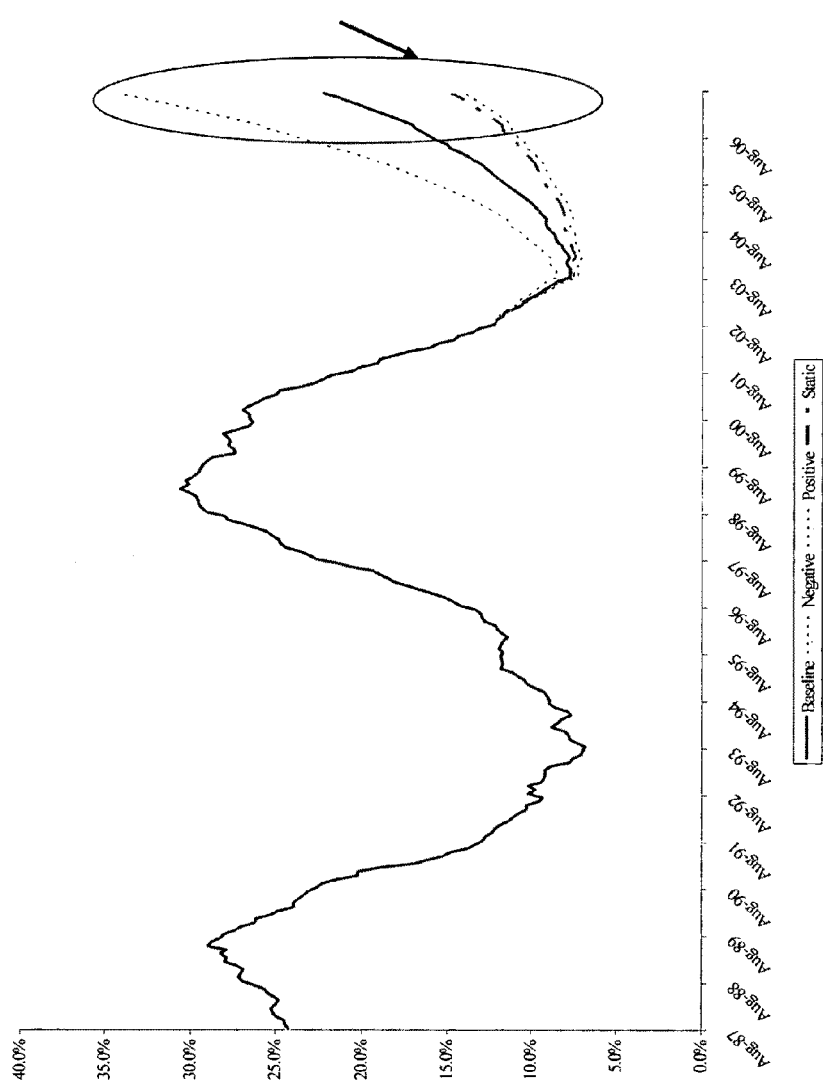
Figure 19F:
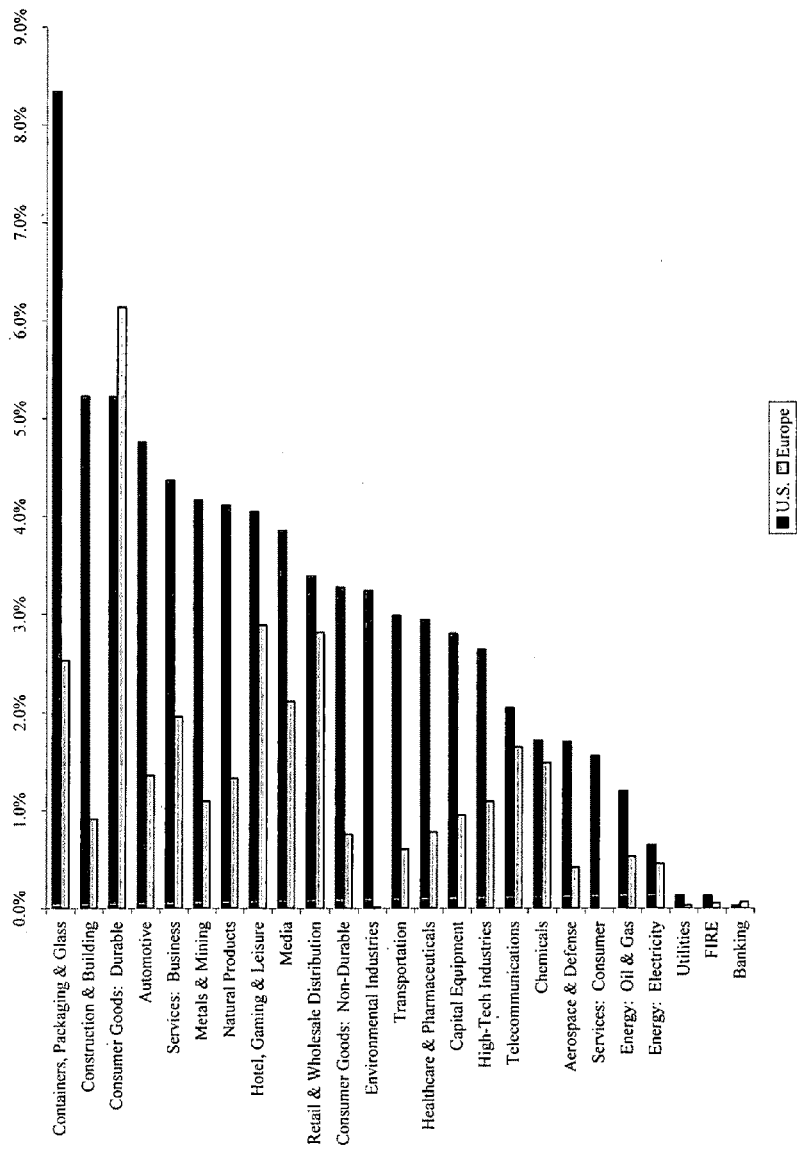
Figure 19G:
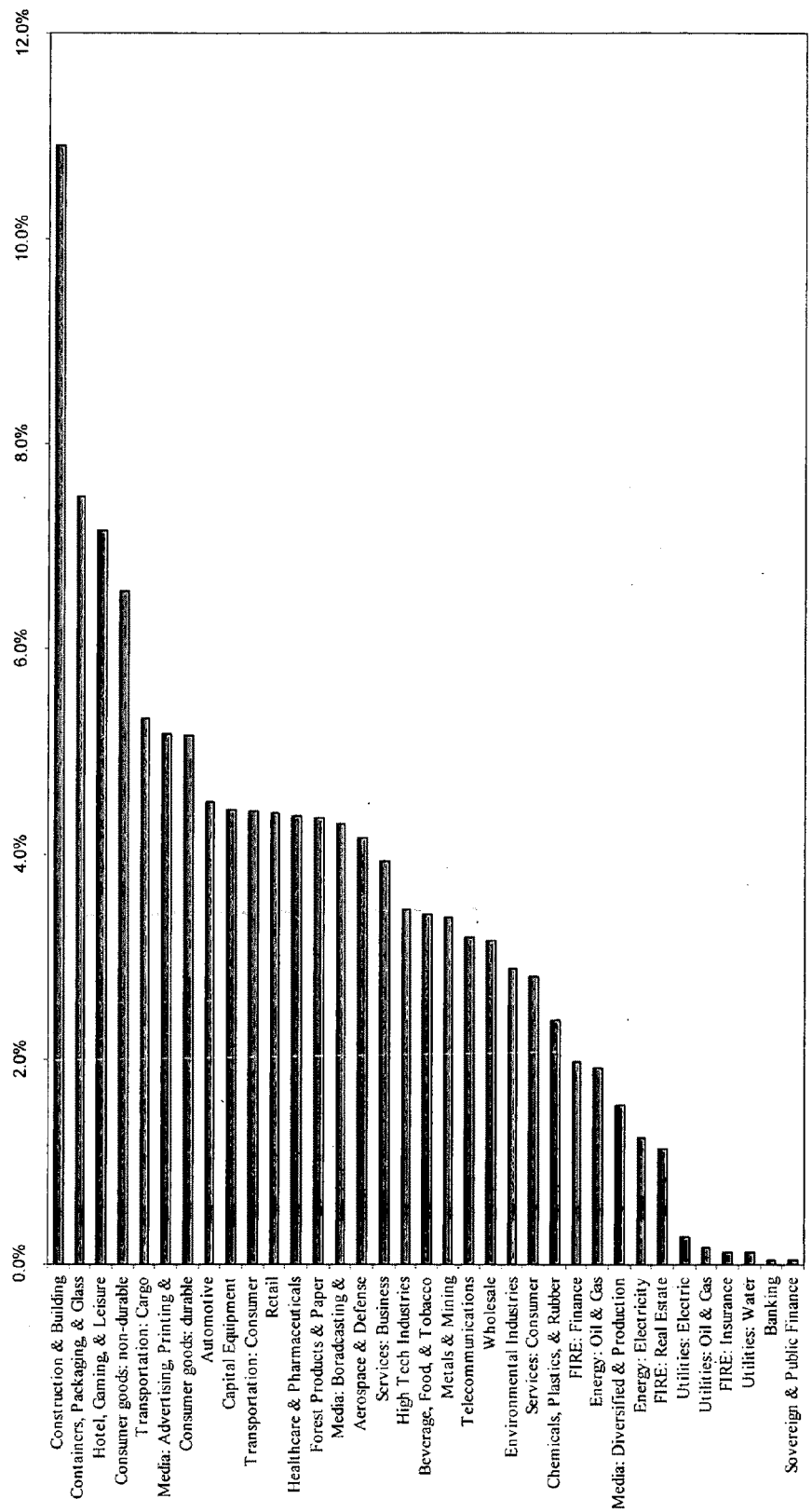
Figure 19H:
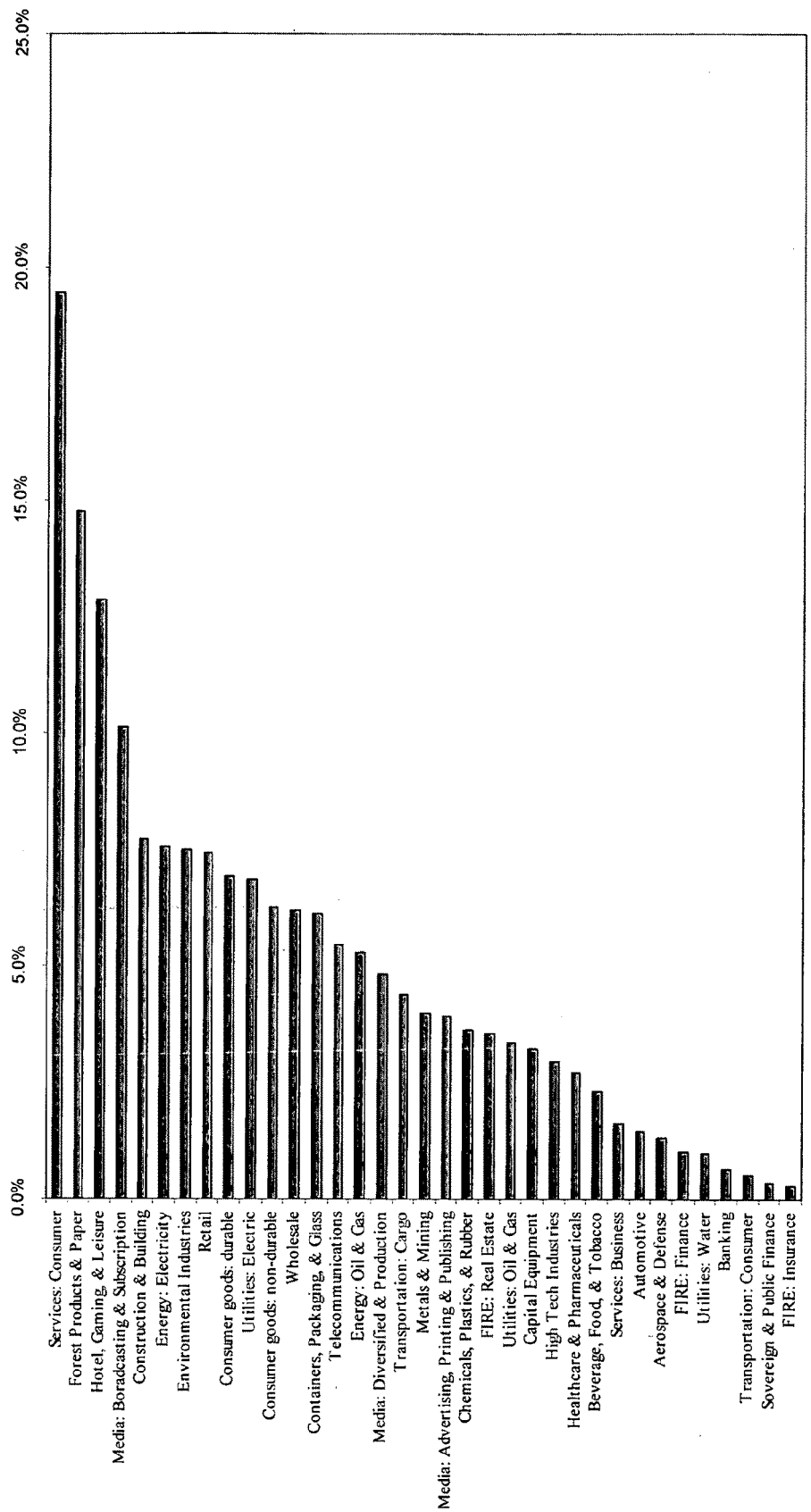
Figure 19I:
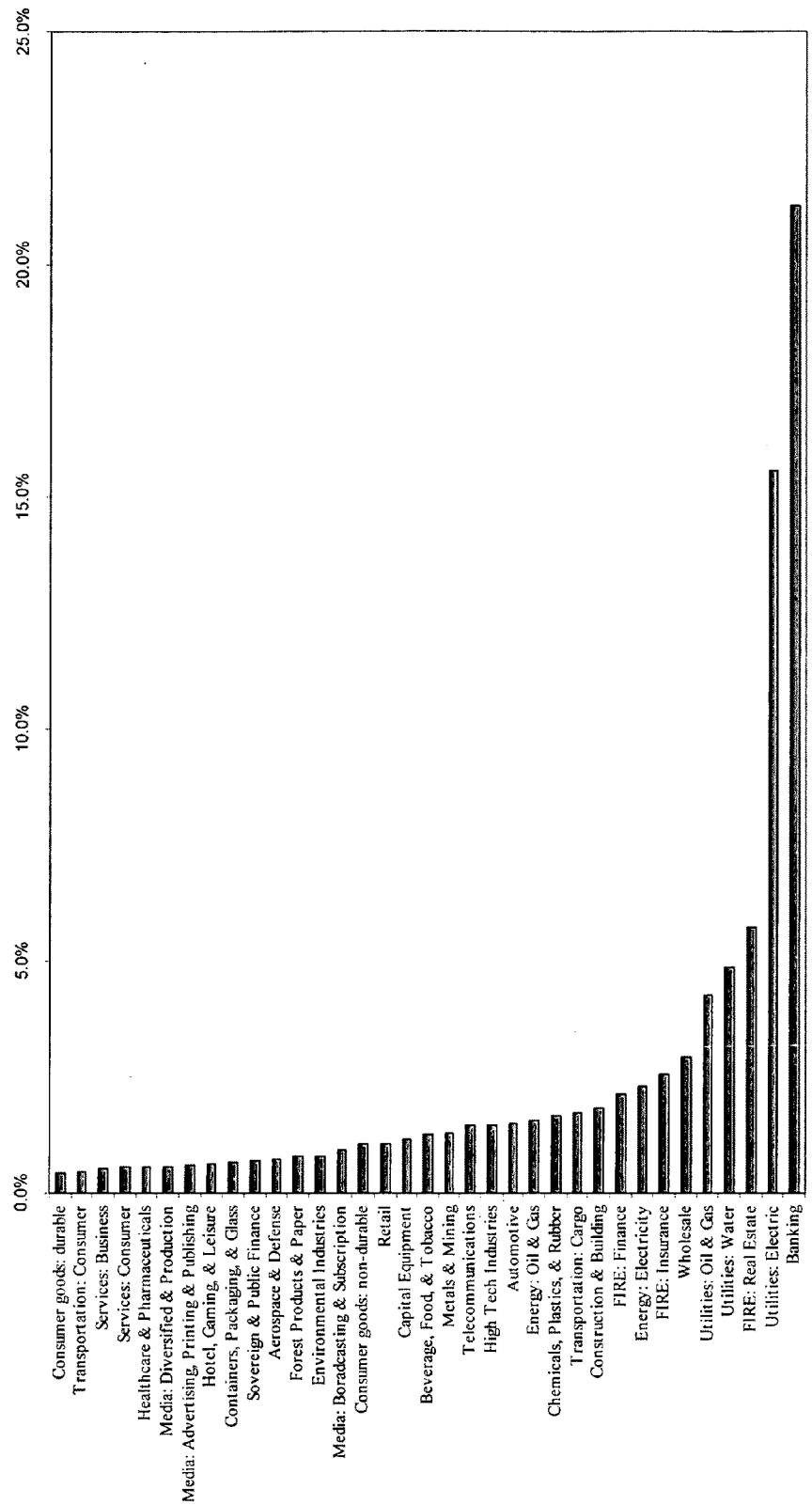

FIG. 19A provides an example of rating migration matrices. The matrices show historical probabilities of rating transitions and one year forecasts of rating transitions. FIG. 19B illustrates a forecast of rating transitions for a single issuer and FIG. 19C illustrates a graph of rating transitions for a single issuer. FIG. 19D is an exemplary output showing a forecast of default rates for one year. FIG. 19E is an exemplary output showing a forecast of default rates for five year. The forecasts are based on three economic scenarios, namely the most likely scenario (baseline), the one upside scenario (positive), and the one downside scenario (negative). These are shown in FIGS. 19D-19E. The static scenario may demonstrate the influence of rating-related factors. FIGS. 19F and 19G are exemplary outputs showing a one year forecast of default rates by industry. This type of output can be generated for any portfolio of rated issuers and can also be volume-weighted. FIGS. 19H and 19I show fallen angel and rising star rates by industry. FIGS. 19J-19Q are examples of expected ratings generated by the CTM.

Figure 20:
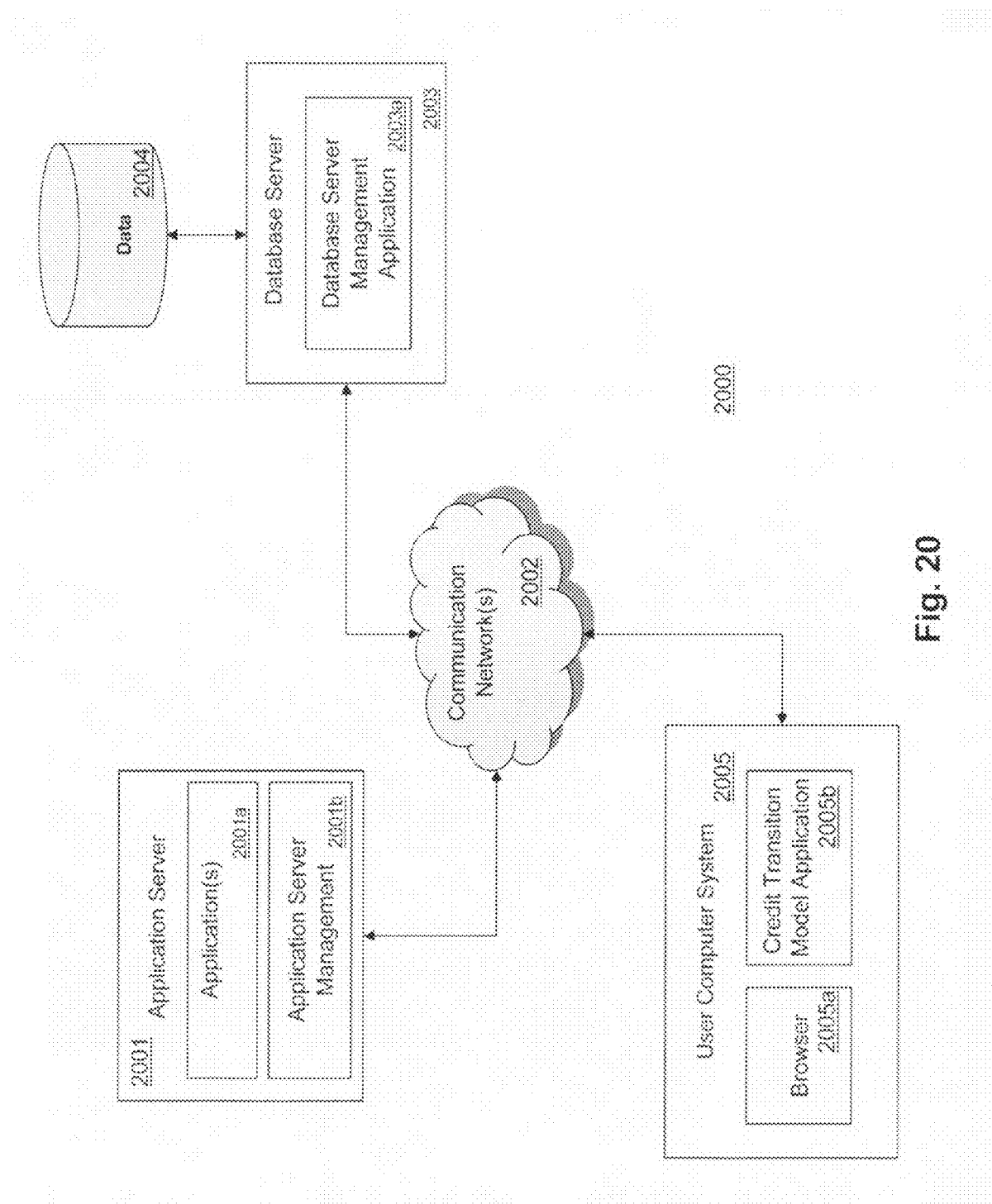
FIG. 20 is an exemplary system diagram.

Other types of output that can be generated include outputs showing first passage probabilities (i.e., the probability that a rating will have crossed a threshold by a specified point in time), forecasted ratings, drill-through reports, and summary reports. In addition, it will be apparent to those skilled in the art that various modifications and variations can be made to the types of outputs generated by the output module FIG. 20 illustrates an exemplary system for predicting credit rating transitions using the CTM. System 2000 includes a user computer system 2005 through which a user may communicate with an application server 2001, database server 2003, or other computer system. Those skilled in the art will recognize that that the user computer system 2005, application server 2001, database server 2003, or any other computer system may be used as a processor for predicting credit rating transitions using the CTM. In addition, the user computer system 2005, application server 2001, database server 2003, or any other computer system include a processor, memory coupled to the processor, user interfaces, and communication equipment coupled to the processor and/or the memory.

The user computer system 2005 can include a browser 2005*a* well as other software. For example, user computer system 2005 may include a CTM application 2005*b*. The user may input information via a web browser 2005*a* or any other graphical user interface of the user computer system known to those skilled in the art. The information input by the user may be stored in a datastore 2004 or memory. Those skilled in the art will recognize variations are possible, such as information input by the user being supplied through a user, with the user being a person, a computer or other system, such as a database, or an XML, API, or other type of computerized interface that is integrated into a software application. Therefore, a user computer system 2005 is adapted for use by the user, such as being adapted for interface with a person or adapted for communication with a computer or other system. For example, the user may enter some information and direct the processor or other control to supply other information from a remote source or local memory.

The user computer system 2005 may be any computer for communication with the application server, database server, or other computer system that is convenient for modeling credit rating transitions of the present invention, such as a handheld processor, a personal computer, a work station, or a "dumb terminal" that is dedicated to communication and display of information only. System 2000 may be in any hardware configuration that is convenient for forecasting relevant probabilities and is not limited to specific hardware or hardware connections. For example, user computer system 2005, application server 2001, database server 2003, and database 2004 may all be contained in the same personal computer. Alternatively as shown in FIG. 20, user computer system 2005 may be a personal computer or work station, application server 2001 and database server 2003 may be an integrated remote processing computer or multiple remote processing computers, and database 2004 may be resident on a remote server or multiple servers.

The data in database 2004 can be stored in one or more databases. Database 2004 can be separate databases or integrated into one or more databases. As a further alternative, the information stored in databases 2004 or input by the user and output by a processor may be fixed on a removable storage medium, such as a magnetic disk or an optical disk.

Communications between the user computer system 2005, the application server 2001, and the database server 2003 may be done in any way convenient to model credit rating transitions. The communication may be internal to a single personal computer. The communication may also be done over a network or networks (2002), which can be an internal network or a telecommunications network, such as the worldwide web. The communication may be done using an XML, API, or other type of interface. The communications may be in any format that is convenient for a user to view the CTM outputs, such as data tables, spreadsheets, graphs, or charts.

In an exemplary embodiment shown in FIG. 20, application server 2001 includes a server management application 2001b that communicates with the browser 2005a. Server management application 2001b further communicates with database server 2003. While FIG. 20 illustrates the interconnection between application server 2001 and database server 2003 as a networked connection (e.g., a local area network connection or wide area network), the application server 2001 may be directly connected to the database server 2003. Application server 2001 further includes one or more applications 2001a that facilitate the modeling of credit rating transitions. These applications can be described as modules. The modules included in application server 2001 or other processor may be software, hardware, or a combination of both. The software may be of any language or form convenient to the modeling credit rating transitions, such as software implemented in C, C++, Java, or other computer language, and may use DLL, SQL or similar database tools.

In an exemplary embodiment shown in FIG. 20, database server 2003 includes a database services management application 2003a that manages storage and retrieval of data from one or more databases 2004. Database server 2003 additionally can communicate with any other data supplier to retrieve data. For example, database server 2003 may communicate with financial information sources to receive updated financial information, macroeconomic information, or rating information used in the model.

Exemplary operation of the system will now be described. The browser 2005a may be used to access the application server 2001 and application server management 2001b. To access the application server 2001, a user may log in or register with the application server management 2001b. The login module may transmit information via the application server management 2001b about registering or logging in from the login module to the user's computer system 2005 for display in the browser 2005a. The login module may also collect information about the user, such as the user's profile, portfolios, scenarios, forecasts, or outputs, from the database server 2003. This information can also be transmitted to the user's computer system 2005 for display in the browser 2005a. Once a user has logged in to the system, the portfolio module may collect information from a user about a portfolio via the application server management 2001b. For example, the portfolio module may collect information about one or more issuers and criteria for selecting issuers, such as one or more issuers to include, one or more issuers to exclude, one or more regions, one or more industries, and one or more ratings.

The portfolio module may receive the information about a portfolio from a user's computer system 2005 and may transmit the information to database 2004 to be stored via the database server 2003.

The scenario module may collect information from a user about macroeconomic scenarios. The information collected is described above. The scenario module may receive the information about a macroeconomic scenario from a user's computer system and may transmit the information to database 2004 to be stored via the database server 2003. The scenario module may receive information about the future paths of macroeconomic factors from database 2004.

In some embodiments, the forecast module may collect information about a forecast. A forecast may be a combination of one or more portfolios, an unemployment rate scenario, and a high yield scenario. The forecast module may receive information about a forecast from a user's computer system 2005 and may transmit the information to database 2004 to be stored via the database server 2003.

A statistical modeling module may be used to model credit rating transitions and predict the probabilities of credit rating transitions using the CTM. The statistical modeling module may retrieve the portfolio data, the scenario data, and the forecast data from the database 2004 via the database server 2003. The statistical modeling module may determine or access rating facts about issuers based on the portfolios. The statistical modeling module may also receive information about the future paths of macroeconomic factors based on the macroeconomic scenarios. The statistical modeling module may retrieve relevant information to determine rating facts or future paths of macroeconomic factors from database 2004. The statistical modeling module runs or applies the CTM using the rating facts and the future paths of the macroeconomic factors and predicts one or more probabilities of credit rating transitions.

The output module may communicate with the user's computer system 2005 and may communicate the outputs from the model in any convenient way. For example, the output module may communicate results from login module, portfolio module, scenario module, and output module. The output module may also communicate the reports described above. The output module may also communicate information stored in database 2004. The output may be of any convenient form, such as a computer display, a print output, or data storage. Similarly, the output may be of any convenient format, such as graphs, data tables, or spreadsheets.

While the credit rating transition model has been described primarily in the context of Moody's ratings, it should be clear that the model is applicable to other similar ratings. Variations may be made to the model to accommodate particular rating schemes without departing from the principles described herein.

Having described the various exemplary embodiments of the present invention, it will be apparent to those skilled in the art that various modifications and variations can be made to the system and method for modeling credit rating transition of the present invention without departing from the spirit or scope of the invention. Thus, it is intended that the present invention cover the modifications and variations of this invention provided they come within the scope of the appended claims and their equivalents.

APPENDIX A

Parameter Estimates

Coefficients and T-Statistics

A.1 Scale Factors

| | Def | W | Up | Dn | Dn to C |
|---|---|---|---|---|---|
| Aaa | | | −5.22 | −5.26 | |
| | | | −7.3 | −10.4 | |
| Aa1 | | −5.13 | −4.32 | −4.59 | |
| | | −7.3 | −8.0 | −9.6 | |
| Aa2 | | −4.64 | −3.82 | −4.47 | |
| | | −6.7 | −7.2 | −9.4 | |
| Aa3 | | −4.73 | −3.98 | −4.91 | |
| | | −7.0 | −7.7 | −10.3 | |
| A1 | | −5.07 | −3.80 | −4.67 | |
| | | −7.4 | −7.4 | −9.9 | |
| A2 | | −5.17 | −3.95 | −4.68 | |
| | | −7.6 | −7.7 | −10.0 | |
| A3 | | −5.16 | −3.57 | −4.50 | |
| | | −7.6 | −7.0 | −9.6 | |
| Baa1 | | −5.18 | −3.68 | −4.53 | |
| | | −7.6 | −7.2 | −9.7 | |
| Baa2 | | −4.99 | −3.62 | −4.51 | |
| | | −7.4 | −7.1 | −9.7 | |
| Baa3 | | −5.10 | −3.24 | −4.60 | |
| | | −7.5 | −6.4 | −9.8 | |
| Ba1 | | −4.16 | −2.78 | −1.75 | |
| | | −7.3 | −5.6 | −3.0 | |
| Ba2 | −13.11 | −4.03 | −2.82 | −1.65 | −2.77 |
| | −8.7 | −7.1 | −5.6 | −2.8 | −2.4 |
| Ba3 | −12.82 | −4.00 | −2.89 | −1.67 | −2.97 |
| | −8.6 | −7.1 | −5.8 | −2.8 | −2.5 |
| B1 | −13.02 | −4.07 | −2.97 | −1.81 | −2.01 |
| | −8.8 | −7.2 | −5.9 | −3.1 | −1.8 |
| B2 | −11.91 | −4.11 | −3.01 | −2.34 | −1.11 |
| | −8.2 | −7.4 | −6.1 | −4.0 | −1.0 |
| B3 | −11.24 | −3.78 | −3.02 | | −0.29 |
| | −7.8 | −6.8 | −6.1 | | −0.3 |
| Caa1 | −3.40 | 4.92 | −4.80 | | −1.36 |
| | −2.7 | 2.5 | −3.3 | | −1.0 |
| Caa2 | −2.70 | 5.09 | −4.78 | | −1.72 |
| | −2.1 | 2.6 | −3.3 | | −1.3 |
| Caa3 | −2.44 | 5.35 | −4.44 | | −1.73 |
| | −1.9 | 2.7 | −3.0 | | −1.3 |
| Ca | −1.99 | 5.81 | −4.86 | | −2.83 |
| | −1.6 | 3.0 | −3.3 | | −2.0 |
| C | −2.26 | 6.13 | −5.44 | | |
| | −1.8 | 3.1 | −3.5 | | |

A.2 Pre-1997 Scale Adjustments

| | Def | W | Up | Dn | Dn to C |
|---|---|---|---|---|---|
| Aaa-pre-1997 | | | −0.06 | −0.01 | |
| | | | −0.2 | 0.0 | |
| Aa1-pre-1997 | | −0.39 | −0.23 | −0.17 | |
| | | −0.9 | −0.5 | −0.7 | |
| Aa2-pre-1997 | | −0.18 | −1.03 | −0.39 | |
| | | −0.6 | −2.6 | −2.0 | |
| Aa3-pre-1997 | | −0.32 | −0.39 | 0.38 | |
| | | −1.3 | −1.5 | 2.2 | |
| A1-pre-1997 | | −0.18 | −0.36 | −0.16 | |
| | | −0.8 | −1.8 | −1.1 | |
| A2-pre-1997 | | −0.11 | 0.28 | −0.15 | |
| | | −0.5 | 1.7 | −1.0 | |
| A3-pre-1997 | | −0.20 | 0.60 | −0.28 | |
| | | −0.9 | 4.1 | −1.9 | |
| Baa1-pre-1997 | | −0.11 | 0.72 | −0.19 | |
| | | −0.5 | 4.6 | −1.3 | |
| Baa2-pre-1997 | | −0.08 | 0.63 | −0.45 | |
| | | −0.3 | 4.2 | −3.0 | |
| Baa3-pre-1997 | | −0.15 | 0.59 | −0.19 | |
| | | −0.6 | 3.9 | −1.2 | |
| Ba1-pre-1997 | | −0.06 | 0.00 | 0.28 | |
| | | −0.3 | 0.0 | 1.6 | |
| Ba2-pre-1997 | −1.23 | −0.15 | 0.01 | 0.25 | |
| | −1.8 | −0.8 | 0.1 | 1.4 | |
| Ba3-pre-1997 | −0.74 | −0.16 | −0.05 | 0.16 | −1.96 |
| | −1.4 | −1.0 | −0.3 | 1.0 | −1.8 |
| B1-pre-1997 | 0.32 | −0.03 | −0.01 | −0.13 | −0.32 |
| | 0.7 | −0.2 | −0.1 | −0.8 | −0.8 |
| B2-pre-1997 | −0.70 | 0.01 | −0.10 | 0.20 | 0.07 |
| | −1.8 | 0.1 | −0.7 | 1.1 | 0.2 |
| B3-pre-1997 | −0.17 | 0.11 | 0.23 | | −0.10 |
| | −0.4 | 0.6 | 1.4 | | −0.4 |
| Caa1-pre-1997 | | | | | |
| Caa2-pre-1997 | 0.82 | 1.52 | −0.16 | | −0.20 |
| | 2.5 | 3.8 | −0.4 | | −0.5 |
| Caa3-pre-1997 | | | | | |
| Ca-pre-1997 | 0.56 | 1.12 | −0.46 | | 0.64 |
| | 1.5 | 1.9 | −0.7 | | 0.9 |
| C-pre-1997 | 0.53 | | 1.85 | | |
| | 0.8 | | 1.6 | | |

A.3 Additional IG Parameters

IG Aggregate

| | Def | W | Up | Dn | Dn to C |
|---|---|---|---|---|---|
| Age | | | 2.89 | −0.50 | −0.99 |
| | | | 5.8 | −1.1 | −2.7 |
| $Age^2$ | | | −2.41 | 0.73 | 0.66 |
| | | | −6.5 | 2.1 | 2.4 |
| Up q1 | | | 0.93 | −0.08 | −0.72 |
| | | | 2.8 | −0.3 | −2.1 |
| Up q2 | | | 1.04 | 0.59 | −0.14 |
| | | | 2.9 | 2.2 | −0.5 |
| Up q3 | | | 0.92 | 0.39 | −0.29 |
| | | | 2.3 | 1.6 | −1.0 |
| Up q4 | | | 0.56 | 0.73 | −0.30 |
| | | | 1.9 | 3.4 | −1.1 |
| Up q5-6 | | | 0.71 | 0.67 | −0.41 |
| | | | 2.9 | 3.7 | −2.4 |
| Up q7-8 | | | 0.50 | 0.60 | −0.19 |
| | | | 2.4 | 3.6 | −1.2 |
| Up q9-10 | | | 0.24 | 0.29 | −0.19 |
| | | | 1.2 | 1.9 | −1.3 |
| Up q11-12 | | | −0.20 | −0.03 | −0.40 |
| | | | −0.8 | −0.2 | −2.4 |
| Dn q1 | | | 0.31 | −1.98 | 2.10 |
| | | | 0.9 | −4.2 | 10.0 |
| Dn q2 | | | 0.53 | −1.58 | 1.54 |
| | | | 1.4 | −3.5 | 7.3 |
| Dn q3 | | | 0.82 | −0.72 | 1.63 |
| | | | 2.1 | −2.4 | 7.6 |
| Dn q4 | | | −0.10 | −0.69 | 1.32 |
| | | | −0.3 | −2.5 | 6.7 |
| Dn q5-6 | | | 0.24 | −0.15 | 0.71 |
| | | | 0.9 | −0.7 | 5.3 |
| Dn q7-8 | | | 0.12 | 0.17 | 0.50 |
| | | | 0.5 | 0.9 | 3.8 |
| Dn q9-10 | | | 0.27 | 0.09 | 0.38 |
| | | | 1.4 | 0.6 | 3.1 |
| Dn q11-12 | | | −0.37 | −0.02 | 0.34 |
| | | | −1.4 | −0.2 | 2.5 |

|  | A.4 Additional SG Parameters | | | | |
|---|---|---|---|---|---|
|  | SG Aggregate | | | | |
|  | Def | W | Up | Dn | Dn to C |
| Age | 0.71 | 2.89 | −0.50 | −0.99 | −1.16 |
|  | 1.1 | 5.8 | −1.1 | −2.7 | −1.8 |
| Age$^2$ | −0.61 | −2.41 | 0.73 | 0.66 | 1.07 |
|  | −1.1 | −6.5 | 2.1 | 2.4 | 2.0 |
| Up q1 | 4.97 | −0.27 | 1.66 | −0.93 |  |
|  | 5.9 | −1.3 | 5.7 | −2.0 |  |
| Up q2 | −0.59 | 0.38 | 1.88 | −0.88 | 1.64 |
|  | −1.5 | 1.7 | 7.3 | −2.5 | 2.8 |
| Up q3 | −0.59 | −0.01 | 1.32 | −0.44 | −0.93 |
|  | −1.5 | 0.0 | 6.0 | −1.4 | −1.3 |
| Up q4 | −0.59 | 0.16 | 0.93 | −0.24 | −0.01 |
|  | −1.5 | 0.6 | 4.7 | −0.9 | 0.0 |
| Up q5-6 | −0.59 | 0.20 | 1.08 | −0.28 | −0.93 |
|  | −1.5 | 1.1 | 7.2 | −1.3 | −1.8 |
| Up q7-8 | −0.59 | 0.23 | 0.53 | −0.06 | −0.05 |
|  | −1.5 | 1.2 | 3.5 | −0.3 | −0.1 |
| Up q9-10 | −0.59 | 0.08 | 0.13 | −0.39 | 0.08 |
|  | −1.5 | 0.4 | 0.8 | −1.7 | 0.2 |
| Up q11-12 | −0.59 | 0.27 | 0.32 | 0.05 | −0.69 |
|  | −1.5 | 1.3 | 1.8 | 0.2 | −0.9 |
| Dn q1 | 7.05 | −1.15 | −0.11 | 2.52 | 3.18 |
|  | 15.5 | −5.0 | −0.3 | 11.5 | 7.1 |
| Dn q2 | 2.04 | −0.53 | 0.93 | 1.65 | 2.88 |
|  | 4.4 | −2.2 | 3.4 | 8.8 | 6.5 |
| Dn q3 | 1.33 | −0.31 | 0.43 | 1.46 | 1.18 |
|  | 3.3 | −1.3 | 1.7 | 7.7 | 4.5 |
| Dn q4 | 0.41 | −0.24 | 0.23 | 1.26 | 0.80 |
|  | 1.0 | −0.9 | 1.0 | 6.9 | 2.6 |
| Dn q5-6 | 0.78 | −0.13 | 0.41 | 0.91 | 0.37 |
|  | 2.5 | −0.7 | 2.6 | 6.1 | 1.7 |
| Dn q7-8 | 0.67 | −0.51 | −0.02 | 0.37 | 0.53 |
|  | 2.0 | −2.5 | −0.1 | 2.4 | 2.3 |
| Dn q9-10 | 0.43 | −0.28 | −0.03 | 0.07 | 0.12 |
|  | 1.2 | −1.5 | −0.2 | 0.4 | 0.5 |
| Dn q11-12 | 0.70 | −0.20 | 0.07 | 0.01 | −0.44 |
|  | 1.9 | −0.9 | 0.4 | 0.0 | −1.2 |

|  | A.5 Additional C Parameters | | | | |
|---|---|---|---|---|---|
|  | C Aggregate | | | | |
|  | Def | W | Up | Dn | Dn to C |
| Age | 0.71 | 2.89 | −0.50 |  | −1.16 |
|  | 1.1 | 5.8 | −1.1 |  | −1.8 |
| Age$^2$ | −0.61 | −2.41 | 0.73 |  | 1.07 |
|  | −1.1 | −6.5 | 2.1 |  | 2.0 |
| Up q1 |  | −1.09 | 1.35 |  | 0.63 |
|  |  | −1.4 | 1.5 |  | 1.5 |
| Up q2 |  | −0.39 | 2.54 |  | 0.63 |
|  |  | −0.8 | 4.5 |  | 1.5 |
| Up q3 |  | −0.39 | 0.26 |  | 0.63 |
|  |  | −0.8 | 0.3 |  | 1.5 |
| Up q4 |  | −0.39 | 1.82 |  | 0.63 |
|  |  | −0.8 | 2.6 |  | 1.5 |
| Up q5-6 | 2.72 | −0.39 | 0.86 |  | −0.52 |
|  | 3.0 | −0.8 | 2.3 |  | −0.9 |
| Up q7-8 |  | −0.39 | 0.86 |  | −0.52 |
|  |  | −0.8 | 2.3 |  | −0.9 |
| Up q9-10 |  | −0.39 | 0.86 |  | −0.52 |
|  |  | −0.8 | 2.3 |  | −0.9 |
| Up q11-12 |  | −0.39 | 0.86 |  | −0.52 |
|  |  | −0.8 | 2.3 |  | −0.9 |
| Dn q1 | 7.89 | −1.49 | −0.71 |  | 1.97 |
|  | 10.9 | −4.3 | −0.8 |  | 4.6 |
| Dn q2 | 7.29 | −0.72 | 0.32 |  | 1.93 |
|  | 10.0 | −1.9 | 0.6 |  | 4.5 |
| Dn q3 | 2.59 | −0.15 | −0.08 |  | 0.86 |
|  | 3.5 | −0.3 | −0.2 |  | 2.5 |
| Dn q4 | 1.58 | −0.01 | 0.71 |  | 0.14 |
|  | 2.9 | 0.0 | 1.3 |  | 0.4 |
| Dn q5-6 | 1.97 | −0.43 | 0.15 |  | 0.69 |
|  | 2.7 | −1.4 | 0.4 |  | 2.2 |
| Dn q7-8 | 0.53 | −0.31 | 0.40 |  | −0.56 |
|  | 1.5 | −1.0 | 1.2 |  | −1.6 |
| Dn q9-10 | 1.01 | −0.26 | −0.29 |  | −1.18 |
|  | 2.6 | −0.8 | −0.8 |  | −2.9 |
| Dn q11-12 | 1.15 | −0.41 | 0.14 |  | −1.18 |
|  | 1.6 | −1.1 | 0.4 |  | −2.9 |

|  | A.6 Log Baseline Transition Parameters: Default and Withdrawal | | | | | |
|---|---|---|---|---|---|---|
|  | Default | | | Withdrawal | | |
|  | IG | SG | C | IG | SG | C |
| q1 |  | −2.39 | −2.83 | −0.36 | 0.24 | 0.06 |
|  |  | −1.7 | −2.4 | −1.1 | 1.3 | 0.2 |
| q2 |  | −0.90 | −2.83 | −0.49 | −0.22 | −0.49 |
|  |  | −1.7 | −2.4 | −1.5 | −1.1 | −1.3 |
| q3 |  | −0.44 | −1.91 | −0.65 | −0.39 | −1.07 |
|  |  | −1.0 | −2.4 | −1.8 | −1.9 | −2.3 |
| q4 |  | −0.01 | −1.11 | 0.06 | −0.43 | −1.16 |
|  |  | 0.0 | −1.8 | 0.2 | −2.2 | −2.4 |
| q5 |  | −0.11 | −2.25 | −0.25 | −0.21 | −0.64 |
|  |  | −0.3 | −2.6 | −1.0 | −1.2 | −1.7 |
| q6 |  | −0.41 | −1.89 | −0.38 | −0.41 | −0.15 |
|  |  | −1.1 | −2.5 | −1.7 | −2.5 | −0.5 |
| q8 |  | −0.11 | −0.44 | −0.09 | −0.29 | −0.48 |
|  |  | −0.3 | −0.9 | −0.5 | −1.9 | −1.3 |
| q12 |  | 0.06 | −2.49 | 0.12 | −0.15 | −0.28 |
|  |  | 0.2 | −1.9 | 0.8 | −1.2 | −0.8 |
| q16 |  | 0.13 | 0.16 | −0.14 | −0.16 | −0.41 |
|  |  | 0.3 | 0.3 | −0.9 | −1.2 | −1.1 |

|  | A.7 Log Baseline Transition Parameters: Upgrade, Downgrade, and Downgrade to C | | | | | | |
|---|---|---|---|---|---|---|---|
|  | Upgrade | | | Downgrade | | | Downgrade to C |
|  | IG | SG | C | IG | SG | SG | C |
| q1 | −0.17 | −1.37 | −0.81 | −1.15 | −1.33 | −2.02 | −1.19 |
|  | −0.7 | −4.9 | −1.0 | −5.4 | −5.8 | −4.3 | −2.5 |
| q2 | −0.31 | −1.06 | −0.17 | −0.99 | −0.75 | −1.93 | −1.04 |
|  | −1.2 | −4.2 | −0.2 | −4.8 | −3.9 | −4.2 | −2.2 |
| q3 | 0.08 | −0.46 | 0.74 | −0.99 | −0.65 | −0.34 | −0.20 |
|  | 0.4 | −2.2 | 1.2 | −4.8 | −3.5 | −1.2 | −0.5 |
| q4 | 0.30 | 0.04 | 0.08 | −0.70 | −0.43 | −0.44 | 0.07 |
|  | 1.4 | 0.2 | 0.1 | −3.7 | −2.5 | −1.5 | 0.2 |
| q5 | 0.00 | 0.03 | 0.29 | −0.40 | −0.54 | −0.07 | −0.45 |
|  | 0.0 | 0.2 | 0.5 | −2.8 | −3.4 | −0.3 | −1.2 |
| q6 | −0.15 | 0.07 | 0.63 | −0.29 | −0.28 | 0.10 | −0.08 |
|  | −0.9 | 0.4 | 1.0 | −2.2 | −1.8 | 0.4 | −0.2 |
| q8 | 0.16 | 0.51 | 0.98 | −0.18 | 0.01 | −0.18 | 0.51 |
|  | 0.9 | 3.6 | 1.6 | −1.5 | 0.0 | −0.7 | 1.7 |

-continued

A.7 Log Baseline Transition Parameters: Upgrade, Downgrade, and Downgrade to C

|     | Upgrade | | | Downgrade | | | Downgrade to C |
| --- | --- | --- | --- | --- | --- | --- | --- |
|     | IG | SG | C | IG | SG | SG | C |
| q12 | 0.52 | 0.62 | 1.19 | −0.03 | 0.03 | 0.19 | 0.39 |
|     | 4.5 | 4.9 | 2.0 | −0.3 | 0.2 | 0.9 | 1.1 |
| q16 | 0.31 | 0.47 | 1.20 | −0.09 | 0.07 | 0.16 |  |
|     | 2.7 | 3.3 | 1.9 | −0.9 | 0.5 | 0.7 |  |

A.8 Coefficient Estimates and T-Statistics for Default Transition Intensity

|  | SG Aggregate | C Aggregate |
| --- | --- | --- |
| Current Δ Unemployment Rate | 0.66 | 0.51 |
|  | (1.45) | (1.44) |
| Cumulative Δ Unemployment Rate | 0.13 | 0.30 |
|  | (1.34) | (2.71) |
| Unemployment Cycle | −0.21 | −0.52 |
|  | (−2.10) | (−6.91) |
| Unemployment Trend | 1.07 | −0.18 |
|  | (3.75) | (−0.70) |
| High Yield Spread | 0.15 | 0.05 |
|  | (2.93) | (1.39) |

A.9 Coefficient Estimates and T-Statistics for Withdrawal Transition Intensity

|  | IG Aggregate | SG Aggregate | C Aggregate |
| --- | --- | --- | --- |
| Current Δ Unemployment Rate | 0.05 | −0.03 | 0.84 |
|  | (0.18) | (−0.13) | (1.50) |
| Cumulative Δ Unemployment Rate | 0.09 | 0.02 | −0.03 |
|  | (2.13) | (0.44) | (−0.31) |
| Unemployment Cycle | 0.24 | 0.09 | 0.15 |
|  | (4.35) | (1.84) | (1.12) |
| Unemployment Trend | 0.07 | 0.08 | −1.61 |
|  | (0.50) | (0.68) | (−3.93) |
| High Yield Spread | −0.05 | −0.06 | −0.05 |
|  | (−1.92) | (−2.49) | (−0.85) |

A.10 Coefficient Estimates and T-Statistics for the Upgrade Transition Intensity

|  | IG Aggregate | SG Aggregate | C Aggregate |
| --- | --- | --- | --- |
| Current Δ Unemployment Rate | 0.59 | 0.81 | 0.97 |
|  | (2.74) | (3.41) | (1.50) |
| Cumulative Δ Unemployment Rate | −0.16 | −0.07 | −0.22 |
|  | (−4.94) | (−1.92) | (−1.53) |
| Unemployment Cycle | −0.11 | 0.05 | 0.50 |
|  | (−2.42) | (1.14) | (3.37) |
| Unemployment Trend | −0.10 | −0.01 | 0.24 |
|  | (−0.96) | (−0.11) | (0.87) |
| High Yield Spread | −0.03 | −0.15 | −0.14 |
|  | (−1.54) | (−6.52) | (−2.01) |

A.11 Coefficient Estimates and T-Statistics for the Downgrade Above C Transition Intensity

|  | IG Aggregate | SG Aggregate |
| --- | --- | --- |
| Current Δ Unemployment Rate | 0.13 | 0.10 |
|  | (0.92) | (0.51) |
| Cumulative Δ Unemployment Rate | 0.08 | 0.10 |
|  | (3.19) | (2.67) |
| Unemployment Cycle | 0.02 | −0.09 |
|  | (0.59) | (−2.00) |
| Unemployment Trend | 0.15 | −0.33 |
|  | (1.58) | (−2.80) |
| High Yield Spread | 0.14 | 0.10 |
|  | (9.91) | (5.32) |

A.12 Coefficient Estimates and T-Statistics for the Downgrade to C Transition Intensity

|  | SG Aggregate | C Aggregate |
| --- | --- | --- |
| Current Δ Unemployment Rate | 0.52 | 0.25 |
|  | (1.84) | (0.60) |
| Cumulative Δ Unemployment Rate | 0.07 | 0.25 |
|  | (1.00) | (2.20) |
| Unemployment Cycle | −0.17 | −0.12 |
|  | (−2.40) | (−1.26) |
| Unemployment Trend | −0.68 | −0.37 |
|  | (−2.98) | (−1.36) |
| High Yield Spread | 0.13 | 0.06 |
|  | (4.32) | (1.46) |

What is claimed is:

1. A method, comprising:
accessing rating facts about one or more issuers using a computer processor;
receiving information about one or more future paths for a first macroeconomic factor and one or more future paths for a second macroeconomic factor by the computer processor, wherein the first macroeconomic factor is an unemployment rate and the second macroeconomic factor is a high yield spread;
calculating, using the computer processor, one or more probabilities of credit rating transitions between credit rating states for the one or more issuers over a time period by a credit transition model based on the rating facts about the one or more issuers, the one or more future paths for the first macroeconomic factor, and the one or more future paths for the second macroeconomic factor, wherein the credit transition model includes a credit rating state of withdrawal from rating; and
generating outputs from the computer processor based on the one or more probabilities of credit rating transitions from the credit transition model, wherein the outputs are capable of being displayed using a computer system with display.

2. The method of claim 1, wherein the rating facts comprise one or more of the following: a current rating, a rating momentum, a rating history, an outlook status, and a watchlist status.

3. The method of claim 1, wherein the step of calculating one or more probabilities of credit rating transitions further comprises performing an adjustment for withdrawal of the one or more issuers from rating.

4. The method of claim 1, wherein the step of generating outputs further comprises performing an adjustment for withdrawal of the one or more issuers from rating.

5. The method of claim 1, wherein the outputs generated from the credit transition model comprise one or more of the following at the issuer level or at a portfolio level: rating migration matrices, marginal default rates, cumulative default rates, first passage probabilities, default distributions, fallen angel rates, rising star rates, forecasted ratings, drill-through reports, and summary reports.

6. A method, comprising:
receiving with a computer processor one or more portfolios including information about one or more issuers;
receiving with the computer processor one or more macroeconomic scenarios including information about a first macroeconomic factor and receiving one or more macroeconomic scenarios including information about a second macroeconomic factor, wherein the first macroeconomic factor is an unemployment rate and the second macroeconomic factor is a high yield spread;
determining, using the computer processor, rating facts about the one or more issuers based on the one or more portfolios;
receiving with the computer processor information about one or more future paths for the first macroeconomic factor and one or more future paths for the second macroeconomic factor based on the received one or more macroeconomic scenarios;
applying, using the computer processor, a credit transition model using the rating facts about the one or more issuers, the one or more future paths for the first macroeconomic factor, and the one or more future paths for the second macroeconomic factor by the computer processor;
calculating, using the computer processor, one or more probabilities of credit rating transitions between credit rating states for the one or more issuers over a time period by the credit transition model based on the rating facts about the one or more issuers, the one or more future paths for the first macroeconomic factor, and the one or more future paths for the second macroeconomic factor, wherein the credit transition model includes a credit rating state for withdrawal from rating; and generating outputs from the computer processor based on the one or more probabilities of credit rating transitions from the credit transition model, wherein the outputs are capable of being displayed using a computer system with display.

7. The method of claim 6, wherein the step of receiving one or more portfolios further comprises receiving criteria for determining the one or more issuers.

8. The method of claim 7, wherein the criteria comprise one or more of the following: one or more issuers to include, one or more issuers to exclude, one or more regions, one or more industries, and one or more ratings categories.

9. The method of claim 6, wherein the rating facts comprise one or more of the following: a current rating, a rating momentum, a rating history, an outlook status, and a watchlist status.

10. The method of claim 9, wherein the step of receiving one or more portfolios further comprises receiving weights for each of the one or more issuers.

11. The method of claim 10, wherein the weights are volume weighted or dollar weighted.

12. The method of claim 6, wherein the step of receiving one or more macroeconomic scenarios further comprises receiving a selection of one or more information sources for the one or more macroeconomic scenarios.

13. The method of claim 12, wherein the one or more information sources includes a historical scenario, a custom scenario, and a scenario from a predetermined source.

14. The method of claim 13, wherein the custom scenario is created by a user.

15. The method of claim 13, wherein the scenario from a predetermined source is based on an output from an economic forecasting model.

16. The method of claim 13, wherein the scenario from a predetermined source includes a baseline scenario, scenario having an economic upside, or a scenario having an economic downside.

17. The method of claim 6, further comprising the step of receiving a withdrawal adjustment, wherein the withdrawal adjustment comprises one or more of the following: a sophisticated adjustment, an adjustment for historical comparison, and a custom adjustment with a reinvestment assumption.

18. The method of claim 6, wherein the step of applying the credit transition model further comprises performing an adjustment for withdrawal of the one or more issuers.

19. The method of claim 6, wherein the step of applying a credit transition model further comprises:
(i) calling a plurality of credit transition model parameters by the computer processor; and
(ii) applying the credit transition model using the plurality of credit transition model parameters.

20. The method of claim 6, wherein the outputs generated from the credit transition model comprise one or more of the following at the issuer or portfolio level: rating migration matrices, marginal default rates, cumulative default rates, first passage probabilities, default distributions, fallen angel rates, rising star rates, forecasted ratings, drill-through reports and summary reports.

21. The method of claim 6, wherein the step of generating outputs further comprises performing an adjustment for withdrawal of the one or more issuers.

22. The method of claim 6, further comprising the step of transmitting the outputs from the credit transition model from the computer processor to a communication terminal.

23. A system, comprising:
a computer, the computer including a portfolio module, a scenario module, a statistical modeling module, and an output module;
the portfolio module configured to receive one or more portfolios comprising information about one or more issuers;
the scenario module configured to receive one or more macroeconomic scenarios including information about a first macroeconomic factor and receiving one or more macroeconomic scenarios including information about a second macroeconomic factor, wherein the first macroeconomic factor is an unemployment rate and the second macroeconomic factor is a high yield spread;
the statistical modeling module configured to determine rating facts about the one or more issuers based on the one or more portfolios, receive information about one or more future paths for the first macroeconomic factor and one or more future paths for the second macroeconomic factor, apply a credit transition model using the rating facts about the one or more issuers, the one or more future paths for the first macroeconomic factor, and the one or more future paths for the second macroeconomic factor; and calculate one or more probabilities of credit rating transitions between credit rating states of the one or more issuers over a time period by the credit transition model based on the rating facts about the one or more issuers, the one or more future paths for the first macroeconomic factor, and the one or more future paths for the second macroeconomic factor, wherein the credit transition model includes a credit rating state for withdrawal from rating; and the output module configured to generate outputs based on the one or more probabilities of credit rating transitions from the credit transition model, wherein the outputs are capable of being displayed using a computer system with display.

24. A method, comprising:

displaying, using a computer, a portfolio interface for inputting issuer information of issuers;

displaying, using the computer, a macroeconomic scenario interface for inputting information about unemployment rates and information about high yield spreads;

transmitting from the computer the issuer information, the information about unemployment rates, and the information about high yield spreads to a credit transition model for generating probabilities of credit rating transitions between credit rating states for the issuers over a period of time, the credit transition model including a credit rating state for withdrawal from rating, wherein the credit transition model generates the probabilities of credit rating transitions using the issuer information, the information about unemployment rates, and the information about high yield spreads;

receiving by the computer one or more probabilities of credit rating transitions generated from the credit transition model; and displaying, using the computer, outputs of the one or more probabilities of credit rating transitions on the graphical user interface.

25. The method of claim 24, wherein the outputs generated from the credit transition model comprise one or more of the following at the issuer or portfolio level: rating migration matrices, marginal default rates, cumulative default rates, first passage probabilities, default distributions, fallen angel rates, rising star rates, forecasted ratings, drill-through reports and summary reports.

26. A system, comprising:

a communication terminal, the communication terminal configured (a) to transmit information about one or more issuers, unemployment rates, and high yield spreads to a credit transition model for generating probabilities of credit rating transitions between credit rating states of the issuers over a period of time, the credit transition model including a credit rating state for withdrawal from rating, and (b) to receive one or more probabilities of credit rating transitions generated from the credit transition model, the credit transition model predicting the one or more probabilities using the information about one or more issuers, unemployment rates, and high yield spreads; and a graphical user interface to display the one or more probabilities of credit rating transitions.

* * * * *